United States Patent [19]

Yamada et al.

[11] Patent Number: 5,462,058
[45] Date of Patent: Oct. 31, 1995

[54] ULTRASONIC DIAGNOSTIC SYSTEM

[75] Inventors: Isamu Yamada; Akira Shiba; Miyuki Iizuka, all of Kawasaki, Japan

[73] Assignee: Fujitsu Limited, Kawasaki, Japan

[21] Appl. No.: 359,831

[22] Filed: Dec. 20, 1994

[30] Foreign Application Priority Data

Mar. 17, 1994 [JP] Japan .................................. 6-047334
Aug. 15, 1994 [JP] Japan .................................. 6-191588

[51] Int. Cl.$^6$ ...................................................... A61B 8/00
[52] U.S. Cl. ...................................................... 128/661.08
[58] Field of Search ......................... 128/661.01, 661.08, 128/661.09, 661.10; 73/597, 602, 861.25

[56] References Cited

U.S. PATENT DOCUMENTS 5,268,876  12/1993  Rachlin ............................... 128/661.01
5,278,757   1/1994  Hoctor et al. ........................ 128/661.01
5,363,851  11/1994  Hall et al. ........................... 128/661.09

FOREIGN PATENT DOCUMENTS 62-44494   9/1987  Japan .
3-286751  12/1991  Japan .
5-43381    7/1993  Japan .

OTHER PUBLICATIONS

"Proceeding of the 53rd Meetings of the Japan Society of Ultrasonics in Medicine," Lecture Treatises Collection (JSUM Treatises Collection No. 53), Nov. 1988.

Primary Examiner—George Manue
Attorney, Agent, or Firm—Staas & Halsey

[57] ABSTRACT

There is provided an ultrasonic diagnostic system wherein received signals are generated in such a manner that ultrasonic pulse beams are transmitted within a subject and reflecting ultrasonic waves from an inside of the subject are received, and a tomographic image is obtained on the basis of the received signals. The ultrasonic diagnostic system is capable of detecting a velocity or a velocity gradient as to the tissue within the subject. Two digital complex signals $[R_i(t)+j\,I_i(t)]$ and $[R_i(t+\Delta\tau)+j\,I_i(t+\Delta\tau)]$, which are apart from each other by $\Delta\tau$, are obtained from a complex signal (quadrature detection signal) $[h_{ci}(t)+j\,h_{si}(t)]$ outputted from a complex signal conversion circuit. A phase difference $\Delta\theta_{i,i+1}(t)$ is determined from a complex correlation value $C_{i,i}(t,\Delta\tau)$ of these two complex signals. Further, the phase difference $\Delta\theta_{i,i+1}(t)$ is determined from a complex correlation value $C_{i,i+1}(t)$ of signal-to-signal during repetition of transmission of ultrasonic pulse beams. Using these phase differences, time difference $\Delta t$ corresponding to a movement quantity within the subject is calculated on the basis of equation:

$$\Delta t = \Delta\theta_{i,i+1}(t)\cdot\Delta\tau/\{\Delta\theta_{i,i}(t,\Delta t) - \omega_o\Delta\tau\}$$

38 Claims, 42 Drawing Sheets

A—E OF TIME DIFF: $\Delta\tau$

A—B OF PHASE DIFF: $\Delta\theta_{1,1}(t,\Delta\tau)$

B—C AND E—F OF PHASE DIFF: $\omega_0 \Delta\tau$

A—C OF PHASE DIFF: $\Delta\theta_{1,1}(t,\Delta\tau) - \omega_0 \Delta\tau$

A—D OF PHASE DIFF: $\Delta\theta_{1,2}(t)$

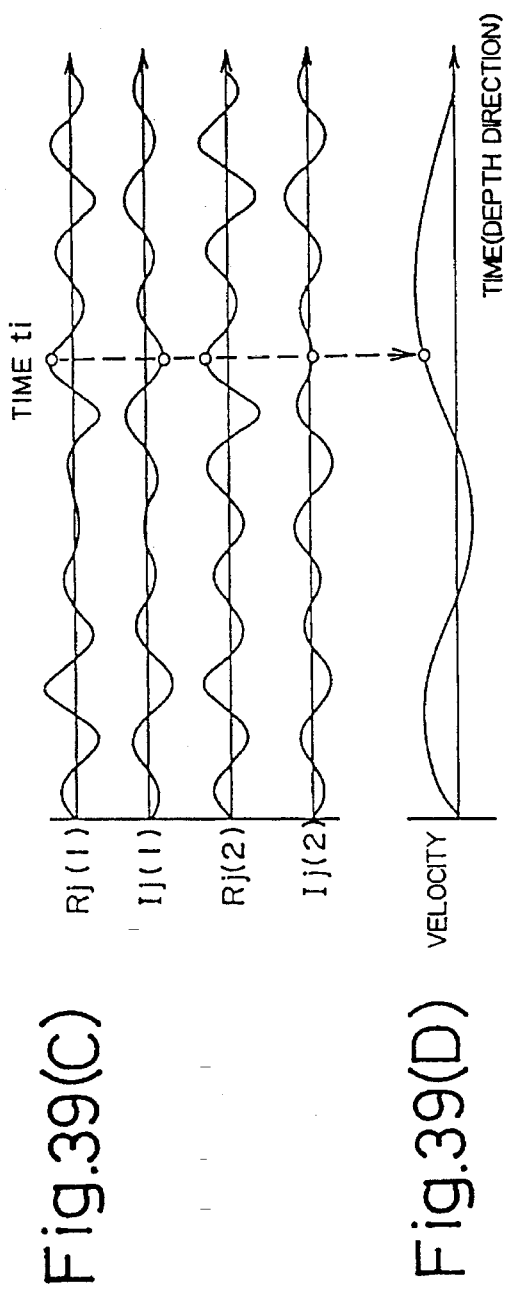

ULTRASONIC DIAGNOSTIC SYSTEM

BACKGROUND OF THE INVENTION

1. Field of the Invention

The present invention relates to an ultrasonic diagnostic system in which ultrasonic beams are transmitted into the inside of the subject and the ultrasounds reflected from the inside of the subject are received, thereby deriving for example, a velocity, a velocity Gradient or the like of a tissue in the subject on the basis of the received signal obtained through reflection.

2. Description of the Related Art

There has been used an ultrasonic diagnostic system for transmitting ultrasonic beams within the human body and receiving the ultrasounds reflected by a tissue in the human body thus diagnosing diseases of the viscera and the like of the human body. In one aspect of this ultrasonic diagnostic system, or in an optional function of an ultrasonic diagnostic system for displaying a tomographic image (B-mode), there has been known an ultrasonic diagnostic system having a function of detecting a velocity of the blood flow in the human body and a movement of the tissue.

In such type of ultrasonic diagnostic system, there is known a system which is arranged in such a manner that ultrasounds reflected by blood flow within the human body are received to obtain blood flow information such as velocity, variance, power and the like of the blood flow. Further, recently, for example, for the purpose of serving diagnostic of ischemic heart disease such as angina pectoris and myocardial infarction, or for the purpose of discovering a hard cancer tissue or the like within a tissue, it is proposed to observe movement and hardness of the cardiac muscle and other tissues. It is possible to know the movement and hardness of these tissues through observation of properties of propagation of vibration in application of an external vibration to a living body, a movement of the internal organs due to the internal heart beat, and the like using ultrasound beams.

With respect to a technique for detecting a quantity associated with hardness of a tissue, for example, in "Simultaneous video system of amplitude and phase of vibration within soft tissue by application of low frequency vibration", pp. 271–272, Proceedings of the 53rd Meeting of the Japan Society of Ultrasonics in Medicine, published on November, 1988, it is proposed to determine from a phase variation a propagation speed of a low frequency vibration of a tissue inside the subject as a physical quantity closely involved in a shear viscoelasticity parameter associated with hardness, elasticity and the like of the tissue.

Further, recently, it is proposed not only to detect a movement (velocity) of a tissue, but also to obtain a quality (hardness) associated with a degree of shrinkage of the tissue through determining a velocity gradient by means of differentiating the detected velocity with respect to, for example, a depth direction within the subject (cf. for example, Japanese Patent Publication No. 43381/1993).

It is possible to detect a blood flow velocity within the subject and a movement of an tissue of the subject in such a manner that ultrasound pulses are transmitted plural number of times in each scan line direction extending inside the subject, and a Doppler shift frequency is detected in accordance with a pulse-pair method, whereby the blood flow velocity and the movement of the tissue are detected on the base of the detected Doppler shift frequency.

FIG. 37 is a block diagram of a related art of ultrasonic diagnostic system in which a blood flow velocity is detected.

A transmitter unit 110 transmits a transmission signal to a transducer array 112, which is arranged in the tip of an ultrasound probe, in accordance with a control signal from a control unit (not illustrated), so that ultrasounds are transmitted from the transducer array 112 to the inside of the subject (not illustrated). The ultrasounds reflected inside the subject are received by the transducer array 112. The received signals are applied to a beamformer 114 by which echo signals converged into a specified direction are generated. The specified direction is referred to as a scan direction. The echo signals generated from the beamformer 114 are applied to a quadrature detector 116 in which the echo signals are subjected to a quadrature detection in accordance with two reference signals each having the same frequency as a central frequency of the ultrasounds and mutually different by 90° in phase, which reference signals are transmitted from the control unit (not illustrated), so that real part $R_j$ (i) and imaginary part $I_j$ (i) of two signals are built on each echo signal. Where the sign "i" is used to denote the scan line number, and the suffix "j" to denote the repeated number which is applied to transmitting and receiving of a plurality of number of times for ultrasounds conducted with respect to the same scan direction.

The real part $R_j$ (i) and imaginary part $I_j$ (i) of quadrature detected signals, which are derived from the quadrature detector 116, are converted by A/D converters 118 and 120 into digital signals, respectively, and then temporarily stored in memories 122 and 124, respectively. Thereafter, the digital signals stored in the memories 122 and 124 are read out and supplied to an MTI filter 126. Since the signals entered the MTI filter 126 carry both blood flow information and additional information as to a movement of a tissue of a living body, signals carrying only the blood flow information can be extracted through eliminating by the MTI filter 126, for example, a low frequency component of the received input signal.

An output signal of the MTI filter 126 is transmitted to a complex auto-correlation arithmetic unit 128, and of which an output signal is transmitted to an atan arithmetic unit 130. The arithmetic contents in those arithmetic units will be described later.

The atan arithmetic unit 130 serves to determine a blood flow velocity. A signal outputted from the atan arithmetic unit 130, which is representative of the blood flow velocity, is applied to a digital scan converter 132 to be converted into a signal suitable for display in a display 134, for example, a CRT in which an image representative of the blood flow velocity is color-displayed, for example, in such a manner that a blood flow running in a direction from the inside of the subject toward the transducer array 112 is color-displayed with red, and a blood flow running in the reversed direction with blue.

FIGS. 38(A)–38(C) are each a typical illustration of scan lines within the subject in a case where a blood flow velocity is detected. FIGS. 39(A)–39(D) are each a diagram useful understanding the operation of the related art. FIG. 40 is a flowchart of arithmetic algorithm of the related art.

As shown in FIGS. 38(A)–38(C), transmitting ultrasounds from the probe contacted with the body surface in the scan line directions depicted with B1, B2, . . . B5 permits echo signals for obtaining a B mode of tomographic image to be derived. Further, in a case where a blood flow velocity is detected, transmitting ultrasounds in the scan line directions depicted with C1, C2, . . . C5 each plural number of times permits a blood flow velocity on each scan line direction to be calculated in accordance with a pulse-pair method. While FIGS. 38(A)–38(C) show each that the scan line directions $B_i$ and $C_i$ are mutually different form each other, it is acceptable that they are of the same.

Generally, a sequence of the scan is given in a fashion as shown in FIGS. 39(A) or 39(B). A signal for detecting a blood flow velocity or a movement of the tissue is denoted by $C_j(i)$, where the suffix "j" is used to denote the scan line number, and the sign "i" to denote the repeated number which is applied to transmitting of a plurality of number of times for ultrasounds conducted with respect to the same scan direction. In general, if it is desired to detect a higher speed of blood flow velocity as well, there is provided a short repetitive period as shown in FIG. 39(A), and on the other hand, if it is desired to detect a lower speed of blood flow velocity as well, there is provided a relatively long repetitive period as shown in FIG. 39(B). Where quadrature detected signals, which are repeatedly generated with respect to the scan line j direction, are expressed as $\{R_j(1), I_j(1)\}, \{R_j(2), I_j(2)\}, \{R_j(3), I_j(3)\}, \ldots$, as shown in FIG. 39(C).

Whereas, in the complex auto-correlation arithmetic unit 128 and the atan arithmetic unit 130, the arithmetic operations as shown in FIG. 40 are performed.

When an image on a screen is updated, first, an initial setting is conducted with respect to the scan line number j and depth t, (corresponding to time $t_i$ shown in FIG. 38 (C)). Quadrature detected signals involved in the scan line of scan line number j and the designated depth $t_i$, which are expressed by $$\{C_j(i)\}_{t=ti}=\{R_j(i), I_j(i); i=1, \ldots, n\}_{t=ti}$$

are read out from the memories 122 and 124. And in the complex auto-correlation arithmetic unit 128, the complex auto-correlation value Cora (j, $t_i$) as to the scan line j and depth $t_i$ is calculated on the basis of the following equation (1)

$$Cor(j, t_i) = \sum_{i=1}^{n-1} [C_j(i) \times C_j(i+1)^*]_{t=ti} =$$

$$\sum_{i=1}^{n-1} [\{R_j(i) R_j(i+1) + I_j(i) I_j(i+1)\} +$$

$$j \cdot \{I_j(i) R_j(i+1) - R_j(i) I_j(i+1)\}]_{t=ti} \quad (1)$$

Incidentally, it is noted that the same reference symbol is used for the signals before and after the input and output of the MTI filter 126.

The complex auto-correlation value Cor(j, $t_i$) calculated on the basis of the above-noted equation (1) is applied to the atan arithmetic unit 130. In the atan arithmetic unit 130, a phase difference $\Delta\theta(j, t_i)$ involved in the scan line j and depth $t_i$ is calculated on the basis of the received complex auto-correlation value Cor(j, $t_i$) in accordance with the following equation (2):

$$\Delta\theta(j, t_i)=a \tan [Im\{Cor(j, t_i)\}/Real\{Cor(j, t_i)\}] \quad (2)$$

From the thus obtained phase difference $\Delta\theta(j, t_i)$, it is possible to calculate a velocity $V(j, t_i)$ involved in the scan line j and depth $t_i$ in accordance with the following equation (3):

$$V(j, t_i)=(\Delta\theta(j, t_i) \cdot C)/(4\pi f_o T) \quad (3)$$

where

C: an ultrasonic velocity $f_o$: a center-frequency of ultrasound.

T: a repetitive period of transmission and reception of ultrasound

The above operations are repeated while incrementing depth $t_i$ and scan line number j, whereby the blood flow velocity of the image on the screen is determined.

FIG. 39(D) plots the blood flow velocity calculated in the above-mentioned fashion in connection with a certain scan line.

According to the related art shown in FIG. 37, the signals stored in the memories 122 and 124 are read out and passed via the MTI filter 126, thereby extracting the blood flow information. However, it should be noticed, in case of detection of a movement of the tissue, that the signal component representative of information as to the movement of the tissue is extremely larger in power than the signal component representative of the blood flow information, and thus there is no need to eliminate the blood flow information. Hence, performing the above-mentioned operations with respect to the signal bypassed the MTI filter 126 makes it possible to see the mode of movement of the tissue.

Next, there will be explained further related art.

Japanese Patent Publication No. 44494/1987 discloses an ultrasonic doppler diagnostic system in which a velocity of a blood flow of the heart is displayed in the form of an image. According to such a system, reflecting ultrasounds from the inside of the subject are received, and a Doppler effect which the reflecting ultrasounds undergoes is detected as a shift of an ultrasonic carrier frequency. This detection technique is called a pulse-pair method.

FIG. 41 is a block diagram of the related art of ultrasonic doppler diagnostic system.

Since the general technical matters of the ultrasonic diagnostic system are well known, there will be mainly explained the matters associated with the pulse-pair method.

Pulse signals are transmitted from a transmission circuit 202 each in a predetermined timing toward ultrasonic transducers 201 arranged with a plurality of pieces, so that ultrasonic pulse beams are transmitted from the ultrasonic transducers 201 each in a predetermined direction inside the subject (not illustrated). The ultrasonic pulse beams irradiated within the subject are reflected within the subject, and the reflected ultrasounds are received by the ultrasonic transducers 201 and are applied to a receiving circuit 203. In the receiving circuit 203, the ultrasounds are subjected to an addition in phase to generate received signals each carrying information with respect to a predetermined direction within the subject. The received signal is subjected to the quadrature detection in a quadrature detecting circuit 204, thereby obtaining two signals $h_{ci}(t)$ and $h_{si}(t)$ which quadrate with each other, where the suffix "i" implies that the signal is involved in the i-th transmission when the ultrasonic pulse beam are repeatedly transmitted in a predetermined direction within the subject, and the alphabetical mark "t" is representative of time as the reference time on each transmission. These signals $h_{ci}(t)$ and $h_{si}(t)$ are considered as a complex signal $[h_{ci}(t)+j\ h_{si}(t)]$ taking in their combination.

The real part $h_{ci}(t)$ and imaginary part $h_{si}(t)$ of the complex signal $[h_{ci}(t)+j\ h_{si}(t)]$ are applied to A/D converters 205 and 206, respectively, in which they are subjected to a sampling process at regular intervals, converted into a digital complex signal, and then temporarily stored in a memory 207. The digital complex signal is read out from the memory 207 and then applied to an MTI filter 208. The MTI filter 208 is constituted of a low-frequency cut-off filter which serves to eliminate information as to a clutter component which the received complex signal carries and to extract blood flow information. The complex signal representative of the blood flow information, which is outputted from the MTI filter 208, is temporarily stored in a memory 209, and then applied to a complex correlation arithmetic unit 210.

In case of calculating a movement of the tissue, it is sufficient to bypass the MTI filter 208, or alter characteristics of the MTI filter 208. A signal intensity derived from the tissue is extremely larger in comparison with a signal intensity of a blood flow component. Thus, even if the blood flow information is not eliminated, the complex signal, which is deemed to be substantially representative of the reflecting signal from the tissue, may be applied to the complex correlation arithmetic unit 210.

The complex correlation arithmetic unit 210 performs an arithmetic operation for the complex correlation between a complex signal corresponding to the i-th of beam transmission and a complex signal corresponding to the (i+1)-th of beam transmission, so that a complex correlation value $C_{i,i+1}(t)$ can be calculated. This complex correlation value $C_{i,i+1}(t)$ is applied to a velocity arithmetic unit 211 and be converted into a blood flow velocity V inside the subject. The blood flow velocity V is applied to a digital scan converter (DSC) 212 and be converted into a display-oriented signal. In a display unit 213, the blood flow velocity distribution is superposed on a tomographic image within the subject and displayed in color for instance. Incidentally, a technique for obtaining the tomographic image is well known, and the present invention is not substantially related to the technique for obtaining the tomographic image. Thus, the explanation as to the technique for obtaining the tomographic image is omitted.

Now, it is assumed that the ultrasonic diagnostic system as shown in FIG. 41 is used to transmit ultrasound beams in a specified direction within the subject every repetitive period T, thereby obtaining the complex signal $Z_i=X_1+j Y_i (i=1, 2, 3, \ldots)$ with respect to a certain observation point depth in the specified direction within the subject.

In this case, an expected value of the complex correlation derived from the complex correlation arithmetic unit 210 shown in FIG. 41 is expressed by:

$$<Z_{i+1}Z_i*>=<X_{i+1}X_i+Y_{i+1}Y_i>+j<Y_{i+1}X_i-X_{i+1}Y_i> \quad (4)$$

From Equation (4), an expected value $<\Delta\theta>$ of a phase difference $\Delta\theta$ resulting between repetitive periods T is given by:

$$<\Delta\theta>=\arctan\{<Y_{i+1}X_i-Y_{i+1}Y_i>/<X_{i+1}X_i+Y_{i+1}Y_i>\} \quad (5)$$

If the transmitted ultrasonic pulse is of a very narrow band, a relation between the detected phase difference $<\Delta\theta>$ and a doppler frequency $f_d$ resulting from a movement (here, the presence of a blood flow) of the inside of the subject is given by the following equation:

$$<\Delta\theta>=2\pi f_d \cdot T \quad (6)$$

Further, a velocity V of the movement concerned (a blood flow velocity) is expressed by:

$$V=(c/2\omega_o)\cdot<\Delta\theta>/T \quad (7)$$

where
C: an ultrasonic velocity (usually, 1540 m/sec.)
$\omega_o$: a reference angular frequency of a signal used in the quadrature detecting circuit 204 (cf. FIG. 41)
Next, there will be explained still further related art.

FIG. 42 is a block diagram of the related art of ultrasonic diagnostic system.

Pulse signals are transmitted from a transmission circuit 302 each in a predetermined timing toward ultrasonic transducers 301 arranged with a plurality of pieces, so that ultrasonic pulse beams are transmitted from the ultrasonic transducers 301 each along a scan line extending in a predetermined depth direction inside the subject (not illustrated). The ultrasonic pulse beams irradiated within the subject are reflected within the subject, and the reflected ultrasounds are received by the ultrasonic transducers 301 and are applied to a receiving circuit 303. In the receiving circuit 303, the ultrasounds are subjected to a beamformation to generate received signals each carrying information with respect to the associated scan line within the subject. The received signals are applied to a quadrature detecting circuit 304 and a detecting circuit 314.

In the detecting circuit 314, the received signal is detected. The detected signal is converted into a display signal in a digital scan converter (DSC) 312. In a display unit 313, a tomographic image within the subject is displayed. Incidentally, a technique for obtaining the tomographic image is well known, and the present invention is not substantially related to the technique for obtaining the tomographic image. Thus, the explanation as to the technique for obtaining the tomographic image is omitted.

On the other hand, the received signal applied to the quadrature detecting circuit 304 is inputted to mixers 304a and 304b which constitute the quadrature detecting circuit 304. Also inputted to the mixers 304a and 304b are reference signals $\cos \omega_o t$ and $\sin \omega_o t$ from a control signal generating unit 305, respectively, which are multiplied by the received signal. Where $\omega_o$ denotes a reference angular frequency. The signals outputted from the mixers 304a and 304b are applied to low-pass filters 304c and 304d, respectively, in which signals involved in the low frequency band are extracted. The signals outputted from the low-pass filters 304c and 304d are converted into digital signals A/D converters 306a and 306b, thereby obtaining two signals $R_i(t)$ and $I_i(t)$ which quadrate with each other, where the suffix "i" implies that the signal is involved in the i-th transmission when the ultrasonic pulse beam are repeatedly transmitted in a predetermined direction within the subject, and the alphabetical mark "t" is representative of time as the reference time on each transmission. These signals $R_i(t)$ and $I_i(t)$ are considered as a complex signal $[R_i(t)+j I_i(t)]$ when taking in their combination.

The real part $R_i(t)$ and imaginary part $I_i(t)$ of the complex signal $[R_i(t)+j I_i(t)]$ are temporarily stored in a memory 307. The digital complex signal is read out from the memory 307 and then applied to a clutter eliminating means 308 such as an MTI filter. The clutter eliminating means 308 is constituted of a low-frequency cut-off filter or the like which serves to eliminate information as to a clutter component which the received complex signal carries and to extract blood flow information. In order to calculate a blood flow velocity, it is necessary to eliminate information as to a clutter component and extract only blood flow information. However, since a signal intensity derived from the tissue is extremely larger in comparison with a signal intensity of a blood flow component, it is usual for a calculation of the velocity of the tissue or the like not to eliminate the blood flow information.

The complex signal read out from the memory 307 is passed via a switch 309 to a complex auto-correlation arithmetic unit 310, after passing through the clutter eliminating means 308 or not passing through the clutter eliminating means 308 depending on the situation as to whether a blood flow velocity is to be detected or a tissue velocity is to be detected.

The complex correlation arithmetic unit 310 performs an arithmetic operation for the complex auto-correlation between a complex signal corresponding to the i-th of beam transmission and a complex signal corresponding to the (i+1)-th of beam transmission with respect to the same direction within the subject, so that a complex auto-correlation value $C_{i,i+1}(t)$ can be calculated. Incidentally, the symbol mark < ... > in the figure denotes an equalizing operation (expected value). This complex correlation value $C_{i,i+1}(t)$ is applied to a velocity and velocity gradient arithmetic unit 311 and be converted into a blood flow velocity or a tissue velocity inside the subject or a velocity gradient.

The detected blood flow velocity or velocity gradient is applied to a digital scan converter (DSC) 312 and be converted into a display-oriented signal. In a display unit 313, the velocity distribution or the velocity gradient distribution is changed over in a display mode from a display of a tomographic image within the subject, or is superposed on the tomographic image and displayed in color for instance. Now, it is assumed that the ultrasonic diagnostic system as shown in FIG. 42 is used to transmit ultrasound beams in a specified direction within the subject every repetitive period T, thereby obtaining the complex signal $Z_i = X_i + j Y_i$ (i=1, 2, 3, ...) with respect to a certain depth position (observation point) on a specified scan direction extended inside the subject.

In this case, an expected value $<C_{i,i+1}>$ of the complex auto-correlation derived from the complex auto-correlation arithmetic unit 310 shown in FIG. 42 is expressed by:

$$<C_{i,i+1}> = \quad (8)$$

$$<Z_{i+1} Z_i^*> =$$

$$<X_{i+1} X_i + Y_{i+1} Y_i> + j <Y_{i+1} X_i - X_{i+1} Y_i>$$

where the mark * denotes a complex conjugate

From Equation (8), an expected value $<\Delta\theta>$ of a phase difference $\Delta\theta$ resulting between repetitive periods T is given by:

$$<\Delta\theta> = \arctan \{<Y_{i+1}X_i - X_{i+1}Y_i>/<X_{i+1}X_i + Y_{i+1}Y_i>\} \quad (9)$$

A relation between the detected phase difference $<\Delta\theta>$ and a doppler frequency $f_d$ is given by the following equation:

$$<\Delta\theta> = 2\pi f_d \cdot T \quad (10)$$

A maximum doppler frequency $f_{dmax}$ is expressed by $$f_{dmax} = 1/(2T) \quad (11)$$

Further, a velocity V of the movement concerned (a blood flow velocity, or a velocity of the tissue) is expressed by:

$$V = (c/2\omega_o) \cdot <\Delta\theta> \quad (12)$$

where
c: an ultrasonic velocity (usually, 1540 m/sec.)

According to a technique for determining a velocity gradient, which is disclosed in Japanese Patent Publication No. 43381/1993, the velocity gradient is determined by differentiating (including differencing) the velocity V, which is calculated on the basis of equation (12), with respect to a depth direction z within the subject, that is, $$dV/dz = (1/\Delta z)(V_{j+1} - V_j) \quad (13)$$

where
j: j-th sampling point regarding the z direction (depth direction)

$\Delta z$: an interval between two sampling points aligned in the z direction

When times of received signals of ultrasound beams reflected from the two sampling points j and j+1 are expressed by $t_j$ and $t_{j+1}$, respectively, $\Delta t = t_{j+1} - t_j$ represents time required for the ultrasound beams to go and back between the two sampling points j and j+1. Consequently, the following relation is set up between the interval $\Delta z$ and the time $\Delta t$:

$$\Delta z = c \cdot \Delta t/2 \quad (14)$$

Now let us calculate data collecting time required for producing one picture plane portion of data.

Assuming that a repetitive period T is 200 μsec, the number of scan lines is 64 pieces, and the number of times of transmission regarding the same direction is 9 times (once for use in a B-mode image, and eight times for use in a doppler detection), time required for constituting a frame is given by:

$$200 \text{ μsec} \times 9 \times 64 = 115.2 \text{ msec}$$

This assumes about 8 (1/115.2 msec=8.6) in the frame rate. This frame rate is not sufficient for a diagnosis. On the other hand, if the number of times of repetition regarding the same direction is reduced for the purpose of enhancing the frame rate, this involves a problem concerning precision.

A point for enhancing the frame rate resides in the matter that the number of times of transmission regarding the same direction is reduced. Reducing the number of times of transmission regarding the same direction allows variance of the complex auto-correlation value used for detection of a velocity to be large, and thus resulting a degradation of precision of the finally obtained velocity V. However, it is considered that the degradation of precision is avoided by using also the complex auto-correlation values derived from the adjacent scan line and the adjacent depth, as shown in FIG. 38.

FIG. 43 is a block diagram of the related art of ultrasonic diagnostic system taking account of the above-mentioned consideration. Only the differences from the system shown in FIG. 37 will be described.

The ultrasonic diagnostic system shown in FIG. 43 has an average processing unit 131 after an atan arithmetic unit 130. The average processing unit 131 is arranged to perform an average processing for the respective velocities $V(j, t_i)$ involved in each associated scan line j and the associated depth $t_i$, which are calculated in the atan arithmetic unit 130, as shown in FIGS. 38(A)–38(C), with respect to the adjacent scan line direction (FIG. 38(A)), the depth direction (FIG. 38(B)) on a single scan line, or both the scan line direction and the depth direction (FIG. 38(C)). In this fashion, it is considered that the detection precision is enhanced without lowering the frame rates.

However, the average processing scheme as shown in FIG. 43 is still insufficient as to enhancement of the detection precision, and thus further enhancement of the detection precision is desired.

Accordingly, in view of the foregoing, it is the first object of the present invention to enhance the detection precision without lowering the frame rates, or to enhance the frame rates without lowering the precision.

Further, according to the related art of ultrasonic diagnostic system, as described in reference to FIG. 41, information as to a movement of the inside of the subject, such as a blood flow velocity is derived on the basis a principle of the pulse-pair method. However, it should be noted that actually, the received signals as reflection signals from the random structure include such a large error that the phase difference is changed at random or the presumed velocity is provided with an offset owing to an influence of attenuation.

Hence, in order to suppress such an error, there are attempts to obtain information as to a movement of the inside of the subject with greater accuracy. One of such attempts is proposed in Japanese Patent Laid Open Gazette No. 286751/1991.

FIG. 44 is a circuit block diagram useful for understanding a further developed technique from the above-referenced proposal.

In FIG. 44, the same parts are denoted by the same reference numbers as those of FIG. 41, and redundant description will be omitted.

The received signal outputted from the reception circuit 203 is applied to a quadrature detecting circuit 204_1 and therein converted into complex signals. The complex signals are applied to A/D converter circuits 205_1 and 206_1 therein converted into digital complex signals, respectively. These digital complex signals are applied to a phase difference calculating unit 220. Further, the received signal outputted from the reception circuit 203 is passed via an analog delay line 212, through which the signal is delayed by delay time $\Delta\tau$, to a quadrature detecting circuit 204_2 and therein converted into complex signals. The complex signals are applied to A/D converter circuits 205_2 and 206_2 therein converted into digital complex signals, respectively. These digital complex signals are applied to the phase difference calculating unit 220. What is meant by providing a delay for the received signal by the delay line 212 is to simulate such a situation that the tissue along the direction in which ultrasonic pulse beams are transmitted is uniformly shifted by the corresponding delay time $\Delta\tau$.

The phase difference calculating unit 220 calculates a phase difference $\Delta\theta_r$ between two complex signals derived from an originally single received signal, and passes the calculated phase difference $\Delta\theta_r$ to a memory 221.

The phase difference calculating unit 220 calculates also a phase difference $\Delta\theta_{1,2}$ between a received signal involved in transmission of the first time of ultrasonic pulse beam and a received signal involved in transmission of the second time of ultrasonic pulse beam, and passes the calculated phase difference $\Delta\theta_{1,2}$ to the memory 221. This phase difference $\Delta\theta_{1,2}$ is equivalent to the phase difference, as described referring to FIG. 41, which remarkably varies depending on the random structure inside the subject.

Thereafter, the phase difference $\Delta\theta_r$ is read out from the memory 221 and is passed to a correction factor calculating unit 222 in which a correction factor $\Delta\tau/\Delta\theta_r$ is calculated and then passed to a correction arithmetic unit 223. Also the phase difference $\Delta\theta_{1,2}$ is read out from the memory 221 and passed directly to the correction arithmetic unit 223.

In the correction arithmetic unit 223, the received phase difference $\Delta\theta_{1,2}$ is multiplied by the correction factor $\Delta\tau/\Delta\theta_r$ to calculate a high precision of time difference $\Delta\theta_{1,2}\cdot\Delta\tau/\Delta\theta_r$. This time difference $\Delta\theta_{1,2}\cdot\Delta\tau/\Delta\theta_r$ is passed a tissue parameter calculating unit 224 in which tissue parameters each representative of a degree of hardness of the associated point inside the subject are calculated on the basis of the time differences $\Delta\theta_{1,2}\cdot\Delta\tau/\Delta\theta_r$ which have been calculated with regard to the respective points inside the subject. The thus obtained tissue parameters are supplied to a display unit 125 and displayed thereon.

The time differences $\Delta\theta_{1,2}\cdot\Delta\tau/\Delta\theta_r$ will be described more in details hereinafter.

As mentioned above, the phase difference $\Delta\theta_r$ denotes a phase difference between two received signals which are obtained in such a manner that a single received signal is divided into two systems and a signal associated with one of which systems is delayed by delay time $\Delta\tau$, so that the two received signals can be obtained. That is, the phase difference $\Delta\theta_r$ includes errors similar to the phase difference $\Delta\theta_{1,2}$. Consequently, if the phase variation is smooth and thus can be adequately approximated by a linear expression, in other words, if the phase difference $\Delta\theta_r$ is proportional to the delay time $\Delta\tau$, multiplying the known delay time $\Delta\tau$ by the proportional amount $\Delta\theta_{1,2}/\Delta\theta_r$ of those phase differences $\Delta\theta_{1,2}$ and $\Delta\theta_r$ makes it possible to exactly determine the time difference $\Delta\theta_{1,2}\cdot\Delta\tau/\Delta\theta_r$ corresponding to the movement amount of the subject.

Using a technique explained referring to FIG. 44 makes it possible to correct the errors within a limit that the linear approximation is valid. However, it is necessary for such a technique to provide an extremely exact delay time $\Delta\tau$, and thus there is a need to provide a high precision of analog delay line 212. This is a cause of increasing the cost of the system. Further, according to such a system, there are needed the two-system corresponding of quadrature detecting circuits and the like, and thus a circuit scale will be enlarged. This will be also a cause of increasing the cost of the diagnostic system, and further will be contrary to contributing miniaturization of the diagnostic system.

The above-referenced Japanese Patent Laid Open Gazette No. 286751/1991 discloses a technique in which there is provided only a single system, but not two systems each including a quadrature detecting circuit and the like as shown in FIG. 44, to perform a switching between passing through the delay line 212 and not passing through the delay line 212. In this case, since there is frequent such a case that the subject moves during the repetitive period, an effect of the correction is little. Further, there is proposed also a scheme such that instead of providing a delay line, timing of a transmission of the ultrasonic pulse beam is varied by an amount corresponding to the delay time $\Delta\tau$ every repetition. Also in this scheme, however, an effect of the correction will be lost.

According to the Japanese Patent Laid Open Gazette No. 286751/1991, to determine the phase difference $\Delta\theta_r$ between the received signals one of which undergoes delay and the other no delay, first, the phases of the respective signals are detected, and then taking into account a so-called wrap around (jumping in phase from $\pi$ to $-\pi$), the difference (phase difference $\Delta\theta_r$) between phase-to-phase is calculated. However, the usual ultrasonic received signal involves frequent wrap arounds, and thus it is troublesome to conduct the correction.

In view of the foregoing, it is the second object of the present invention to provide an ultrasonic diagnostic system capable of knowing a movement inside the subject with high precision using a circuit structure which is relatively simple in arrangement.

Further, according to the related art of ultrasonic diagnostic system, as described above, the velocity V is determined on the basis of equation (12) and the obtained velocity V is differentiated with regard to the depth direction (z direction) as shown in equation (13), thereby calculating the velocity gradient dV/dz for the time being. However, in a case where a movement inside the subject is fast and there occurs a doppler shift exceeding one which causes a maximum drive frequency $f_{dmax}$ shown in equation (11), this involves such a problem that an error appears on the calculated value.

FIGS. 45(A)–(D) are each a view for use in explanation of the problem as mentioned above.

It is assumed that when phase differences, which are to be essentially detected with respect to two points A and B each in a certain depth, are expressed by $\Delta\theta_A$ and $\Delta\theta_B$, respectively, as shown in FIG. 45(A), the phase difference $\Delta\theta_A$ is within $\pi$, and the phase difference $\Delta\theta_B$ is out of $\pi$. By the way, the phase difference is simply permitted to be identified only between $-\pi$ and $\pi$. Consequently, as shown in FIG. 45(B), regarding $\Delta\theta_A$, the value near $\pi$ is detected. On the other hand, regarding $\Delta\theta_B$, the value near $-\pi$ is detected. This causes a problem of the wrap around such that the phase jumps by $2\pi$. The above-noted equation (12) represents that the phase difference $\Delta\theta$ is proportional to the velocity V, and also the velocity V, which is determined in accordance with the equation (12), assumes values as shown in FIG. 45(B). Consequently, it happens that the velocity gradient dV/dz, which is calculated on the basis of the equation (13), includes a large error that is far apart from the actual velocity gradient (FIG. 45(D)), as shown in FIG. 45(C).

In view of the foregoing, it is the third object of the present invention to provide an ultrasonic diagnostic system capable of calculating the velocity gradient with great accuracy, without involving a problem of the wrap around.

SUMMARY OF THE INVENTION

To attain the above-mentioned first object of the invention, according to the first ultrasonic diagnostic system of the present invention, there is provided an ultrasonic diagnostic system comprising:

a transmitter-receiver for transmitting ultrasonic waves each in a scan line direction within a subject a plurality of number of times and receiving reflecting ultrasonic waves from an inside of the subject to generate received signals;

a quadrature detector for obtaining a quadrature detecting output of each of the received signals;

an auto-correlator for determining a complex auto-correlation value of the quadrature detecting output;

a movement information detector for detecting blood flow information within the subject or information as to a movement of a tissue within the subject on the basis of the complex auto-correlation value determined by said auto-correlator; and an average arithmetic unit for determining an averaging value of the complex auto-correlation values on a plurality of points adjacent to a predetermined point within the subject, wherein said movement information detector determines the blood flow information within the subject or the information as to a movement of a tissue within the subject on the basis of said averaging value.

In the above-mentioned system, it is acceptable that said average arithmetic unit determines an averaging value of the complex auto-correlation values as to points on a plurality of scan lines adjacent to said predetermined point, which points are each in a same depth as said predetermined point. Further, it is acceptable that said average arithmetic unit determines an averaging value of the complex auto-correlation values as to a plurality of points adjacent to each other a predetermined scan line. Still further, it is acceptable that said average arithmetic unit determines an averaging value of the complex auto-correlation values as to a plurality of points surrounding said predetermined point on a two-dimensional basis.

While the terminology "averaging value" may imply "average value", "mean value" or the like, it should not be interpreted in a narrow sense. Anyone is acceptable, as the term "averaging value", which indicates a value on an average basis, for example, such as a median, (maximum+minimum)/2. However, for the purpose of simplification, hereinafter, it happens that the term "averaging value" is referred to as an average value.

To attain the above-mentioned second object of the invention, according to the second ultrasonic diagnostic system of the present invention, there is provided an ultrasonic diagnostic system comprising:

means for displaying a tomographic image of a subject on the basis of a received signal carrying information as to ultrasonic reflection along a scan line extending within the subject, said received signal being generated in such a manner that ultrasonic pulse beams are transmitted within the subject and reflecting ultrasonic waves from an inside of the subject are received by a plurality of ultrasonic transducers to perform a beamformation in phasing;

means for detecting a movement inside the subject on the basis of a plurality of received signals each carrying information as to ultrasonic reflection along a same scan line, said plurality of received signals being generated in such a manner that ultrasonic pulse beams are repeatedly transmitted in a same direction within the subject a plurality of number of times;

(2_1) complex signal conversion means for converting the received signals before or after the beamformation in phasing into a first complex signal using a predetermined reference frequency $\omega_o$ of reference signal;

(2_2) time shift complex signal producing means for producing from said first complex signal a second complex signal and a third complex signal, said second complex signal and said third complex signal being mutually shifted by a predetermined time difference $\Delta\tau$;

(2_3) complex correlation calculating means for calculating complex correlation value $C_{i,i}(t,\Delta\tau)$ at a time point of time t, wherein when ultrasonic pulse beams are repeatedly transmitted in a predetermined direction within the subject, a reference time point of i-th transmission of the ultrasonic pulse beam is selected as a starting point, of the second and third complex signals associated with the i-th transmission of the ultrasonic pulse beam in said predetermined direction, and additional complex correlation value $C_{i,i+1}(t)$ at a time point of time t, wherein reference time points of i-th and (i+1)th of transmissions of the ultrasonic pulse beam in said predetermined direction are each selected as a starting point, of the second complex signal-to-second complex signal which are associated with the i-th and (i+1)th of transmissions of the ultrasonic pulse beam in said predetermined direction, respectively; and (2_4) movement quantity calculating means for calculating on the basis of the complex correlation values $C_{i,i}(t,\Delta\tau)$ and $C_{i,i+1}(t)$ calculated by said complex correlation calculating means a quantity representative of a movement as to an observation point associated with the time t, within the subject, which movement will occur between the time points of i-th and (i+1)th of transmissions of the ultrasonic pulse beam.

In the above-mentioned system, said complex signal conversion means is not restricted to a specific structure. For example:

it is acceptable that the system further comprises means for performing a beamformation process in phasing for a plurality of analog received signals derived from a plurality of ultrasonic transducers, and said complex signal conversion means includes a quadrature detector for performing a quadrature detection for the analog received signals subjected to the beamformation process in phasing using two analog sine wave signals, which are mutually different in phase by 90°, as said reference signal, thereby converting said received signals into the first complex signal in the form of analog;

it is acceptable that the system further comprises means for performing a beamformation process in phasing for a plurality of analog received signals derived from a plurality of Ultrasonic transducers, and an A/D converter for converting the analog received signals outputted from said beamformation process means into digital received signals, and said complex signal conversion means includes a quadrature detector for performing a quadrature detection for the digital received signals outputted from said A/D converter using two digital sine wave signals, which are mutually different in phase by 90°, as said reference signal, thereby converting said received signals into the first complex signal in the form of digital;

it is acceptable that the system further comprises an A/D converter for converting a plurality of analog received signals derived from a plurality of ultrasonic transducers into a plurality of digital received signals, and means for performing a beamformation process in phasing for the plurality of digital received signals outputted from said A/D converter, and said complex signal conversion means includes a quadrature detector for performing a quadrature detection for the digital received signals outputted from said beamformation process means using two digital sine wave signals, which are mutually different in phase by 90°, as said reference signal, thereby converting said received signals into the first complex signal in the form of digital; or it is acceptable that said complex signal conversion means includes a quadrature detector for performing a quadrature detection for a plurality of analog received signals outputted from a plurality of ultrasonic transducers or a plurality of digital received signals obtained through an A/D conversion of the plurality of analog received signals using two analog or digital sine wave signals, which are mutually different in phase by 90°, as said reference signal, thereby converting said received signals into a plurality of the first complex signals, and said system further comprises means for performing a beamformation process in phasing for the plurality of the first complex signals derived by said complex signal conversion means, thereby obtaining the first complex signal subjected to the beamformation process in phasing.

Further, in the above-mentioned system, said time shift complex signal producing means is not restricted to a specific structure. For example: it is acceptable that said time shift complex signal producing means includes an A/D converter for converting real part and imaginary part of the first complex signal in the form of analog into digital signals, respectively, using a sampling clock consisting of clock pulses having time intervals $\Delta\tau$ corresponding to said time difference $\Delta\tau$, thereby producing the second complex signal in the form of digital and the third complex signal in the form of digital; or it is acceptable that said time shift complex signal producing means includes an A/D converter for converting real part and imaginary part of the first complex signal in the form of analog into digital signals, respectively, using a sampling clock consisting of clock pulses each having a time interval $\Delta\tau$ corresponding to the time difference $\Delta\tau$, wherein 1/N (N: integer) of each of the respective operation time intervals for sequentially calculating a quantity representative of said movement of a plurality of observation points aligned in said predetermined direction within the subject for each observation point is expressed by the time difference $\Delta\tau$, thereby producing the second complex signal in the form of digital and the third complex signal in the form of digital.

Further, it is acceptable that said time shift complex signal producing means includes an A/D converter for converting real part and imaginary part of the first complex signal in the form of analog into digital signals, respectively, using a sampling clock having plurality of clock pulses of the time difference $\Delta\tau$ within a period, said period being equivalent to each of the respective operation time intervals for sequentially calculating a quantity representative of said movement of a plurality of observation points aligned in said predetermined direction within the subject for each observation point, thereby producing the second complex signal in the form of digital and the third complex signal in the form of digital.

Further, it is acceptable that said time shift complex signal producing means includes an A/D converter for converting both real part and imaginary part of the first complex signal in the form of analog into digital signals, using a plurality of sampling clocks mutually shifted in phase by the time difference $\Delta\tau$, respectively, thereby producing the second complex signal in the form of digital and the third complex signal in the form of digital.

Further, it is acceptable that said time shift complex signal producing means includes a thinning filter for thinning the first complex signal in the form of digital with a sampling interval of 1/N (N: integer) of the time difference $\Delta\tau$, thereby producing the second complex signal in the form of digital and the third complex signal in the form of digital, said second and third complex signals being mutually shifted by the time difference $\Delta\tau$.

Further, it is acceptable that said time shift complex signal producing means includes an interpolating means for interpolating the first complex signal in the form of digital, thereby producing the second complex signal in the form of digital and the third complex signal in the form of digital, said second and third complex signals being mutually shifted by the time difference $\Delta\tau$.

Still further, it is acceptable that said time shift complex signal producing means includes an A/D converter for converting real part and imaginary part of the first complex signal in the form of analog into digital signals including the second complex signal, respectively, using a predetermined sampling clock, and interpolating arithmetic means for practicing an interpolating operation to said digital signals to produce the third complex signals; or that said time shift complex signal producing means includes an A/D converter for converting real part and imaginary part of the first complex signal in the form of analog into digital signals including the second complex signal, respectively, using a sampling clock consisting of clock pulses each having a time interval corresponding to 1/N (N: integer) of each of the respective operation time intervals for sequentially calculating a quantity representative of said movement of a plurality of observation points aligned in said predetermined direction within the subject for each observation point, and interpolating arithmetic means for practicing an interpolating operation to said digital signals to produce the third complex signals; or that said time shift complex signal producing means includes an A/D converter for converting real part and imaginary part of the first complex signal in the form of analog into digital signals including the second complex signal, respectively, using a sampling clock having plurality of clock pulses of a predetermined time difference within a period, said period being equivalent to each of the respective operation time intervals for sequentially calculating a quantity representative of said movement of a plurality of observation points aligned in said predetermined direction within the subject for each observation point, and interpolating arithmetic means for practicing an interpolating operation to said digital signals to produce the third complex signals, or that said time shift complex signal producing means includes an A/D converter for converting both real part and imaginary part of the first complex signal in the form of analog into digital signals including the second complex signal, using a plurality of sampling clocks mutually shifted in phase, respectively, and interpolating arithmetic means for practicing an interpolating operation to said digital signals to produce the third complex signals.

Furthermore, in the second system of the present invention as described above, said movement quantity calculating means calculates a time difference $\Delta t(t)_{i,i+1}$ between time point-to-point which are involved in reflection of ultrasonic pulse beams from the observation point in i-th and (i+1)th of transmissions of the ultrasonic pulse beam in the predetermined direction, respectively, wherein the respective reference time points of transmissions of ultrasonic pulse beams are each selected as a starting point regarding the associated reflection, on the basis of an equation set forth below:

$$\Delta t(t)_{i,i+1} = [\Delta\theta_{i,i+1}(t)/\{\Delta\theta_{i,i}(t,\Delta\tau) - \omega_o \Delta\tau\}] \cdot \Delta\tau$$

where $\Delta\theta_{i,i}(t,\Delta\tau)$ denotes a phase difference, at time point of the time t, of the first and second complex signals associated with the i-th transmission of the ultrasonic pulse beam in said predetermined direction, which phase difference is calculated from the complex correlation value $C_{i,i}(t, \Delta\tau)$; and $\Delta\theta_{i,i+1}(t)$ denotes a phase difference, at time point of the time t, of the first complex signal-to-first complex signal which are associated with the i-th and (i+1)th of transmissions of the ultrasonic pulse beam in said predetermined direction, respectively.

Further, in another aspect, said movement quantity calculating means calculates, as a quantity representative of said movement, at least one selected from among a time difference $\Delta t$ between time point-to-point which are involved in reflection of ultrasonic pulse beams from the observation point in i-th and (i+1)th of transmissions of the ultrasonic pulse beam in the predetermined direction, respectively, wherein the respective reference time points of transmissions of ultrasonic pulse beams are each selected as a starting point regarding the associated reflection; a movement quantity of said observation point calculated on the basis of said time difference $\Delta t$ and an ultrasonic velocity c within the subject; and a movement velocity of said observation point calculated on the basis of said movement quantity and a repetitive period T of transmissions of the ultrasonic pulse beam in said predetermined direction.

It is preferable that said movement quantity calculating means determines a quantity representative of said movement subjected to a smooth process with respect to a plurality of said time difference $\Delta t$; and/or that said movement quantity calculating means determines a quantity representative of said movement subjected to a smooth process with respect to transmissions of the ultrasonic pulse beam in said predetermined direction three times or more.

Still furthermore, in the second system of the present invention as described above, it is preferable that the system further comprises space differentiation means for space-differentiating a quantity representative of said movement calculated by said movement quantity calculating means to determine a rate of change of the quantity representative of said movement with respect to said predetermined direction. Also, it is preferable that the system further comprises information extraction means for extracting blood information, which the second complex signal and the third signal carry, from clutter component of information with separation. And also it is preferable that the system further comprises display means for displaying a quantity representative of said movement and/or a quantity calculated on the basis of the quantity representative of said movement through superposing those on the tomographic image.

To attain the above-mentioned third object of the invention, according to the third ultrasonic diagnostic system of the present invention, there is provided an ultrasonic diagnostic system wherein received signals are generated in such a manner that ultrasonic pulse beams are transmitted within a subject and reflecting ultrasonic waves from an inside of the subject are received, said system comprising:

(3_1) complex signal conversion means for converting the received signal into a complex signal consisting of two signals which quadrate with each other;

(3_2) quadratic complex auto-correlation arithmetic means for calculating quadratic complex auto-correlation values of said complex signal-to-complex signal which are involved in transmissions of ultrasonic pulse beams at mutually different time points along a predetermined scan line, respectively, when ultrasonic pulse beams are repeatedly transmitted along the predetermined scan line extending a depth direction within the subject, and said complex signal-to-complex signal which are involved in the associated ones of a plurality of depth positions on said scan line, respectively; and (3_3) velocity gradient calculating means for calculating a velocity gradient within the subject on the basis of said quadratic complex auto-correlation values.

In the above-mentioned system, it is acceptable that (3_4) said quadratic complex auto-correlation arithmetic means calculates complex auto-correlation values of said complex signal-to-complex signal which are associated with mutually different depth positions on the predetermined scan line, respectively, on each of said complex signals associated with transmissions of ultrasonic pulse beams at mutually different time points, and thereafter calculates complex auto-correlation values of said complex auto-correlation value-to-complex auto-correlation value associated with transmissions of ultrasonic pulse beams at mutually different time points;

(3_5) said quadratic complex auto-correlation arithmetic means calculates complex auto-correlation values of said complex signal-to-complex signal which are involved in a same depth position, in transmissions of ultrasonic pulse beams at mutually different time points along the predetermined scan line, respectively, on each of a plurality of depth positions, and thereafter calculates complex auto-correlation values of said complex auto-correlation value-to-complex auto-correlation value, which are associated with mutually different depth positions; or (3_6) said quadratic complex auto-correlation arithmetic means performs simultaneously both the operations on a complex auto-correlation of complex signal-to-complex signal associated with mutually different transmissions and a complex auto-correlation of complex signal-to-complex signal associated with a depth direction.

The quadratic complex auto-correlation arithmetic means in item (3_2) includes all aspects of items (3_4) to (3_6), and it is sufficient that the above mentioned quadratic complex auto-correlation value is calculated.

1(3_7) While it is acceptable that the quadratic complex auto-correlation arithmetic means in item (3_2) calculates a single quadratic complex auto-correlation value to determine a velocity gradient as to a single depth position on a predetermined scan line, (3_8) it is also acceptable that the quadratic complex auto-correlation arithmetic means in item (3_2) calculates a plurality of quadratic complex auto-correlation values to determine the velocity gradient as to the single depth position.

Further, it is also acceptable that (3_9) the quadratic complex auto-correlation arithmetic means in item (3_2) calculates complex auto-correlation values of said complex signal-to-complex signal which are involved in a same depth position, in transmissions of ultrasonic pulse beams at mutually different time points along the predetermined scan line, respectively, on each of a plurality of depth positions, and thereafter calculates complex auto-correlation values of said complex auto-correlation value involved in a predetermined depth position and said complex auto-correlation values which are involved in associated ones of a plurality of depth positions, respectively.

Still further, it is also acceptable that (3_10) the quadratic complex auto-correlation arithmetic means in item (3_2) calculates complex auto-correlation values of said complex signal-to-complex signal which are involved in a same depth position, in transmissions of ultrasonic pulse beams at mutually different time points along the predetermined scan line, respectively, on each of a plurality of depth positions, and thereafter performs a complex auto-correlation operation on a first set comprising said complex auto-correlation values associated with a plurality of depth positions, and a second set comprising said complex auto-correlation values associated with a plurality of depth positions, which are permitted to overlap said complex auto-correlation values constituting the first set.

In the third system according to the present invention, (3_11) the quadratic complex auto-correlation arithmetic means in item (3_2) is adapted for determining a plurality of said complex auto-correlation values with respect to a plurality of depth positions to evaluate a velocity gradient as to a predetermined depth position, and the velocity gradient calculating means in item (3_3) is adapted for determining phase messages involved in each of said plurality of said complex auto-correlation values to evaluate the velocity gradient as to said predetermined depth position through regression of a predetermined odd function to the determined phase messages.

In this case, it is preferable that said predetermined odd function is a straight line.

Further, in the third system according to the present invention, (3_12) the quadratic complex auto-correlation arithmetic means in item (3_2) is adapted for determining a plurality of said complex auto-correlation values with respect to a plurality of depth positions to evaluate a velocity gradient as to a predetermined depth position, and the velocity gradient calculating means in item (3_3) is adapted for calculating a complex auto-correlation value of said complex auto-correlation value-to-said complex auto-correlation value to evaluate the velocity gradient as to said predetermined depth position on the basis of the thus determined complex auto-correlation value.

The velocity gradient calculating means in item (3_3) is typically provided with a quadrature detector for performing a quadrature detection for the received signals using two sine wave signals, which are mutually different in phase by 90°, as a reference signal, thereby converting said received signals into the complex signal.

Still further, in the third system according to the present invention, it is preferable that the system further comprises smoothing means for smoothing the velocity Gradient calculated by said velocity Gradient calculating means; and also it is preferable that the system further comprises information extraction means for extracting blood information, which the complex signal carries, from clutter component of information with separation; and still also it is preferable that the system further comprises display means for displaying the velocity gradient instead of a tomographic image or a color doppler image, or superposing upon the tomographic image or the color doppler image with different colors from those.

Where the color doppler image implies an image in which a blood flow and a movement of the tissue are displayed with the associated colors.

A blood flow velocity and a velocity $V(j, t_i)$ of a movement of the tissue are proportional to a phase difference $\Delta\theta(j, t_i)$ which is obtained through performing an inverse tangent (atan) operation on a complex auto-correlation value $Cor(j, t_i)$ shown in equation (1) according to equation (2) (cf. equation (3)). In other words, the velocity $V(j, t_i)$ is determined through a non-linear conversion of the complex auto-correlation value $Cor(j, t_i)$.

Applicants of the present application noticed that according to the related art shown in FIG. 43, the velocity $V(j, t_i)$ is subjected to an average process after the non-linear conversion processing, and hence a sufficient enhancement of detection precision cannot be expected. Under such a recognition, the first ultrasonic diagnostic system according to the present invention has been completed.

Specifically, according to the first ultrasonic diagnostic system of the present invention, an average value of complex auto-correlation values before a non-linear conversion (atan) arithmetic operation is evaluated, and thereafter, the non-linear conversion (atan) arithmetic operation is performed to determine the velocity. Thus, it is possible to remarkably enhance the detection precision and the frame rate.

Now let us estimate, referring to FIG. 38(A) by way of example, the degree of enhancement in the frame rate according to the first ultrasonic diagnostic system of the present invention.

In general, even if 8 transmissions are performed with respect to the same direction, in order to detect a blood flow velocity, first data cannot be used as data, since it is contaminated by a clutter component which is different from the subsequent data. The use of a secondary FIR filter as an MTI filter serves to decrease two pieces of data. Consequently, in case of this condition, data available for a complex auto-correlation as in equation (1) is given by n=8−2−1=5. Hence, the number of pieces in the summation in equation (1) assumes 4.

Now let us consider such a case where an average processing is performed on three scan lines which are adjacent to each other as shown in FIG. 38(A). The reason why this situation is supposed is that it is considered that the extent of three adjacent scan lines involves no extreme variation in a blood flow velocity.

Thus, since the number of pieces in the summation in equation (1) assumes 4, the summation as to three adjacent scan lines makes it obtain an average of 4×3=12 pieces, thereby enhancing precision.

Even if the repetitive number of times as to the same scan line direction is reduced up to 6 times, the use of an average as to three adjacent scan lines may avoid danger of degradation of precision, where the number of pieces in the summation assumes (6−2−1−1)=6. In this case, it is possible to raise a frame rate up to 11 as set forth below:

200 μsec×7×64=89.6 msec

1/89.6 msec=11.2

In a case where a movement of the tissue of a living body is detected, it involves further good conditions because detection of the movement needs no MTI filter and thus it does not happen that data is lost. Further, it is the reason that such a condition that an amount of transition is not so varied is more satisfied.

For example, it is assumed that 4 transmissions are performed with respect to the same direction, in order to detect the movement (other conditions are the same as the foregoing). In this case, a frame rate assumes 15 as set forth below:

the number of the summation: 4−1=3

200 μsec×5×64=64.0 msec

1/64 msec=15.6

Even if the transmission number of times as to the same direction is reduced up to 2 times, the use of an average as to three adjacent scan lines makes it possible to raise a frame rate up to 26 as set forth below:

the number of the summation: (2−1)×3=3

200 μsec×3×64=38.4 msec

1/38.4 msec=26.0

While the above description concerns the way of the average with respect to the scan direction, this is the similar as to the matter of the average as to a depth direction and the average on a two-dimensional basis.

Next, there will be explained as to a principle of the second ultrasonic diagnostic system according to the present invention.

A received signal x (t) having only a real part component can be expressed in the format of Fourier series development as shown in the following equation:

$$x_1(t) = \int_{-\infty}^{\infty} C(f) \cos\{2\pi f t + \alpha_1(f)\} df \tag{16}$$

Now, if an analytical signal $z_1(t)$ is expressed by:

$$z_1(t) = x_1(t) + j y_1(t) \tag{17}$$

where $y_1(t)$: Hilbert transformation of $x_1(t)$ then the following formula can be obtained from equations (16) and (17):

$$\begin{aligned} Z_1(t) &= \int_{-\infty}^{\infty} C(f) \cos\{2\pi f t + \alpha_1(f)\} df + \\ &\quad j \int_{-\infty}^{\infty} C(f) \sin\{2\pi f t + \alpha_1(f)\} df \\ &= \int_{-\infty}^{\infty} C(f) \cos\{2\pi (f-f_o) t + \alpha_1(f) + 2\pi f_o t\} dt + \\ &\quad j \int_{-\infty}^{\infty} C(f) \sin\{2\pi (f-f_0) t + \alpha_1(f) + 2\pi f_o t\} dt \\ &= [h_c(t) + j h_s(t)] \exp[j 2\pi f_o t] \\ &= [h_c(t) + j h_s(t)] \exp[j \omega_o t] \end{aligned} \tag{18}$$

where $f_o$: reference frequency of quadrature detection $\omega_o = 2\pi f_o$: reference angular frequency of quadrature detection $h_c(t)$: real part of a complex signal obtained by quadrature detection $h_s(t)$: imaginary part a complex signal obtained by quadrature detection $$h_c(t) = \int_{-\infty}^{\infty} C(f) \cos\{2\pi(f-f_o)t + \alpha_1(f)\} df \tag{19}$$

$$h_s(t) = \int_{-\infty}^{\infty} C(f) \sin\{2\pi(f-f_o)t + \alpha_1(f)\} df$$

Next, assuming that when it is considered that the analytical signal $z_1(t)$ is shifted in its entirety by a movement distance $\Delta x$ along a predetermined direction within the subject, the analytical signal is expressed by $z_2(t)$, the analytical signal $z_2(t)$ is equivalent to a signal $z_2(t)=z_1(t-\Delta\tau)$ which is derived when the analytical signal $z_1(t)$ is shifted by time difference $\Delta\tau=2 \cdot \Delta x/c$ ('2' implies reciprocation of ultrasonic waves during the movement distance $\Delta x$).

Referring to equation (18), the following equation is obtained:

$$\begin{aligned} z_2(t) &= z_1(t-\Delta\tau) \\ &= [h_c(t-\Delta\tau) + j h_s(t-\Delta\tau)] \times \end{aligned} \tag{20}$$

-continued $$\exp[j\omega_0(t - \Delta\tau)]$$

$$= [h_c(t - \Delta\tau) + jh_s(t - \Delta\tau)]$$

$$\exp[j\omega_0 t] \exp[-j\omega_0 \Delta\tau]$$

Comparing equation (20) with equation (18), it will be understood that a phase difference of the analytical signal $z_2(t)$ from the analytical signal $z_1(t)$ is equivalent to summation of a phase difference, which results through shifting the complex signal $[h_c(t)+j\,h_s(t)]$ produced by the quadrature detection by the time difference $\Delta\tau$ corresponding to the movement distance $\Delta x$, and a component $(-\omega_0\Delta\tau)$.

FIG. 1 is a view useful for understanding a principle of the second ultrasonic diagnostic system according to the present invention. In this figure, an axis of abscissas represents time t; and an axis of ordinates a phase quantity. Equation (20) will be explained in details hereinafter.

In FIG. 1, the curve denoted by $\theta_1(t)$ is indicative of a phase signal derived from the quadrature detection signal $[h_c(t)+j\,h_s(t)]$ in equation (18).

That is, the phase signal $\theta_1(t)$ is expressed by:

$$\theta_1(t) = \arctan[h_c(t)/h_s(t)] \quad (21)$$

Further, the curve denoted by $\theta_1(t,\Delta\tau)$ is indicative of a phase signal derived from the quadrature detection signal $[h_c(t-\Delta\tau)+j\,h_s(t-\Delta\tau)]$ which is obtained through shifting the quadrature detection signal $[h_c(t)+j\,h_s(t)]$ by the time difference $\Delta\tau$. That is, the phase signal $\theta_1(t,\Delta\tau)$ is expressed by:

$$\theta_1(t,\Delta\tau) = \arctan[h_c(t-\Delta\tau)/h_s(t-\Delta\tau)] \quad (22)$$

The curve denoted by $\theta_1(t,\Delta\tau)$ corresponds to one in which the curve denoted by $\theta_1(t)$ is shifted by $\Delta\tau$ along the time base t. The curve denoted by $\theta_1(t,\Delta\tau)-\omega_0\Delta\tau$ corresponds to one in which the curve of the phase signal $\theta_1(t,\Delta\tau)$ is shifted by $-\omega_0\Delta\tau$ up and down in the vertical direction in the figure. $\theta_2(t)$ denotes a phase signal which is derived from received signals of ultrasonic pulses transmitted after the lapse of period T since transmission of ultrasonic pulses to obtain received signals contributing to the determination of the phase signal $\theta_1(t)$.

Here, it is intended to calculate the time difference $\Delta t$ shown in FIG. 1, which corresponds to a movement quantity of the subject during a period while time elapses by period T.

As described referring to FIG. 44, when both a received signal and an additional signal, which is obtained through shifting the received signal by a delay time $\Delta\tau$, are subjected to a quadrature detection process, and a phase difference $\Delta\theta_r$ between these signals at time $t_o$ is determined, the phase difference $\Delta\theta_r$ is determined, as an A-C of phase difference in FIG. 1, from the complex correlation value at time $t_o$. Whereas, when a phase difference $\Delta\theta_{1,2}$ obtained from the received signal-to-received signal at time points, which are mutually shifted by an interval T of transmissions of ultrasonic pulse beams, is determined, the phase difference $\Delta\theta_{1,2}$ is determined as an A-D of phase difference.

The determination of the A-C of phase difference $\Delta\theta_r$ and the A-D of phase difference $\Delta\theta_{1,2}$ determines, through their proportional relation:

$$\Delta t = \Delta\theta_{1,2} \cdot \Delta\tau / \Delta\theta_r$$

According to the related art of technique explained referring to FIG. 44, the received signal is delayed and both the signals before and after the delay are subjected to the quadrature detection.

According to the second ultrasonic diagnostic system according to the present invention, instead of direct determination of the A-C of phase difference, a phase signal $\theta_1(t,\Delta\tau)$ is produced in such a manner that the phase signal $\theta_1(t)$ is delayed by the time difference $\Delta\tau$, a phase difference between those phase signals, that is, an A-B of phase difference $\theta_{1,1}(t,\Delta\tau)$ is determined, and the thus determined phase difference $\theta_{1,1}(t,\Delta\tau)$ and a B-C of phase difference: $-\omega_0\Delta\tau$ are added, thereby determining the A-C of phase difference.

That is, the time difference is given by:

$$\Delta t = \frac{A\text{-}D \text{ of phase difference}}{A\text{-}C \text{ of phase difference}} \times (A\text{-}E \text{ of phase difference}) \quad (23)$$

$$= \frac{A\text{-}D \text{ of phase diff.}}{A\text{-}B \text{ of phase diff.} + B\text{-}C \text{ of phase diff.}} \times$$

$(A\text{-}E$ of phase diff.$)$ $$= \frac{\Delta\theta_{1,2}(t)}{\Delta\theta_{1,1}(t,\Delta\tau) - \omega_0\Delta\tau} \times \Delta\tau$$

Where $\Delta\theta_{1,2}(t)$ is calculated from a complex correlation arithmetic of a plurality of complex signal-to-complex signal which are obtained through repetition of transmissions of ultrasonic pulses. $\Delta\theta_{1,1}(t,\Delta\tau)$ is calculated as a phase difference between the quadrature detection signals $[h_c(t)+j\,h_s(t)]$ and $[h_c(t-\Delta\tau)/h_s(t-\Delta\tau)]$.

In other words, according to the second ultrasonic diagnostic system of the present invention, the second complex signal referred to in the second ultrasonic diagnostic system of the present invention is produced in such a manner that the first complex signal referred to in the second ultrasonic diagnostic system of the present invention, which is produced by a complex signal conversion circuit such as a quadrature detector circuit, is shifted by $\Delta\tau$, so that a phase difference (A-B of phase difference shown in FIG. 1) $\Delta\theta_{1,1}(t,\Delta\tau)$ between the first and second quadrature detection signals. Therefore, according to the second ultrasonic diagnostic system of the present invention, it is essentially sufficient for the complex signal conversion circuit to be prepared for a single system only, and thus it is possible to detect a movement of the subject with high precision with a simplified circuit in an arrangement. In this case, different from the case disclosed in Japanese Patent Laid Open Gazette No. 286751/1993 in which a quadrature detection circuit is prepared for a single system only, according to the second ultrasonic diagnostic system of the present invention, it is possible to simultaneously derive the second and third complex signals each apart from by $\Delta\tau$ through one time transmission of an ultrasonic beam. Consequently, this involves no such a problem that the correcting effect is reduced owing to the fact that the subject moves during the repetition.

Next, there will be explained as to a principle of the third ultrasonic diagnostic system according to the present invention.

According to the related art as mentioned above, the complex signal is temporarily converted into a velocity in accordance with equations (9) and (12), and thereafter the velocity is differentiated, as shown in equation (13), with respect to a depth direction (z-direction), thereby calculating a gradient dV/dz of the velocity V as to the depth direction. This is a cause of an error in the velocity. As mentioned above, the error of the velocity V occurs, as seen in FIG. 45 (A), at such a point that an angle exceeds $\pi$ in a polar coordinates. A phase difference between point A in depth and point B in depth is logically given by $\Delta\theta_B - \Delta\theta_A$. Whereas, according to the related art, the complex signal is temporarily converted into velocity V. This results in performing, in equivalence, the following operation:

$$(\Delta\theta_B - 2\pi) - \Delta\theta_A = (\Delta\theta_B - \Delta\theta_A) - 2\pi \quad (24)$$

This involves $2\pi$ in the error.

In order to solve this problem, according to the present invention, there is calculated a complex auto-correlation value with respect to a depth direction (z-direction) along a predetermined scan line, of a complex auto-correlation value with respect to an interval (referred to as "repetitive direction" hereinafter) at which ultrasonic beams are repeatedly transmitted along the predetermined scan line.

First, equations (12) and (13) are modified as follows:
Regarding equation (12), $$V = (c/2\omega_o T)\langle \Delta_i \theta \rangle \quad (25)$$

Where a symbol $\Delta$, which denotes differential (or difference) in equation (12), is replaced by a symbol $\Delta_i$ to clarify that it is differential (or difference) involved in the repetitive direction. That is, $\langle \Delta_i \theta \rangle$ denotes an expected value of a phase difference $\Delta_i \theta$ between i-th transmission of an ultrasonic beam along a predetermined same scan line and (i+1)-th transmission of an ultrasonic beam.

Regarding equation (13), the velocity gradient dV/dz is expressed by:

$$dV/dz = (1/\Delta z)(c/\omega_o T)\{\langle \Delta_i\theta_{j+1}\rangle - \langle \Delta_i\theta_j\rangle\} = (1/\omega_o T \Delta t)\langle \Delta_z \Delta_i \theta \rangle \quad (26)$$

Where $\Delta_z$ denotes a distance between the j-th observation point in the z-direction and the (j+1)-th observation point, and $\Delta_z$ implies that it is differential (or difference) involved in the z-direction. That is, $\langle \Delta_z \Delta_i \theta \rangle$ denotes an expected value of a difference $\Delta_z \Delta_i \theta$ of the phase difference $\Delta_i \theta$ involved in the repetitive direction (i-direction) with respect to the depth direction.

Now, a method of calculating the expected value $\langle \Delta_z \Delta_i \theta \rangle$ will be explained referring to FIG. 2.

FIG. 2 is a view useful understanding a principle of the third ultrasonic diagnostic system according to the present invention, in which ultrasonic beams are transmitted a plurality of number of times along the same scan line, and an assembly of received complex signal data are illustrated on a typical basis.

Referring to FIG. 2, an one aspect of the present invention will be explained. Since the receiving time $t_j$ of received signal on one time transmission of an ultrasonic beam is associated with a depth position along the scan line, the symbol $t_j$ representative of time is used also as the symbol representative of the depth position as it is.

A complex auto-correlation value at depth $t_j$ is expressed, in accordance with equation (8), by the following equation:

$$\langle C_{i,i+1}(t_j)\rangle_i = \Sigma z_i(t_j)^* z_{i+1}(t_j) \quad (27)$$

Where $\langle \ldots \rangle_i$ denotes equalizing operation with respect to a repetitive direction i, and the symbol * denotes a complex conjugate. The equalizing operation is replaced by the summation $\Sigma$ involved in the repetitive direction i, as shown in equation (27). Likely, the complex auto-correlation value involved in the depth $t_{j+1}$ is expressed by:

$$\langle C_{i,i+1}(t_{j+1})\rangle_i = \Sigma z_i(t_{j+1})^* z_{i+1}(t_{j+1}) \quad (28)$$

A complex auto-correlation value (referred to as a quadratic complex auto-correlation value) of equations (27) and (28), as set forth below:

$$\langle C_{i,i+1}(t_j)\rangle_i^* \langle C_{i,i+1}(t_{j+1})\rangle_i \quad (29)$$

on which arithmetic is performed. And $\langle \Delta_z \Delta_i \theta \rangle$ is calculated in accordance with the following equation:

$$\langle \Delta_z \Delta_i \theta \rangle = \tan^{-1} \frac{\text{imaginary part } [\langle C_{i,i+1}(t_j)\rangle_i * \langle C_{i,i+1}(t_{j+1})\rangle_i]}{\text{real part } [\langle C_{i,i+1}(t_j)\rangle_i * \langle C_{i,i+1}(t_{j+1})\rangle_i]} \quad (30)$$

Performing the above arithmetic allows to determine directly a velocity gradient dV/dz without calculating the velocity V. Even in case of such a velocity that "phase jump" as shown in FIG. 45(B) occurs, there exists actually almost no such an extremely high speed movement within the subject that a difference between the phase differences expressed by equation (30), or a difference between the phase differences $\Delta\theta_A$ and $\Delta\theta_B$ as shown in FIG. 45(A), exceeds $2\pi$. Therefore, it is possible to calculate the velocity gradient with great accuracy, as shown in FIG. 45(D).

Incidentally, in the above, to simplify the explanation, the explanation is made to depth $t_j$ and depth $t_{j+1}$ only. However, in case of the use of data of a plurality of points $(t_j, t_{j+1}, t_{j+2}, t_{j+3}, \ldots,)$ with respect to the depth direction, equation (29) can be expressed as follows:

$$\langle\langle C_{i,i+1}(t_j)\rangle_i * \langle C_{i,i+1}(t_{j+1})\rangle_i\rangle_j = \quad (31)$$

$$\sum_j \left[ \sum_i z_i(t_j) * z_{i+1}(t_j) \right] * \left[ \sum_i z_i(t_{j+1}) * z_{i+1}(t_{j+1}) \right]$$

Where $\langle \ldots \rangle_j$ denotes equalizing operation with respect to a depth direction j. From equation (31), a difference of the phase differences corresponding to equation (30) can be expressed as follows:

$$\langle \Delta_z \Delta_i \theta \rangle = \quad (32)$$

$$\tan^{-1} \frac{\text{imaginary part } [\langle\langle C_{i,i+1}(t_j)\rangle_i * \langle C_{i,i+1}(t_{j+1})\rangle_i\rangle_j]}{\text{real part } [\langle\langle C_{i,i+1}(t_j)\rangle_i * \langle C_{i,i+1}(t_{j+1})\rangle_i\rangle_j]}$$

According to the above explanation, a complex auto-correlation value as to the repetitive direction i is calculated, and then an additional complex auto-correlation value as to the depth direction of the former complex auto-correlation value is calculated. However, the order of arithmetic is not restricted to this. Specifically, it is acceptable to perform the following equation as one corresponding to equation (31), and also acceptable to interchange the order of summation arithmetic as to i, j and k in the following equation.

$$\langle\langle C_{i,i+1}(t_j)\rangle_i * \langle C_{i,i+1}(t_{j+1})\rangle_i\rangle_j = \quad (31)$$

$$j\Sigma \, k\Sigma \, i\Sigma \, z_k(t_j) \, z_{k+1}(t_j)] * z_i(t_{j+1}) * z_{i+1}(t_{j+1})$$

According to the third ultrasonic diagnostic system of the present invention, as mentioned above, the velocity gradient is determined without passing through a process for the velocity V, and thus it is possible to calculate the velocity gradient with great accuracy, without involving a problem of the wrap around of the phase.

As mentioned above, according to the present invention, the order of arithmetic is not asked, but determining first the complex auto-correlation value $\langle C_{i,i+1}(t)\rangle$ of the complex signal-to-complex signal as to the repetitive direction (an interval between i-th and (i+1)-th transmissions of ultrasonic beams) makes it possible to determine not only the velocity gradient, but also the velocity on the basis of the determined complex auto-correlation value $<C_{i,i+1}(t)>$ in accordance with equations (9) and (12).

Further, it is acceptable that the velocity gradient calculating means in the third ultrasonic diagnostic system of the present invention calculates the velocity gradient dV/dz on the basis of equations (32) and (26) each time, but it is also acceptable to beforehand store a corresponding table of the quadratic complex auto-correlation value and the velocity gradient, or a corresponding table of the arithmetic result of equation (32) and the velocity gradient, and determine the velocity gradient using such corresponding tables. This is the similar as to the matter of various aspects of the third ultrasonic diagnostic system of the present invention, which-aspects will be described hereinafter.

Next, there will be described other aspects of the third ultrasonic diagnostic system of the present invention, referring to FIGS. 3 and 4.

The respective complex auto-correlation values as to the repetitive directions i on the depths $t_j$, $t_{j+1}$, $t_{j+2}$, $t_{j+3}$, ... (where $t_{j+1}-t_j=\Delta t$) are expressed, in a similar fashion to equations (27) and (28), as follows (cf. a part (b) in FIG. 3):

$$<C_{i,i+1}(t_j)>_i = \sum_{i=1}^{5} Z_i(t_j) * Z_{i+1}(t_j) = \quad (34)$$

$$\sum_{i=1}^{5} (X_i(t_j) X_{i+1}(t_j) + Y_i(t_j) Y_{i+1}(t_j)) +$$

$$j \sum_{i=1}^{5} (X_i(t_j) Y_{i+1}(t_j) - X_{i+1}(t_j) Y_i(t_j))$$

$$<C_{i,i+1}(t_{j+1})>_j = \sum_{i=1}^{5} Z_i(t_{j+1}) * Z_{i+1}(t_{j+1}) = $$

$$\sum_{i=1}^{5} (X_i(t_{j+1}) X_{i+1}(t_{j+1}) + Y_i(t_{j+1}) Y_{i+1}(t_{j+1})) +$$

$$j \sum_{i=1}^{5} (X_i(t_{j+1}) Y_{i+1}(t_{j+1}) - X_{i+1}(t_{j+1}) Y_i(t_{j+1}))$$

$$<C_{i,i+1}(t_{j+2})>_j = \ldots$$

Incidentally, as a matter of convenience of the illustration, it has been expressed assuming such a case where the significant repetitive data $i=1_a 5$.

Assuming that depth $t_{j+1}$ is noticed as a predetermined depth position, a complex auto-correlation value (or quadratic complex auto-correlation value referred to in the present invention) of a complex auto-correlation value $<C_{i,i+1}(t_{j+2})>_j$ in equation (34), which is associated with the predetermined depth position, and complex auto-correlation values $<C_{i,i+1}(t_{j+2+k})>_j$ in equation (34) (k denotes shift quantity k=0, ±1, ±2, ...), which are associated with depth positions adjacent to the predetermined depth position, respectively, is expressed by the following equation (cf. a part (c) in FIG. 4):

$$R(k;t_{j+2})=<C_{i,i+1}(t_{j+2+k})>_j<C_{i,i+1}(t_{j+2})>_j^* \quad (35)$$

A phase determined from equation (35) is expressed as follows (cf. a part (d) in FIG. 4):

$$\angle R(k; t_{j+2}) = \Delta_k \Delta_i \theta(j+2) \quad (36)$$

-continued $$= \tan^{-1} \frac{\text{imaginary part }[R(k; t_{j+2})]}{\text{real part }[R(k; t_{j+2})]}$$

The phase $\angle R(k;t_{j+2})$ is located, as seen in FIG. 5, substantially on a straight line passing through the origin taking shift quantity k as a variable, in a case where the velocity Gradient is substantially constant in the vicinity of the depth $t_{j+2}$. Calculating a gradient of the phase $\angle R(k;t_{j+2})$ makes it possible to detect an amount of extension and contraction of the depth $t_{j+2}$ within the subject. As seen from FIG. 5, since the phase $\angle R(k;t_{j+2})$ passes through the origin, regression of the phase to an odd function permits to determine the Gradient. Here, as the simplest example of the odd function, there will be explained the case regarding regression to the straight line. Further, for the purpose of simplification, there will be explained the case of k=0,±1,±2 only. Here, there is given the following definition:

$$y_0 = \angle R(-2; t_{j+2}), \ x_0 = j \quad (37)$$

$$y_1 = \angle R(-1; t_{j+2}), \ x_1 = j + 1$$

$$y_2 = \angle R(0; t_{j+2}), \ x_2 = j + 2$$

$$y_3 = \angle R(1; t_{j+2}), \ x_3 = j + 3$$

$$y_4 = \angle R(2; t_{j+2}), \ x_4 = j + 4$$

In this condition, it is the least squares approximation (line regression) that a and b are determined so as to provide a minimum for the following equation (38):

$$e = \sum_{i=0}^{4} (y_i - ax_i - b)^2 \quad (38)$$

Here, if the following conditions are given:

$$\frac{\partial e}{\partial a} = 0, \ \frac{\partial e}{\partial b} = 0 \quad (39)$$

Then the following equation is valid:

$$\begin{pmatrix} a \\ b \end{pmatrix} = \begin{pmatrix} \sum_i x_i^2 & \sum_i x_i \\ \sum_i x_i & n \end{pmatrix}^{-1} \begin{pmatrix} \sum_i x_i y_i \\ \sum_i y_i \end{pmatrix} \quad (40)$$

Consequently, the gradient of phase $\angle R(k,t_{j+2})$ can be calculated in the form of factor a, in the above-mentioned case, in accordance with the following equation:

$$a = \frac{n \sum x_i y_i - \sum y_i \sum x_i}{n \sum x_i^2 - (\sum x_i)^2} \quad (41)$$

When the gradient of the phase is determined, the velocity gradient can be calculated in accordance with the following equation:

$$dV/dz = \frac{d}{dz} \left( \frac{c}{2\omega_0 T} <\Delta_i \theta(j+2)>_i \right) \quad (42)$$

$$= \frac{c}{2\omega_0 T} \frac{2}{c} \frac{d}{dt} <\Delta_i \theta(j+2)>_i$$

$$= \frac{1}{\omega_0 T \Delta t} \text{ [gradient } a\text{]}$$

Next, there will be explained further another aspect of the third ultrasonic diagnostic system of the present invention, referring to FIG. 6. A part (b) of FIG. 6 shows, similar to a part (b) of FIG. 4, complex auto-correlation values as to the repetitive directions i on the depths $t_j$, $t_{j+1}$, ...

Equation (34) is to determine, based on a complex auto-correlation value $<C_{i,i+1}(t_{j+2})>_j$ on a predetermined depth $t_{j+2}$, complex auto-correlation values each, of the complex auto-correlation value $<C_{i,i+1}(t_{j+2})>_j$ and the associated one of complex auto-correlation values $<C_{i,i+1}(t_{j+2+k})>_j$ on the respective depths adjacent to the complex auto-correlation value $<C_{i,i+1}(t_{j+2})>_j$. However, instead of this, it is acceptable to calculate correlation as to data set-to-data set each involved in the associated one of the adjacent plural depth positions.

For example, a complex auto-correlation value of three data set-to-set with-depth $t_{j+2}$ in the center is expressed by the following equation (cf. a part (f) of FIG. 6):

$$R(k; t_{j+2}) = \sum_{m=j+2-1}^{j+2+1} <C_{i,i+1}(t_{m+k})>_i <C_{i,i+1}(t_m)>*_i \quad (43)$$

More in general, a complex auto-correlation value of (M+1) data set-to-set (M is an even number) with depth $t_{j+2}$ in the center is expressed by the following equation:

$$R(k; t_{j+2}) = \sum_{m=j+2-M/2}^{j+2+M/2} <C_{i,i+1}(t_{m+k})>_i <C_{i,i+1}(t_m)>*_i \quad (44)$$

Thereafter, performing the same arithmetic as equations (36)–(42) makes it possible to evaluate the velocity gradient.

According to the above-mentioned scheme, after the quadratic complex auto-correlation value $R(K;t_{j+2})$ is determined using equations (35), (43) or (44), the gradient of the phase $\angle R(K;t_{j+2})$ is determined through regression of the phase to the odd function (e.g. a straight line) so that the velocity gradient is detected. However, it is also acceptable to calculate a complex auto-correlation value as to a k-direction on the quadratic complex auto-correlation value $R(K;t_{j+2})$ and determine the velocity gradient on the basis of the calculated complex auto-correlation value. For example, assuming that $R(0;t_{j+2})_d$ $R(4;t_{j+2})$ have been calculated, when their complex auto-correlation is calculated in accordance with the following equation:

$$CR(t_{j+2}) = \sum_{k=1}^{4} R(k; t_{j+2}) R(k-1; t_{j+2})* \quad (45)$$

the velocity gradient is calculated in accordance with the following equation:

$$dV/dz = \frac{1}{\omega_0 T \Delta t} \tan^{-1} \frac{\text{imaginary part } [CR(t_{j+2})]}{\text{real part } [CR(t_{j+2})]} \quad (46)$$

Also, according to anyone of the various aspects of the third ultrasonic diagnostic system of the present invention, it is possible to detect the velocity gradient with great accuracy, without passing through a process for a velocity V, and thus involving no problem concerning the wrap around of the phase.

BRIEF DESCRIPTION OF THE DRAWINGS

FIGS. 39(A)–39(D) are each a diagram useful understanding the operation of the related art;

DESCRIPTION OF THE PREFERRED EMBODIMENTS

Hereinafter,, there will be described embodiments of the present invention.

Figure 1:
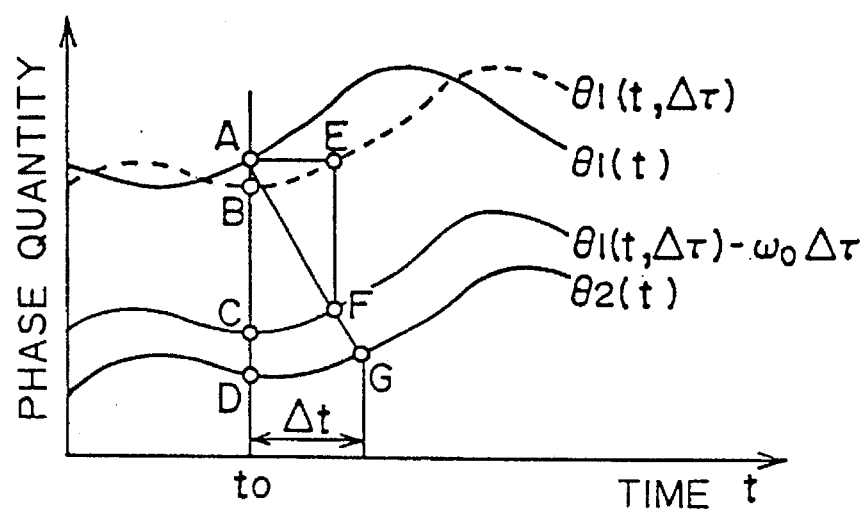
FIG. 1 is a view useful for understanding a principle of the second ultrasonic diagnostic system according to an embodiment of the present invention.
Figure 2:
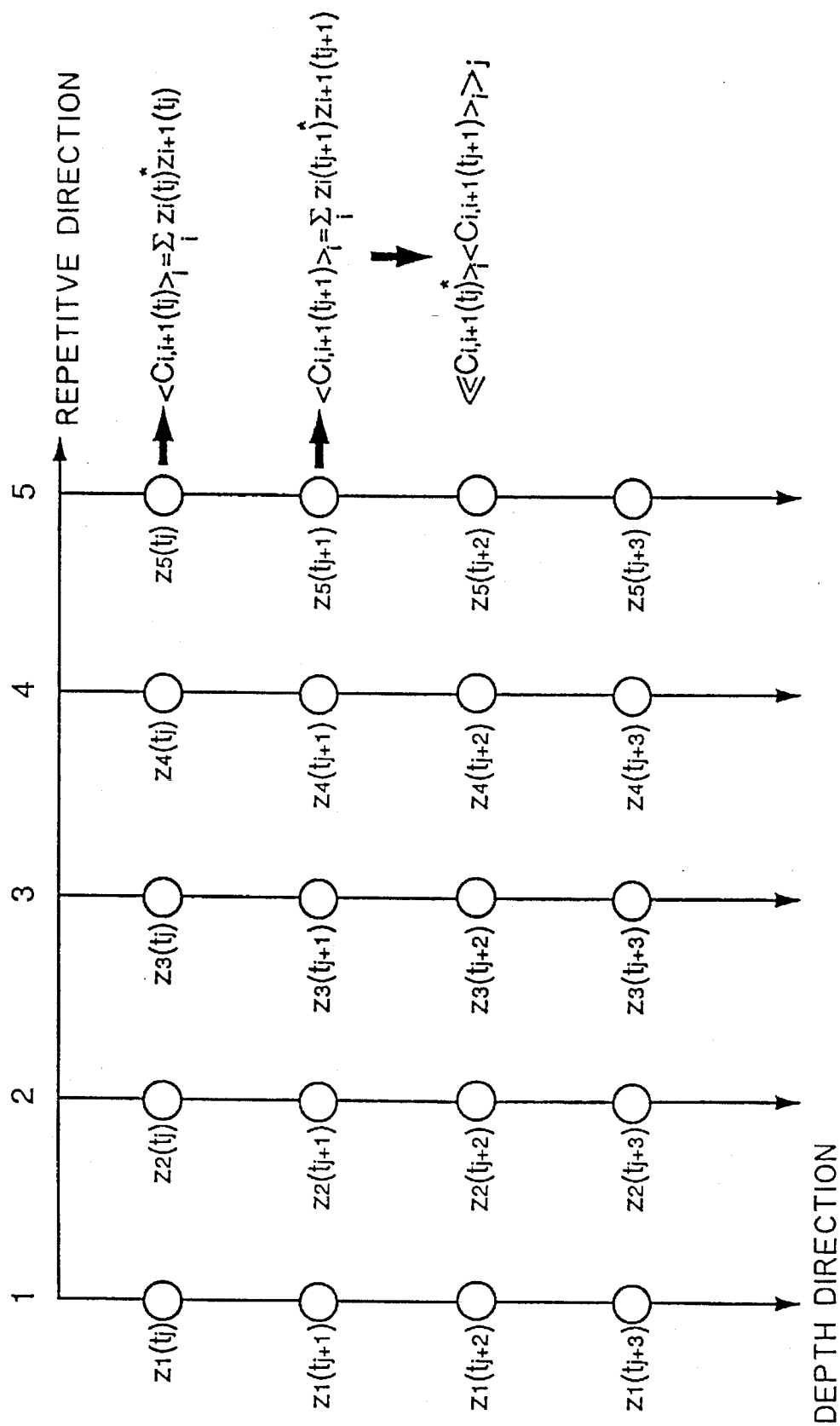
FIGS. 2–6 are each a view useful for understanding a principle of the third ultrasonic diagnostic system according to an embodiment of the present invention.
Figure 3:
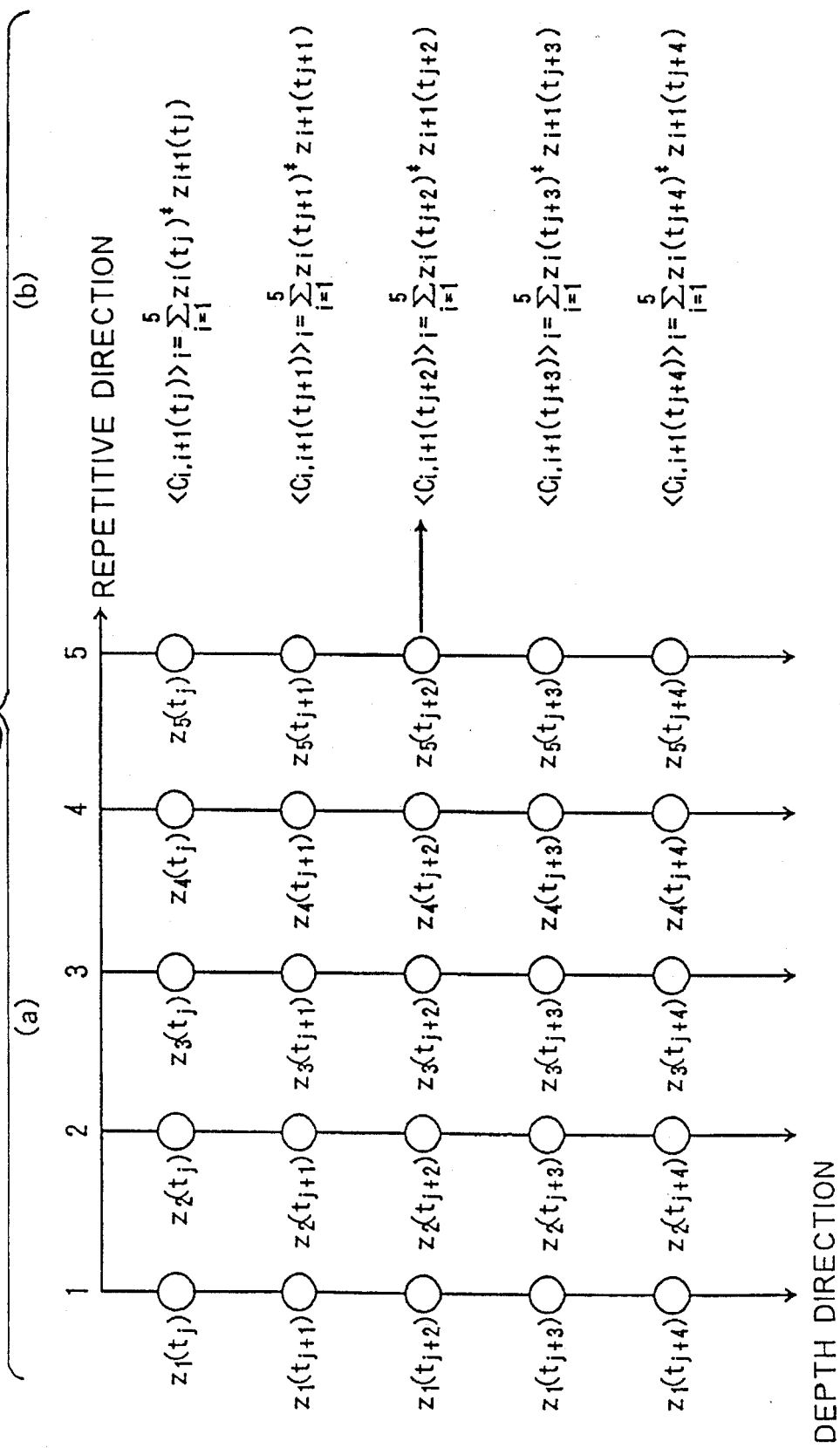
Figure 4:
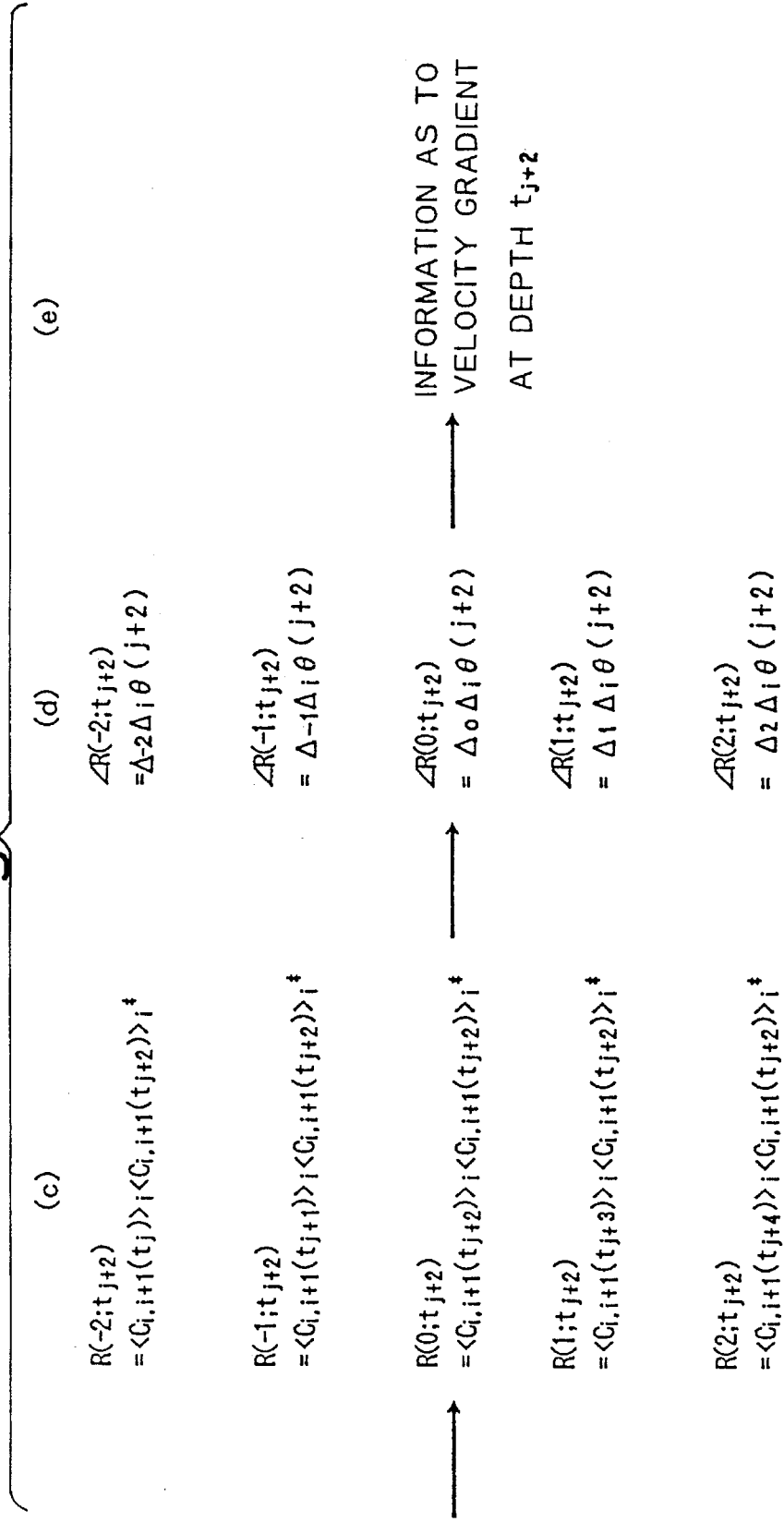
Figure 5:
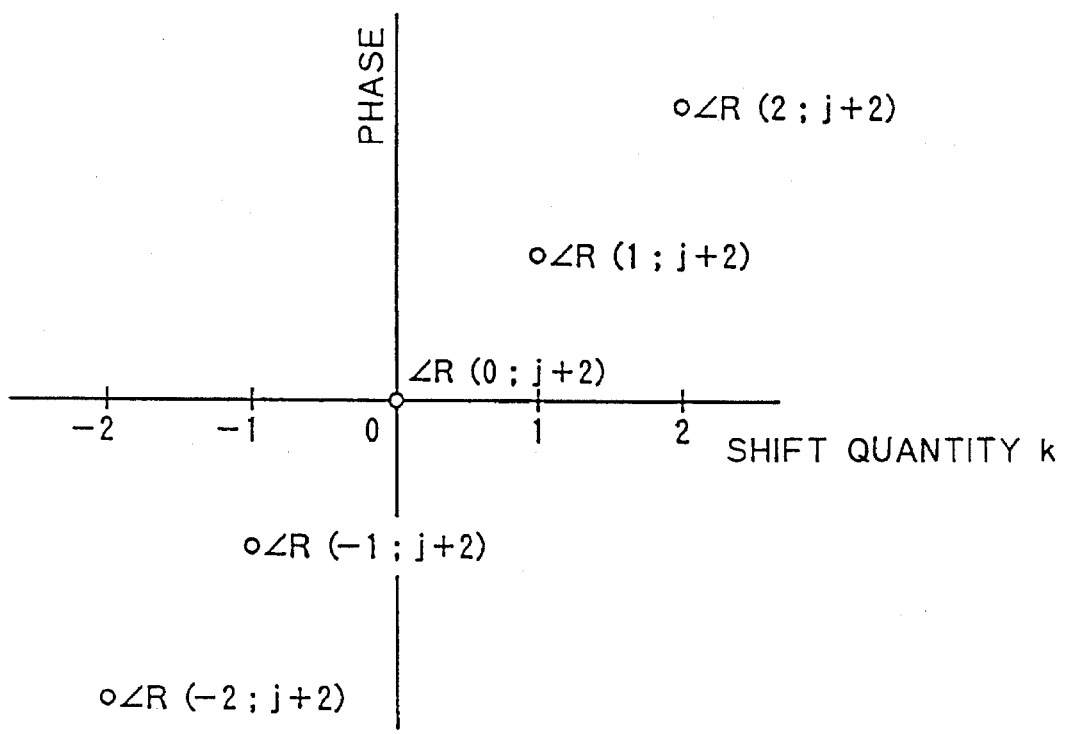
Figure 6:
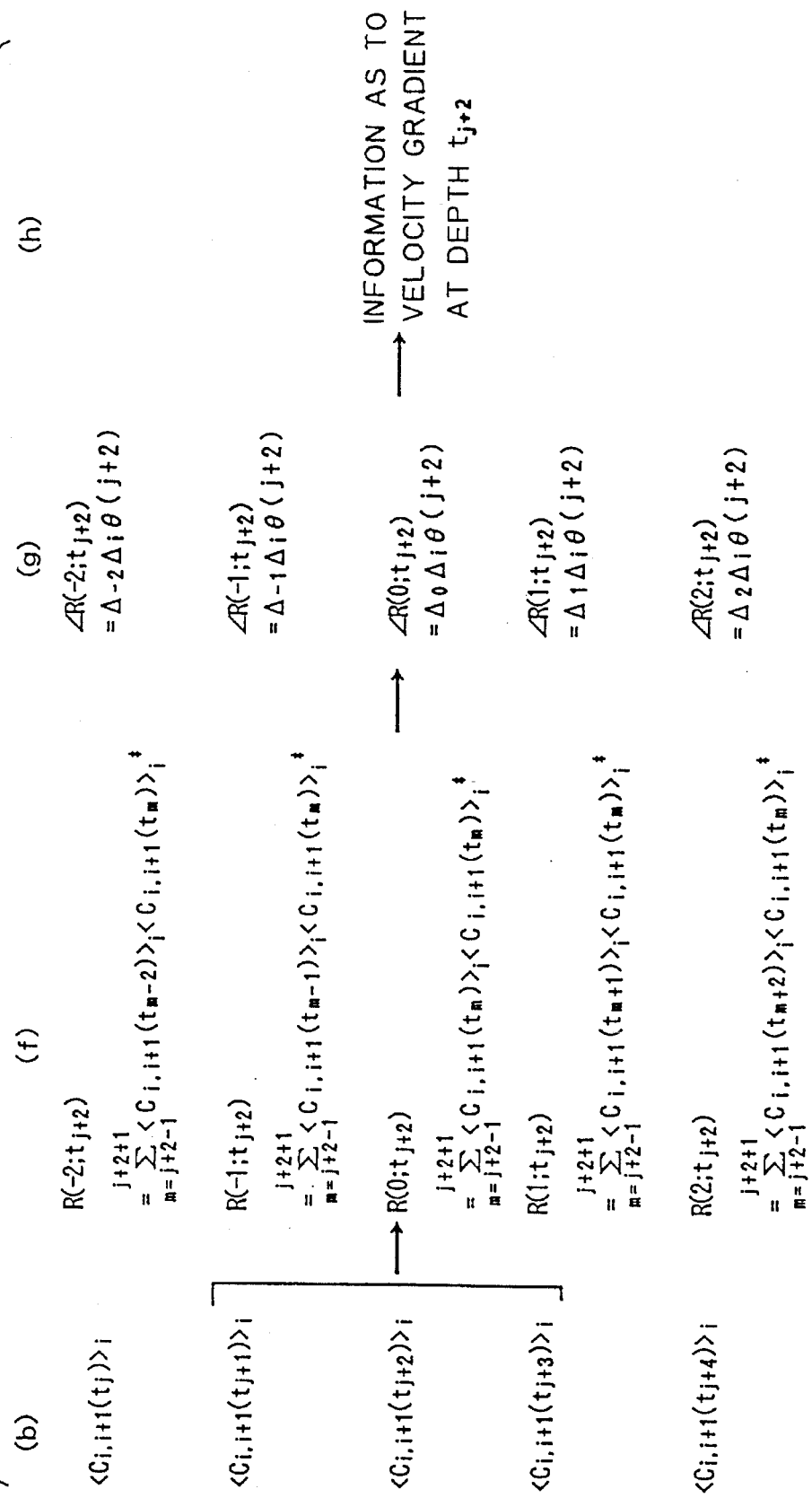
Figure 7:
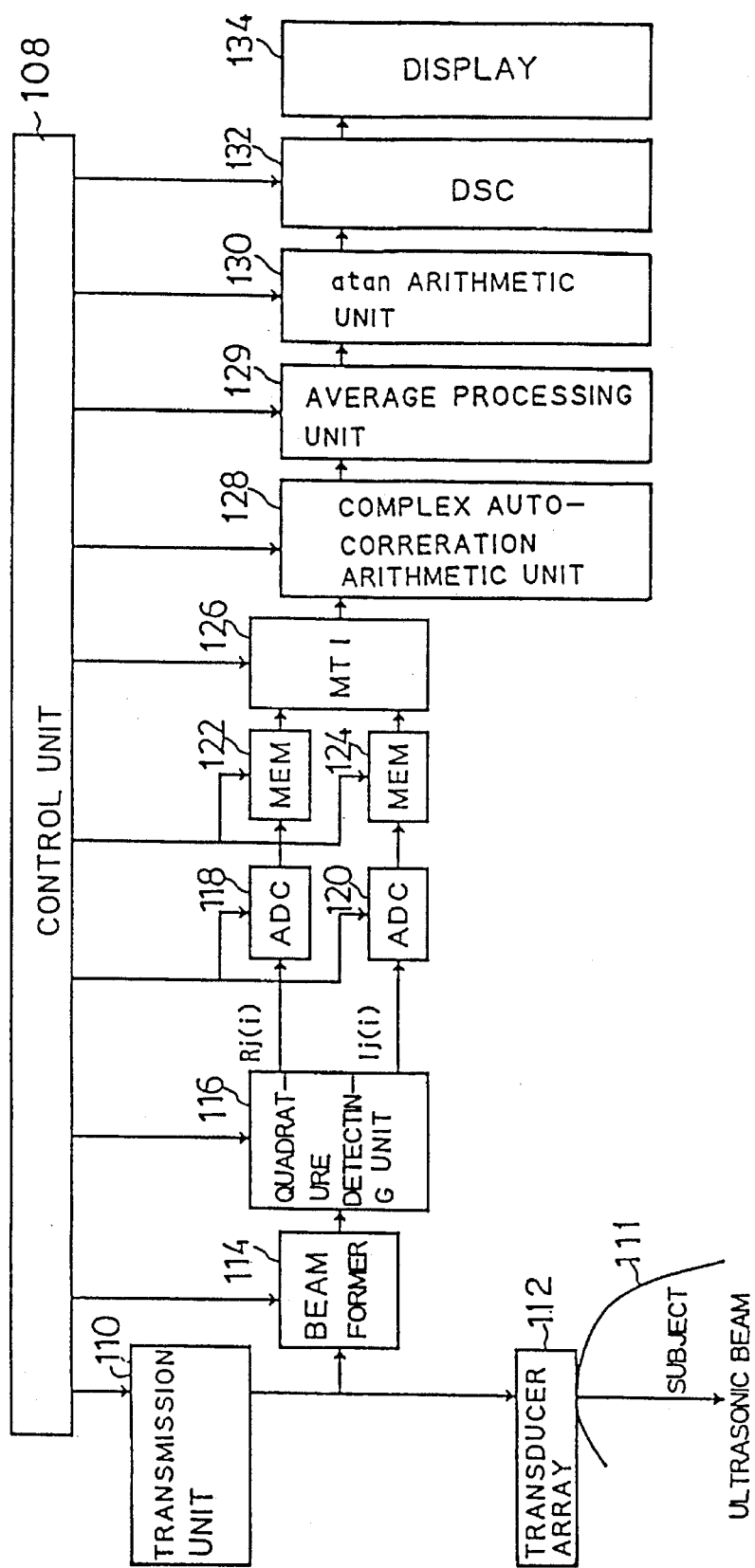
FIG. 7 is a block diagram showing an arrangement for detecting a blood flow velocity in the first ultrasonic diagnostic system according to an embodiment of the present invention.

FIG. 7 is a block diagram showing an arrangement for detecting a blood flow velocity in the first ultrasonic diagnostic system according to an embodiment of the present invention. In FIG. 7 and the following figures, the same parts are denoted by the same reference numbers as those of the above-referenced figures, and the redundant description will be omitted.

Figure 37:
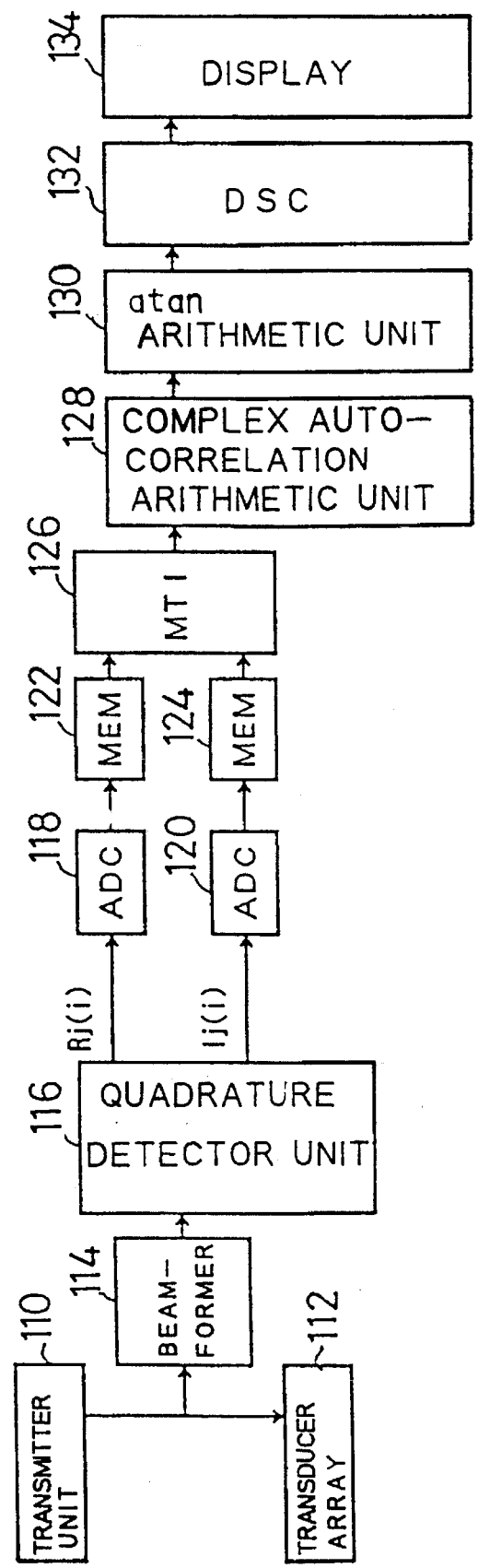
FIG. 37 is a block diagram showing an arrangement for detecting a blood flow velocity in the related art of ultrasonic diagnostic system.
Figure 38C:
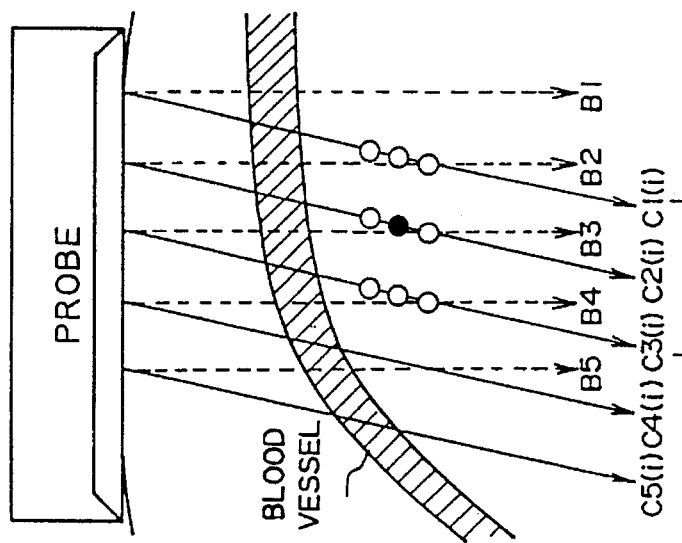
FIGS. 38(A)–38(C) are each a typical illustration of scan lines within the subject in a case where a blood flow velocity is detected.
Figure 38B:
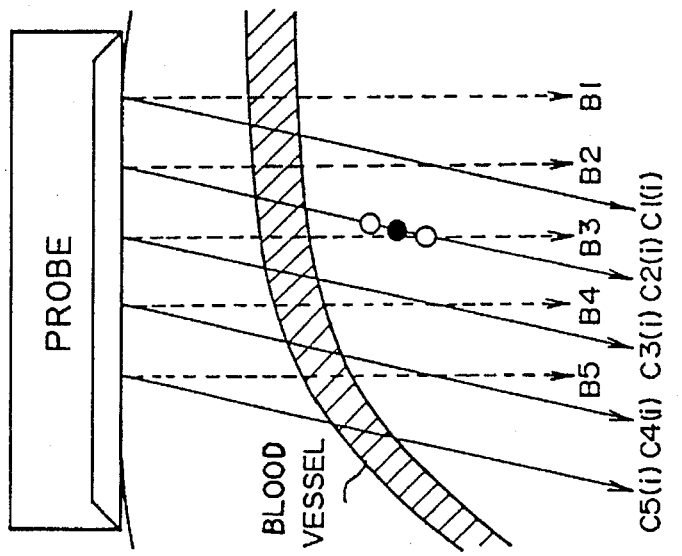
Figure 38A:
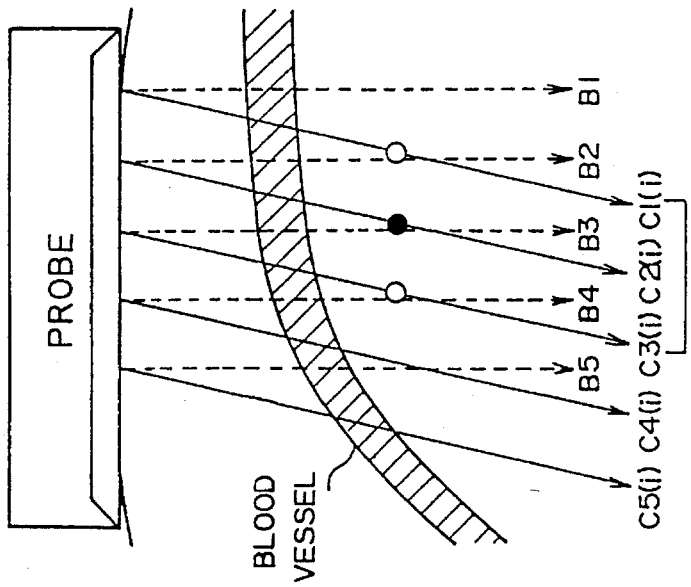
Figure 43:
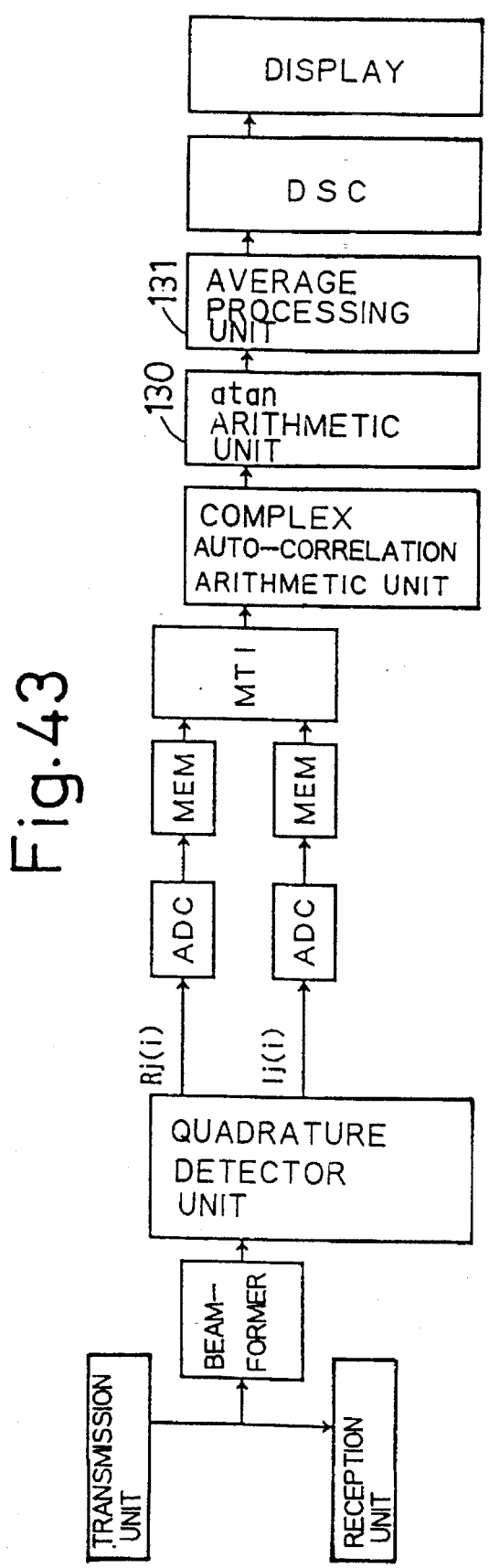
FIG. 43 is a block diagram of the related art of ultrasonic diagnostic system.
Figure 44:
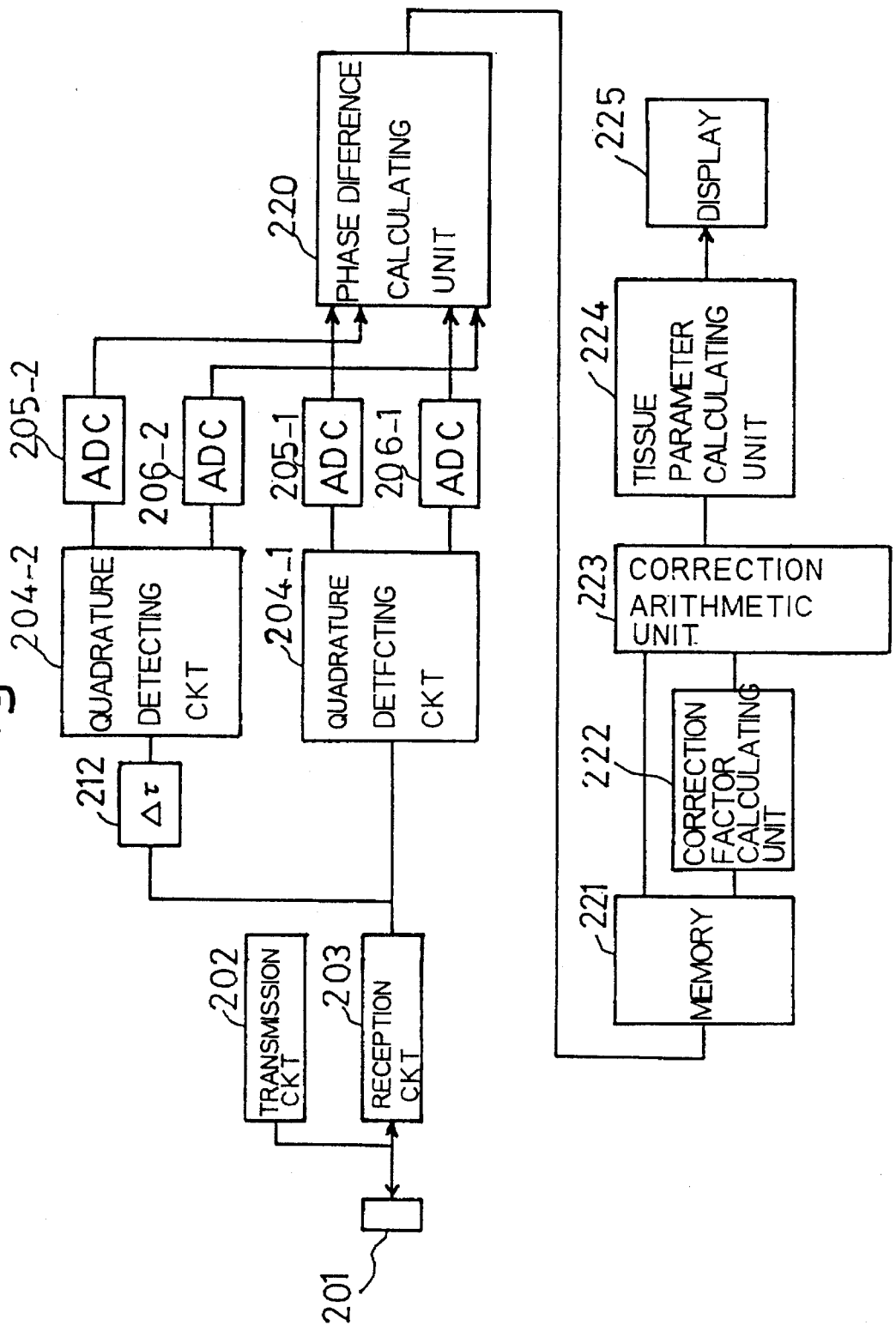
FIG. 44 is a circuit block diagram useful for understanding a further developed technique.
Figure 45A:
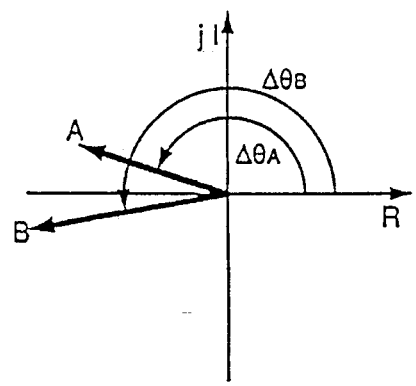
FIGS. 45(A)–(D) are each a view for use in explanation of the problem involved in the related art.
Figure 45B:
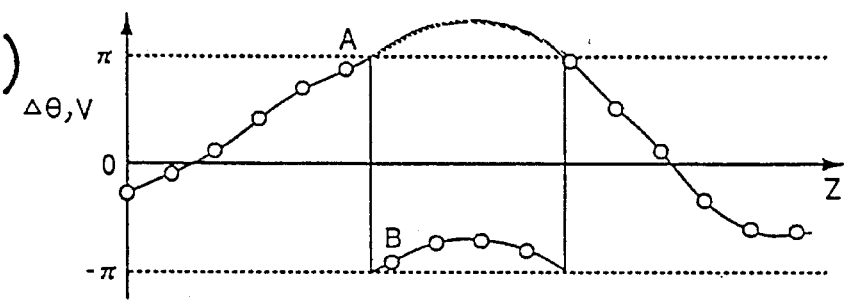
Figure 45C:
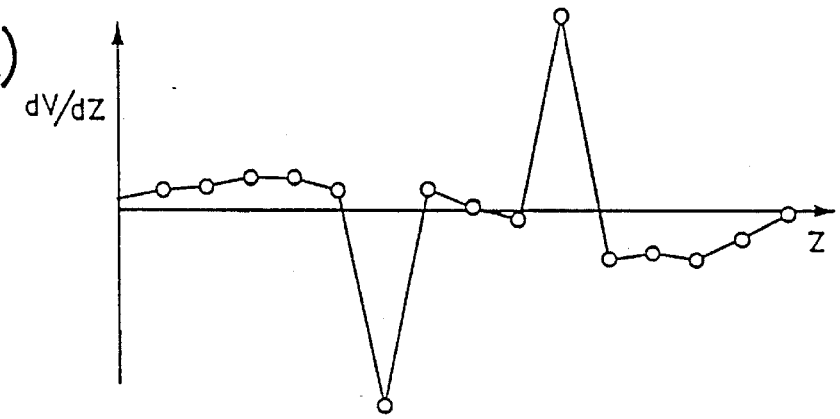
Figure 45D:
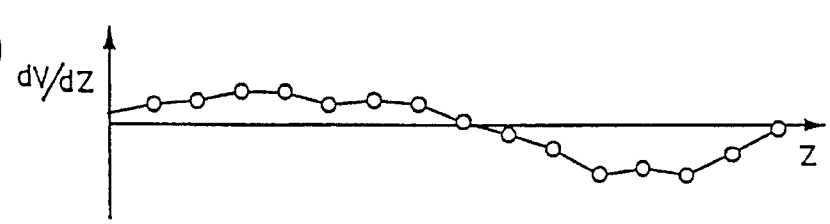

The block diagram shown in FIG. 7 illustrates a control unit 108 and the subject 111 (not shown in FIGS. 37 and 43 involved in the related art), but these elements are not essential for the present embodiment. The essential matter of the present embodiment resides in the point that an average processing unit 129 is disposed between a complex auto-correlation arithmetic unit 128 and an atan arithmetic unit 130. The average processing unit 129 serves, different from the average processing unit 131 shown in FIG. 43, to determine an average of complex auto-correlation values which have been calculated in the complex auto-correlation arithmetic unit 128 prior to performing the non-linear conversion (atan arithmetic operation: cf. equation (2)).

Figure 8:
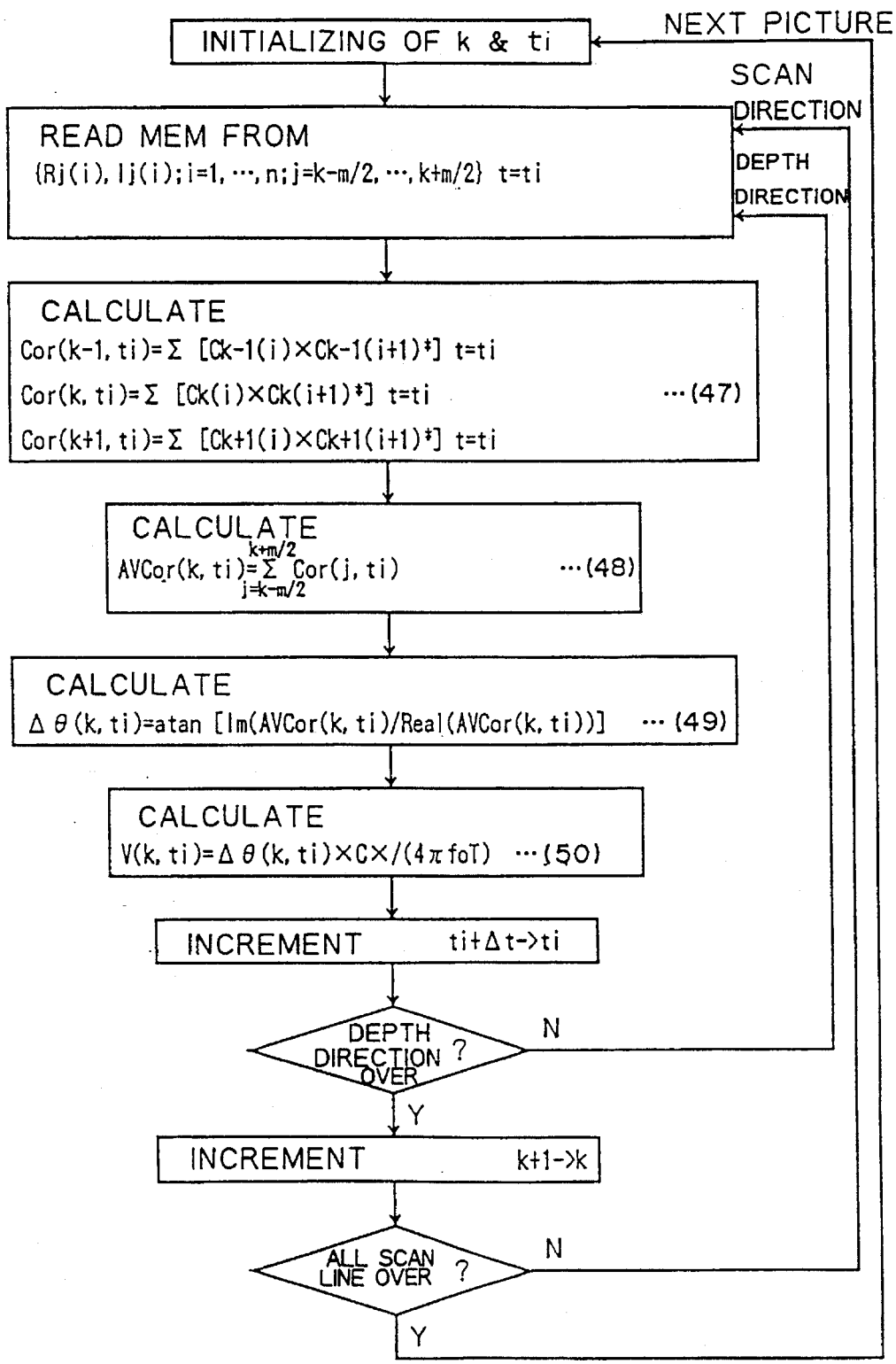
FIGS. 8–10 are each a flowchart representative of an arithmetic processing algorithm in the ultrasonic diagnostic system shown in FIG. 7.
Figure 9:
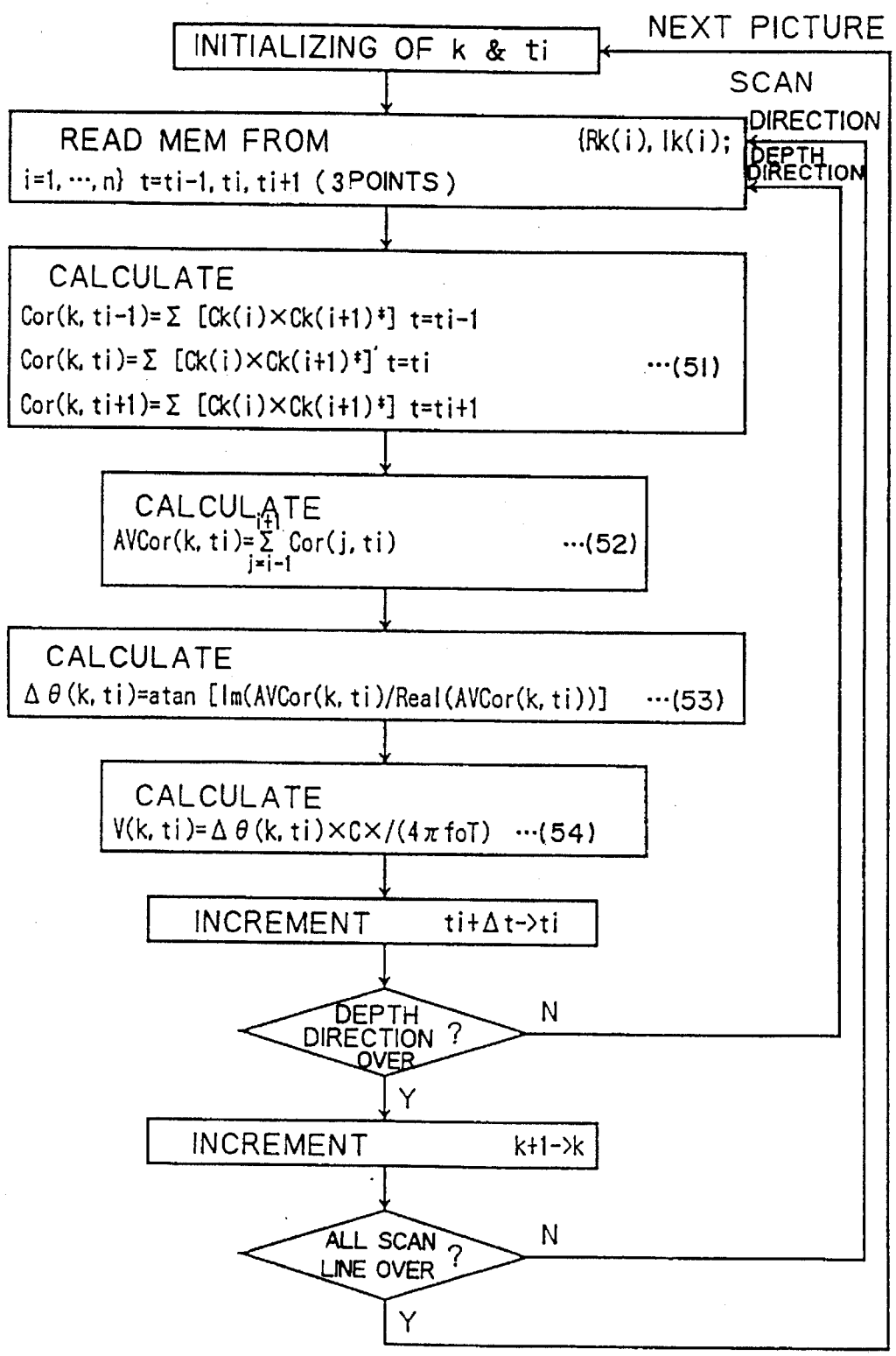
Figure 10:
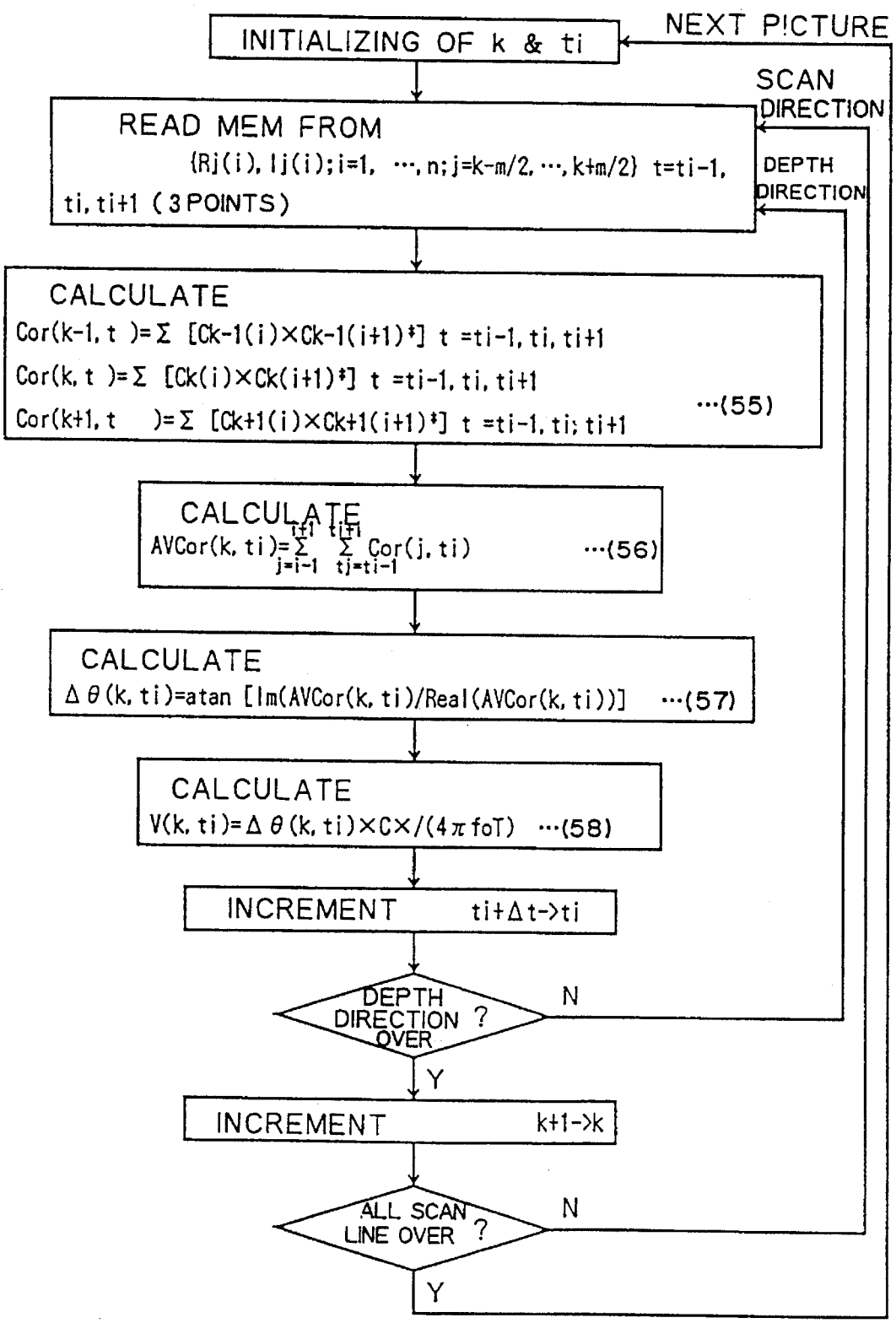

FIGS. 8–10 are each a flowchart representative of an arithmetic processing algorithm in the ultrasonic diagnostic system shown in FIG. 7.

FIG. 8 relates to an algorithm to determine a blood flow velocity using complex auto-correlation values with respect to depth $t_i$ on m pieces of scan lines.

Updating the screen permits an initialization to be performed with respect to scan line number k and depth $t_i$. Subsequently, quadrature detection signals with respect to depths $t_i$ on m pieces of scan lines with a scan line number k of scan line in the center, which signals are expressed by the following equation, are read out from memories 122 and 124 so that the complex auto-correlation arithmetic unit 128 calculates complex auto-correlation values with respect to scan lines j and depths $t_i$.

$$\{C_j(i)\}_{t=ti}=\{R_j(i), I_j(i); i=1,\ldots,n, j=k-m/2,\ldots,k+m/2\}_{t=ti}$$

Assuming that m=3, the following three complex auto-correlation values $Cor(k-1, t_i)$, $Cor(k, t_i)$, $Cor(k+1, t_i)$ are determined.

$$Cor(k-1, t_i)=\Sigma[C_{k-1}(i)\times C_{k-1}(i+1)^*]_{t=ti}$$

$$Cor(k, t_i)=\Sigma[C_k(i)\times C_k(i+1)^*]_{t=ti}$$

$$Cor(k+1, t_i)=\Sigma[C_{k+1}(i)\times C_{k+1}(i+1)^*]_{t=ti} \quad (47)$$

Next, the average processing unit 129 calculates an average value $AVCor(k,t_i)$ of these complex auto-correlation values.

$$AVCor(k, t_i) = \sum_{j=k-m/2}^{k+m/2} Cor(j, t_i) \quad (48)$$

The equation (48) is of representation of addition value. However, in a case where it is intended to calculate the phase difference as in the equation (49) which will be described later, it is not an essential matter whether the addition value is obtained or the average value is obtained. Consequently, it is permissible that the addition value is treated as the average value.

After the average value $AVCor(k, t_i)$ is obtained on the basis of the equation (48), the atan arithmetic unit 130 calculates the phase difference $\Delta\theta(k, t_i)$ on the basis of the equation (49):

$$\Delta\theta(k, t_i)=a\tan\{Im\{AVCor(k, t_i)\}/Real\ AVCor(k, t_i)\} \quad (49)$$

Using the thus obtained phase difference $\Delta\theta(k, t_i)$, the velocity $V(k, t_i)$ is determined in accordance with the following equation (50):

$$V(k, t_i)=\{\Delta\theta(k, t_i)\cdot C\}/(4\pi f_o T) \quad (50)$$

The above-mentioned operations are repeatedly carried out, while incrementing the depth $t_i$ and the scan line number j as well, so that a blood flow velocity on the picture concerned can be obtained.

FIG. 9 is concerned with an algorithm to determine a blood flow velocity using complex auto-correlation values with respect to depths, for example, three points, $t=t_{i-1}, t_i, t_{i+1}$, which are adjacent on the same scan line k.

Updating the screen permits an initialization to be performed with respect to scan line number k and depth $t_i$. Subsequently, quadrature detection signals with respect to depths $t=t_{i-1}, t_i, t_{i+1}$ on a scan line number k of scan line, which signals are expressed by the following equation, are read out from memories 122 and 124 so that the complex auto-correlation arithmetic unit 128 calculates three complex auto-correlation values with respect to depths $t_{i-1}$, $t_i$, $t_{i+1}$ on the scan line k.

$$\{C_k(i)\}_{t=ti-1,ti,ti+1} = \{R_k(i), I_k(i); i=1, \ldots, n,\}_{t=ti-1, ti,ti+1}$$

The above-mentioned three complex auto-correlation values Cor(k, $t_{i-1}$), Cor (k, $t_i$), Cor(k, $t_{i+1}$) are expressed by:

$$Cor\ (k,\ t_{i-1}) = \Sigma\ [C_k\ (i) \times C_k\ (i+1)\ ^*]_{t=ti-1} \quad (51)$$

$$Cor\ (k,\ t_i) = \Sigma\ [C_k\ (i) \times C_k\ (i+1)\ ^*]_{t=ti}$$

$$Cor\ (k, t_{i+1}) = \Sigma\ [C_k\ (i) \times C_k\ (i+1)^*]_{t=ti+1}$$

Next, the average processing unit 129 calculates an average value AVCor(k, $t_i$) of these complex auto-correlation values.

$$AVCor\ (k,\ t_i) = \sum_{j=i-1}^{i+1} Cor\ (j,\ t_i) \quad (52)$$

After the average value AVCor(k, $t_i$) is obtained on the basis of the equation (52), the atan arithmetic unit 130 calculates the phase difference $\Delta\theta(k, t_i)$ on the basis of the equation (53):

$$\Delta\theta(k,\ t_i) = a\ \tan\ [Im\{AVCor\ (k,\ t_i)\}/Real\{AVCor(k, t_i)\}] \quad (53)$$

Using the thus obtained phase difference $\Delta\theta(k, t_i)$, the velocity V(k, $t_i$) is determined in accordance with the following equation (54):

$$V(k,\ t_i) = \{\Delta\theta(k,\ t_i)\cdot C\}/(4\pi f_o T) \quad (54)$$

FIG. 10 is concerned with an algorithm to determine a blood flow velocity using complex auto-correlation values with respect to depths, for example, three points, t=$t_{i-1}$, $t_i$, $t_{i+1}$, on m pieces of scan lines.

Updating the screen permits an initialization to be performed with respect to scan line number k and depth $t_i$. Subsequently, quadrature detection signals with respect to depths t=$t_{i-1}$, $t_i$, $t_{i+1}$ on m pieces of scan lines with a scan line number k of scan line in the center, which signals are expressed by the following equation, are read out from memories 122 and 124 so that the complex auto-correlation arithmetic unit 128 calculates the complex auto-correlation values with respect to depths $t_i$ and scan lines j.

$$\{C_j(i)\}_{t=ti-1,ti,ti+1} = \{R_j(i), I_j(i); i=1, \ldots, n; j=k-m/2, \ldots, k+m/2\}_{t=ti-1, ti,ti+1}$$

Assuming that m=3, the following nine complex auto-correlation values Cor(k–1, t), Cor(k, t), Cor(k+1, t); t=$t_{i-1}$, $t_i$, $t_{i+1}$ are determined.

$$Cor\ (k-1,\ t) = \Sigma\ [C_{k-1}\ (i) \times C_{k-1}\ (i+1)\ ^*]_{t=ti-1,ti,ti+1} \quad (55)$$

$$Cor\ (k,\ t) = \Sigma\ [C_k\ (i) \times C_k\ (i+1)\ ^*]_{t=ti-1,ti,ti+1}$$

$$Cor\ (k+1,\ t) = \Sigma\ [C_{k+1}\ (i) \times C_{k+1}\ (i+1)\ ^*]_{t=ti-1,ti,ti+1}$$

Next, the average processing unit 129 calculates an average value AVCor(k, $t_i$) of these complex auto-correlation values.

$$AVCor\ (k,\ t_i) = \sum_{j=i-1}^{i+1} \sum_{t=t_{i-1}}^{t_{i+1}} Cor\ (j,\ t_i) \quad (56)$$

After the average value AVCor(k, $t_i$) is obtained on the basis of the equation (56), the atan arithmetic unit 130 calculates the phase difference $\Delta\theta(k, t_i)$ on the basis of the equation (57):

$$\Delta\theta(k,\ t_i) = a\ \tan\ [Im\{AVCor(k,\ t_i)\}/Real\ \{AVCor(k,\ t_i)\}] \quad (57)$$

Using the thus obtained phase difference $\Delta\theta(k, t_i)$, the velocity V(k, $t_i$) is determined in accordance with the following equation (58):

$$V(k,\ t_i) = \{\Delta\theta(k,\ t_i)\cdot C\}/(4\pi f_o T) \quad (58)$$

Figure 11:
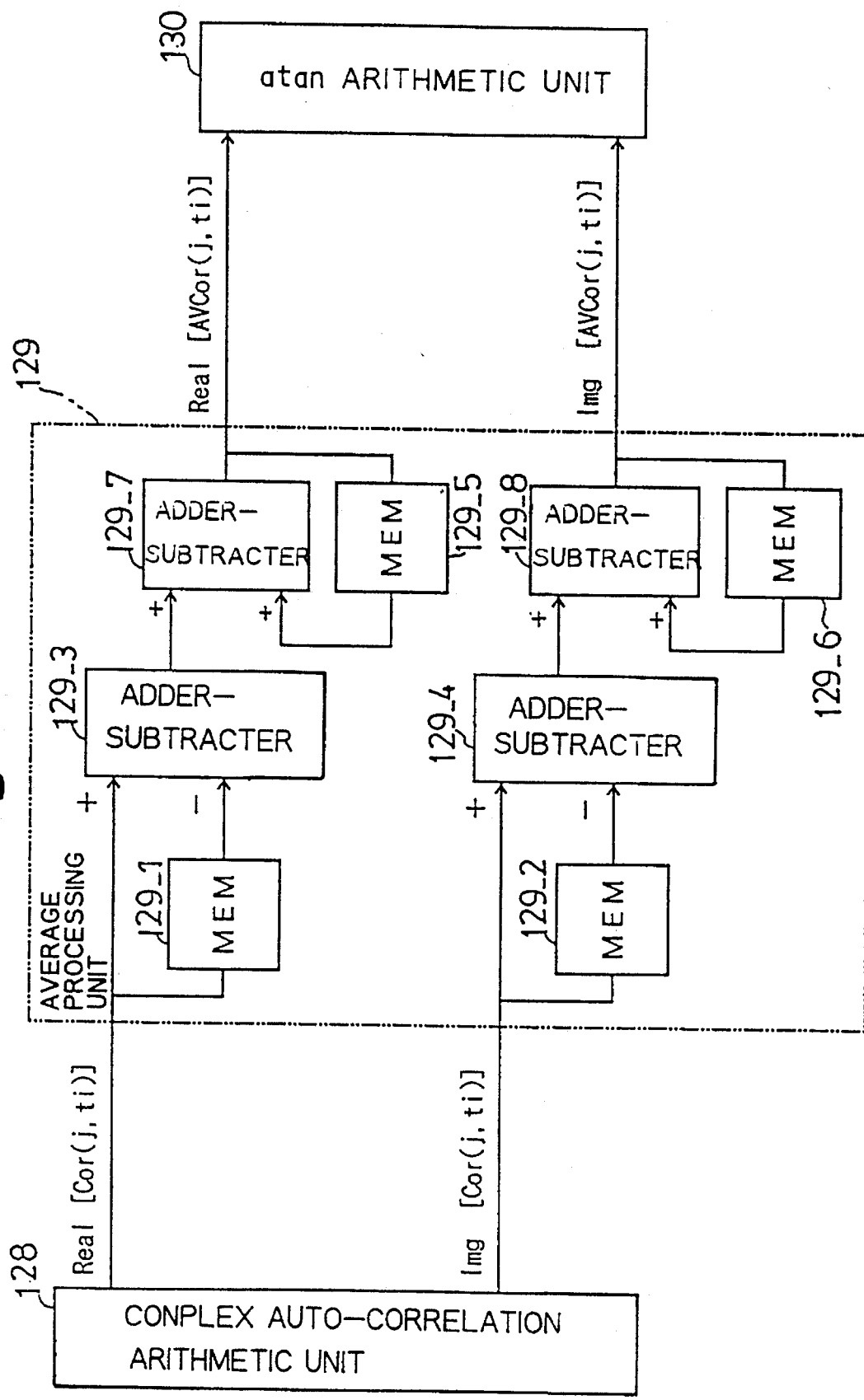
FIG. 11 is a block diagram showing an arrangement of an average processing unit by way of example.

FIG. 11 is a block diagram showing by way of example an arrangement of the average processing unit shown in FIG. 7.

From the equation (1), the complex auto-correlation value with respect to scan line k and depth $t_i$ is expressed by:

$$Cor\ (k,\ t_i) = \Sigma\ [C_k\ (i) \times C_k\ (i+1)\ ^*]_{t=ti} = \quad (59)$$

$$\sum_{i=1}^{n-1} [\{R_k(i)\ R_k\ (i+1) + I_k\ (i)\ I_k\ (i+1)\} +$$

$$j\ (I_k\ (i)\ R_k\ (i+1) - R_k\ (i)\ I_k\ (i+1)]$$

An average value AVCor(k, $t_i$) of the corresponding three scan lines in the scan direction is given by:

$$AVCor(k,\ t_i) = Cor(k-1,\ t_i) + Cor(k,\ t_i) + Cor(k+1,\ t_i) \quad (60)$$

Hence, with respect to (k+1)th scan line, an average value AVCor(k+1, $t_i$) is given by:

$$AVCor\ (k+1,\ t_i) = Cor\ (k,\ t_i) + Cor\ (k+1,\ t_i) + \quad (61)$$

$$Cor\ (k+2,\ t_i)$$

$$= AVCor\ (k,\ t_i) + Cor\ (k+2,\ t_i) -$$

$$Cor\ (k-1,\ t_i)$$

This means that when the average value AVCor(k,$t_i$) on the scan line of interest is determined, the average value AVCor(k+1, $t_i$) on the subsequent scan line can be calculated from the average value AVCor(k, $t_i$) on the preceding scan line.

Also, regarding the depth direction, this is applicable.

An average value AVCor(k, $t_i$) of the corresponding three pieces in the depth direction is given by:

$$AVCor(k,\ t_i) = Cor(k,\ t_{i-1}) + Cor(k,\ t_i) + Cor(k,\ t_{i+1}) \quad (62)$$

Hence, with respect to depth ($t_{i+1}$), an average value AVCor(k, $t_{i+1}$) is given by:

$$(63)$$

$$= AVCor\ (k,\ t_i) + Cor\ (k,\ t_{i+2}) - Cor\ (k,\ t_{i-1})$$

In FIG. 11, the output of the complex auto-correlation arithmetic unit 128 corresponds to item 2 in equation (61) or item 2 in equation (63). The outputs from the memories 129_1 and 129_2 correspond to item 3 in equation (61) or item 3 in equation (63). Subtraction between item 2 and item 3 is performed by the first adder-subtracters 129_3 and 129—4. The second memories 129_5 and 129_6 store item 1 in equation (61) or item 1 in equation (63). The second adder-subtracters 129_7 and 129_8 serve to calculate addition values of the outputs of the first adder-subtracters 129_3 and 129_4 and the outputs of the second memories 129_5 and 129_6, respectively. These addition values assume the left side of equation (61) or the left side of equation (63) which are each updated complex auto-correlation value.

Figure 40:
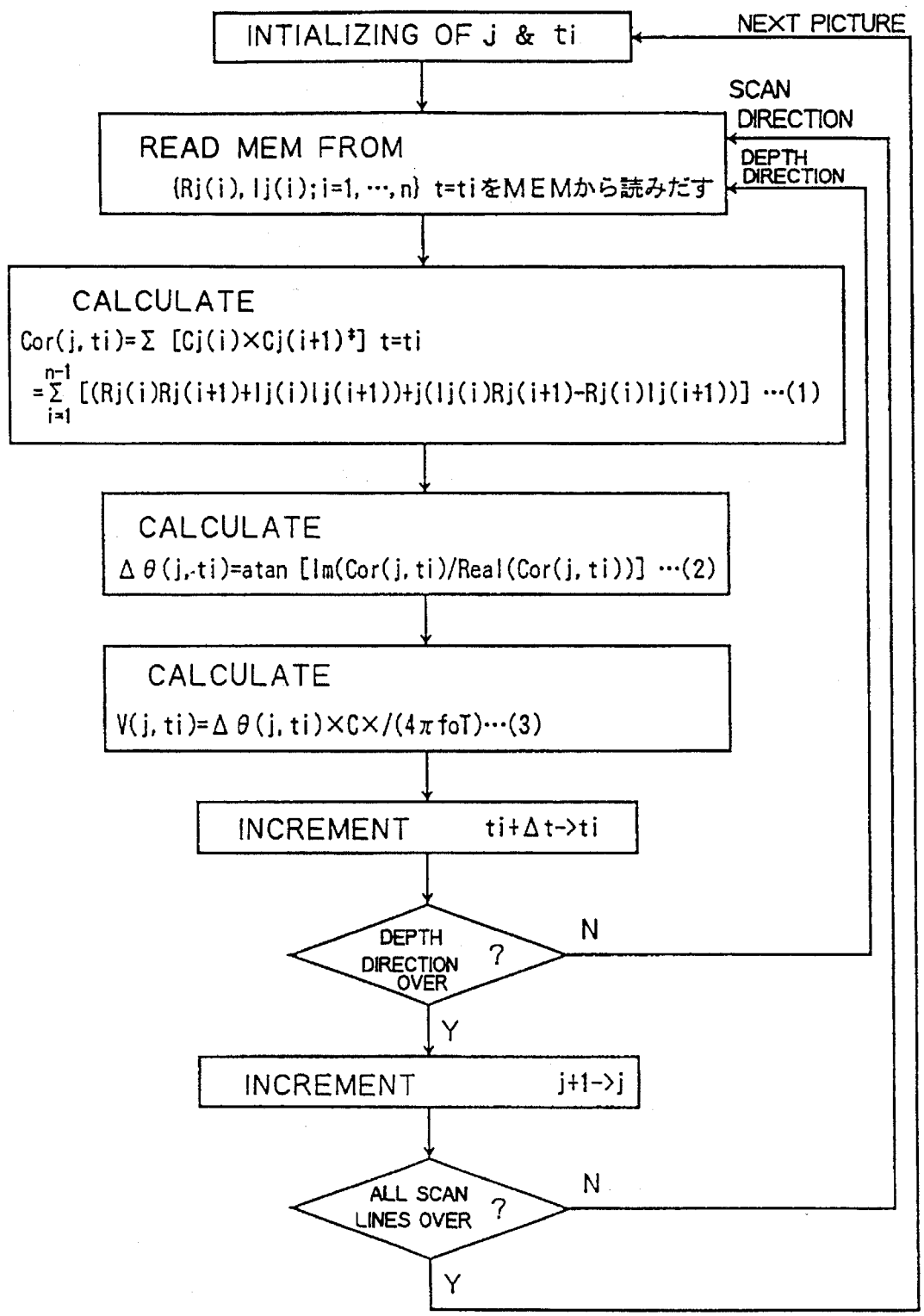
FIG. 40 is a flowchart of arithmetic algorithm of the related art.
Figure 41:
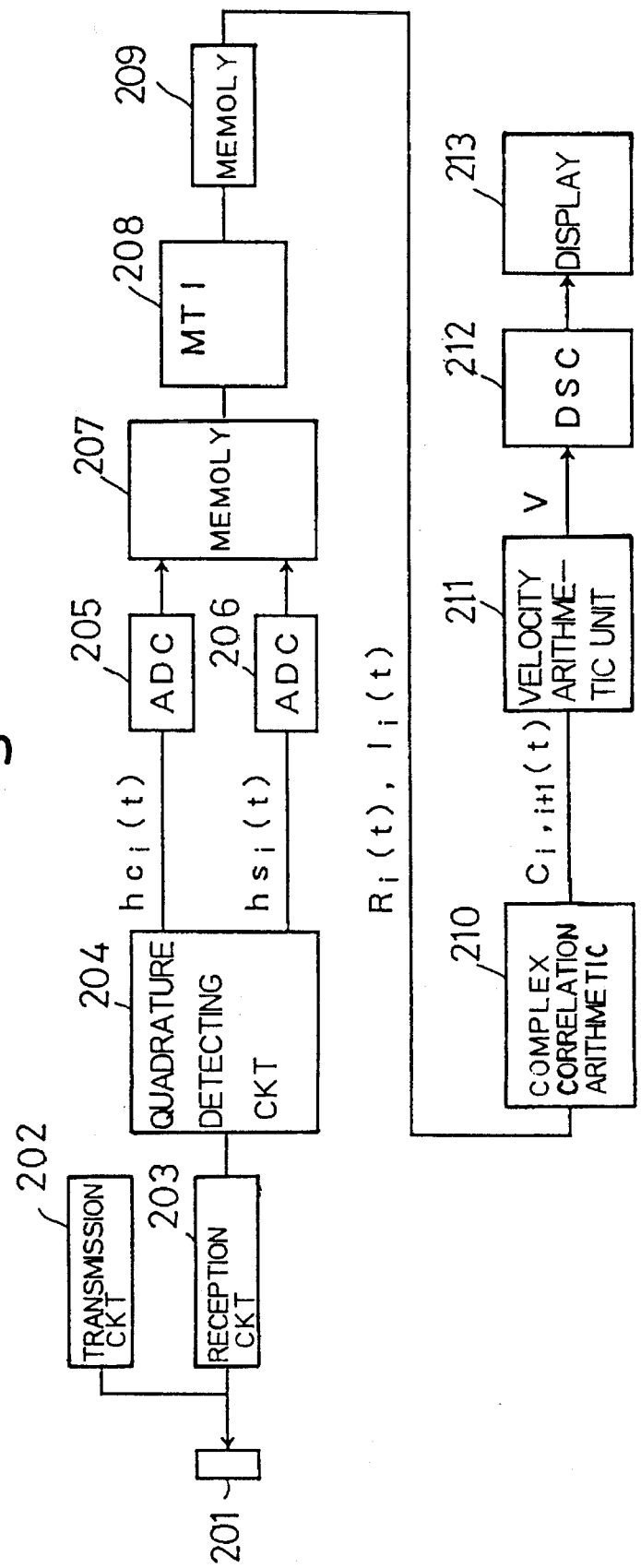
FIG. 41 is a block diagram of the related art of ultrasonic doppler diagnostic system.

According to the algorithms shown in FIGS. 8-10, the arithmetic operations of the complex auto-correlation arithmetic unit 128 and the average processing unit 129 seemingly look like complicate in comparison with the related art of algorithms shown in FIG. 40. However, with respect to the complex auto-correlation arithmetic unit 128, this is the similar as to the matter of the related art. And also with respect to the average processing unit 129, as shown in FIG. 11, it is possible to implement in a simple way.

Figure 12:
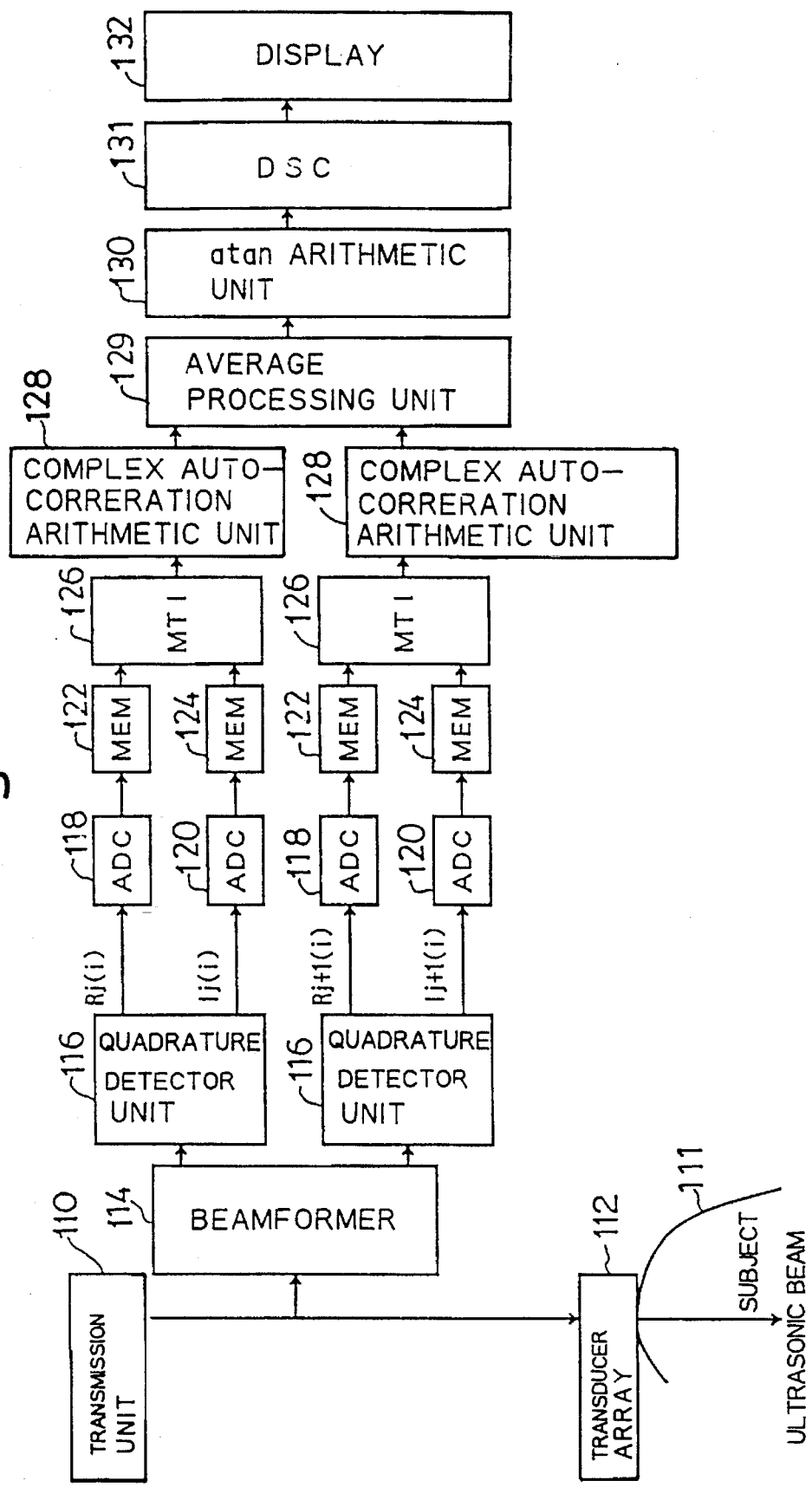
FIG. 12 is a block diagram showing an arrangement for detecting a blood flow velocity in the first ultrasonic diagnostic system according to another embodiment of the present invention.

FIG. 12 is a block diagram showing an arrangement for detecting a blood flow velocity in the first ultrasonic diagnostic system according to another embodiment of the present invention. There will be described only the difference of it from the embodiment shown in FIG. 7 hereinafter.

According to this embodiment, there are provided a plurality of sets of quadrature detector unit 116—complex auto-correlation arithmetic unit 128. It is known to simultaneously obtain a plurality of scan lines, which are close to each other, through one time transmission/reception of ultrasonic beams. It is acceptable to arrange the system according to the embodiment of the present invention so as to determine the average value of complex auto-correlation values as to the respective depth positions on the plurality of scan lines which are simultaneously obtain in the manner as mentioned above.

Figure 13:
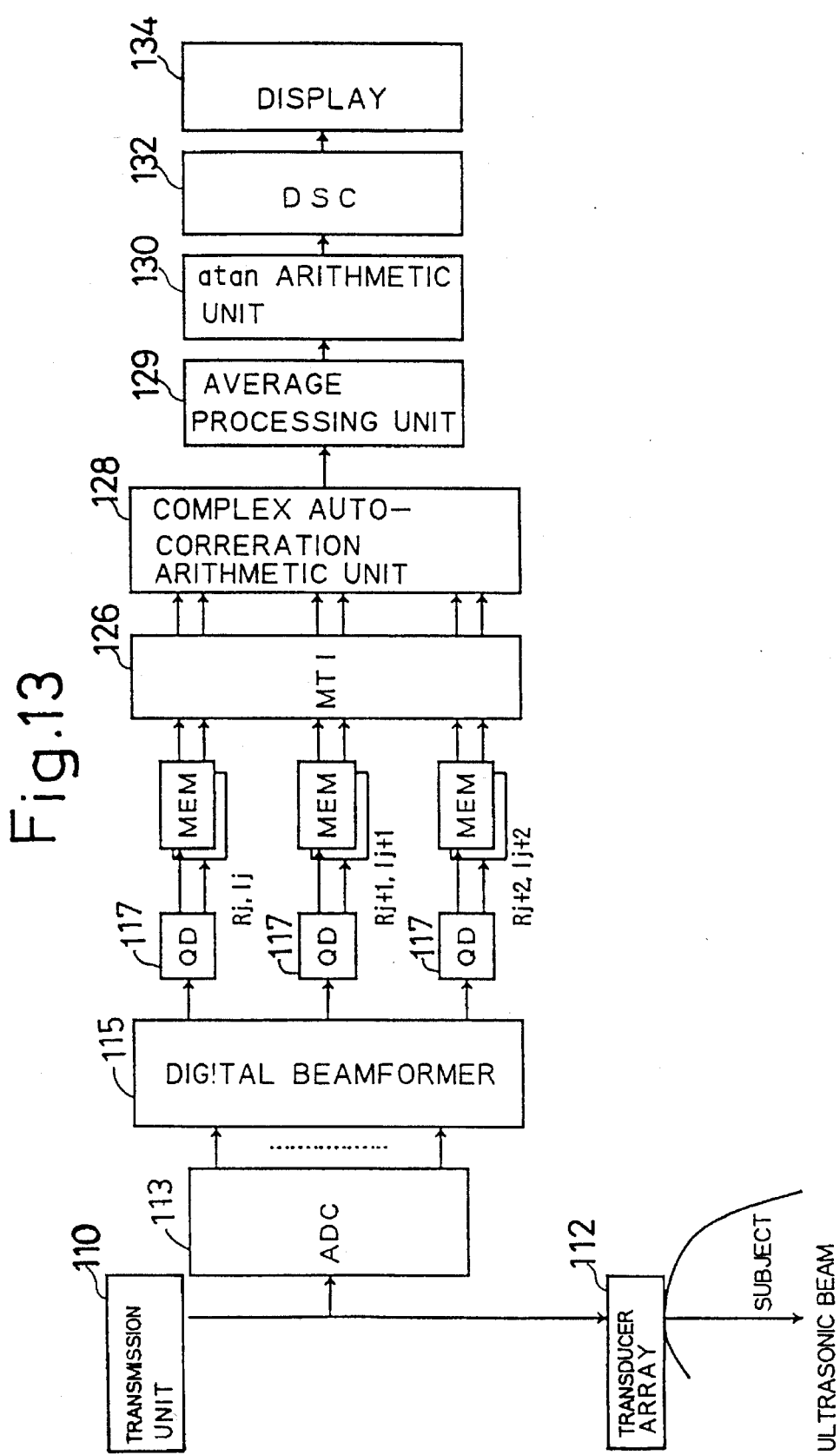
FIG. 13 is a block diagram showing an arrangement for detecting a blood flow velocity in the first ultrasonic diagnostic system according to further another embodiment of the present invention.

FIG. 13 is a block diagram showing an arrangement for detecting a blood flow velocity in the first ultrasonic diagnostic system according to further another embodiment of the present invention.

This system is also arranged to simultaneously obtain a plurality of scan lines through one time transmission/reception of ultrasonic beams. According to the present embodiment, however, there is so arranged that received signals derived from transducer 112 are converted into digital signals by an A/D converter 113 and thereafter a plurality of scan lines are formed by a digital beamformer 115, and quadrature detection signals on the respective scan lines are each generated by the associated one of a plurality of digital quadrature detectors 117. In this case, the digital quadrature detectors 117 are each acceptable to be arranged in such a manner that the received signal is multiplied by a sine wave signal which is different from the received signal in phase by 90° and high-frequency is eliminated by a digital filter, otherwise a quadrature component is calculated by a digital filter. Anyway, the present invention is not restricted in arrangement of the beamformer, and the redundant description is omitted.

Next, a preferred embodiment of the second ultrasonic diagnostic system of the present invention will be described hereinafter.

Figure 14:
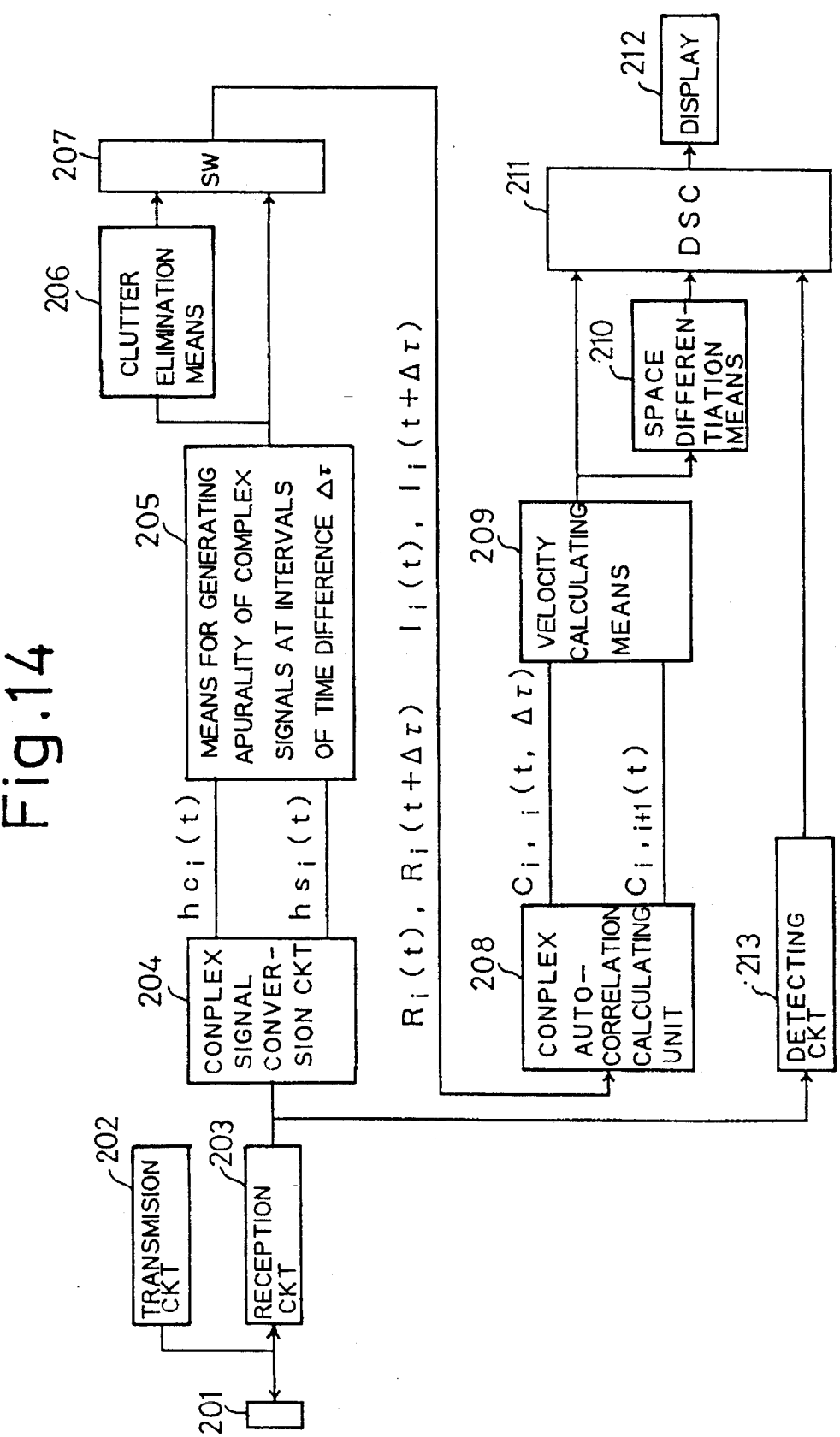
FIG. 14 is a block diagram of the second ultrasonic diagnostic system according to an embodiment of the present invention.

FIG. 14 is a block diagram of the second ultrasonic diagnostic system according to an embodiment of the present invention.

Pulse signals are transmitted from a transmission circuit 202 each in a predetermined timing toward ultrasonic transducers 201 arranged with a plurality of pieces, so that ultrasonic pulse beams are transmitted from the ultrasonic transducers 201 each in a predetermined direction inside the subject (not illustrated). The ultrasonic pulse beams irradiated within the subject are reflected within the subject, and the reflected ultrasounds are received by the ultrasonic transducers 201 and are applied to a receiving circuit 203. In the receiving circuit 203, the ultrasounds are subjected to a beamformation process in phasing to generate received signals. The received signal is applied to a complex signal conversion circuit 204 and a detecting circuit 213.

The complex signal conversion circuit 204 is provided with a quadrature detecting circuit. The received signal is subjected to the quadrature detection in the quadrature detecting circuit 204, thereby generating the first complex signal $[h_{ci}(t)+j\ h_{si}(t)]$ referenced in the present invention, where suffixes c and s denote cosine and sine, respectively, and a suffix "i" implies that the signal is involved in the i-th transmission when the ultrasonic pulse beam are repeatedly transmitted in a predetermined direction within the subject. The first complex signal $[h_{ci}(t)+j\ h_{si}(t)]$ is applied to means 205 for generating a plurality of complex signals at interval of time difference $\Delta\tau$. In said means 205 for generating a plurality of complex signals at interval of time difference $\Delta\tau$, the first complex signal $[h_{ci}(t)+j\ h_{si}(t)]$ is digitalized, thereby generating the second complex signal and the in addition third complex signal which is shifted by $\Delta\tau$ in time difference from the second complex signal, the second complex signal and the third complex signal being digital signal. If the second complex signal is expressed by $[R_i(t)+j\ I_i(t)]$, the third complex signal is expressed by $[R_i(t+\Delta\tau)+j\ I_i(t+\Delta\tau)]$. Incidentally, said means 205 for generating a plurality of complex signals at interval of time difference $\Delta\tau$ will be described more in details later.

The second and third complex signals $[R_i(t)+j\ I_i(t)]$ and $[R_i(t+\Delta\tau)+j\ I_i(t+\Delta\tau)]$, which are generated by said means 205, are passed via a switch 207 or both the switch 207 and a clutter eliminating means 206 comprised of an MTI filter and the like to a complex correlation arithmetic unit 208.

When it is desired that blood flow information is detected, passing through the clutter eliminating means 206 serves to remove the clutter component. On the other hand, when it is desired to obtain information as to a movement of the tissue within the subject, there is no need to eliminate the blood flow information, since a blood flow signal is extremely feeble in comparison with a tissue reflecting signal. But, it is of course acceptable to provide a filter for eliminating the blood flow information.

Upon receipt of the second and third complex signals $[R_i(t)+j\ I_i(t)]$ and $[R_i(t+\Delta\tau)+j\ I_i(t+\Delta\tau)]$, the complex correlation arithmetic unit 208 performs a complex correlation arithmetic operation shown in the following equation between the second complex signal $[R_i(t)+j\ I_i(t)]$ and third complex signals $[R_i(t+\Delta\tau)+j\ I_i(t+\Delta\tau)]$ so that correlation signal $C_{i,i}(t,\Delta\tau)$ is generated.

$$C_{i,i}(t,\Delta\tau)=[R_i(t)+j\ I_i(t)]^*[R_i(t+\Delta\tau)+j\ I_i(t+\Delta\tau)] \quad (64)$$

where a mark * denotes a complex conjugate

The complex correlation arithmetic unit 208 further performs a complex correlation arithmetic operation between the second complex signal of interest and the additional second complex signal obtained by the subsequent transmission of ultrasonic beams, so that correlation signal $C_{i,i+1}(t)$ is generated.

$$C_{i,i+1}(t)=[R_i(t)+j\ I_i(t)]^*[R_{i+1}(t)+j\ I_{i+1}(t)] \quad (65)$$

where a mark * denotes a complex conjugate

Incidentally, since an arrangement of the complex correlation arithmetic unit 208 is well known, its detailed explanation will be omitted.

The correlation signal $C_{i,i+1}(t)$ calculated by the complex correlation arithmetic unit 208 is applied to a velocity calculating means 209, which is an example of a movement amount calculating means, to determine a velocity signal as to a movement inside of the subject. The detailed arrangement of the velocity calculating means 209 will be described later.

The velocity signal calculated by the velocity calculating means 209 is passed directly or via a space differentiation means 210 to a digital scan converter 211 for converting the received signal into a display signal.

The space differentiation means 210 comprises a FIR filter, a difference circuit or the like in which the received signal is subjected to a space differentiation with respect to a predetermined direction toward which ultrasonic pulse beams are transmitted within the subject, thereby determining a rate of change of a movement velocity of the subject as to the predetermined direction. A signal, which is representative of a rate of change of the velocity determined by the space differentiation means 210, is also applied to the digital scan converter 211.

The received signals produced by the receiving circuit 203 is supplied also to a detecting circuit 213 for the purpose of a detection. The ultrasonic transducer 201 transmits ultrasonic pulse beams toward various directions inside the subject. The detecting circuit 213 performs a detection for multiple received signals and produces signals each carrying a tomographic image such as B-mode image, M-mode image and the like. The thus produced signals are supplied to the digital scan converter 211.

The display signals outputted from the digital scan converter 211 are applied to a display unit 212 having a display screen such as a CRT display. The display unit 212 displays a tomographic image within the subject, or displays velocity information as to a movement of the respective points within the subject or rate-of-change information as to the velocity, superposing on the tomographic image. In this manner, "hardness" of the respective observation points within the subject can be grasped and then available for diagnoses.

Figure 15:
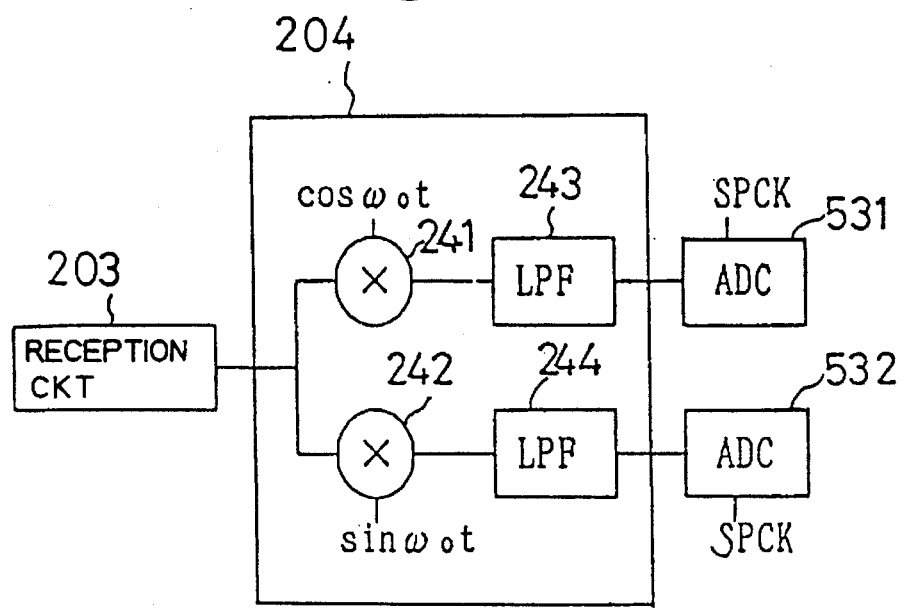
FIGS. 15–16 are each a block diagram showing an arrangement of a complex signal conversion circuit by way of example.

FIG. 15 is a block diagram showing an arrangement of a complex signal conversion circuit 204, which is depicted in FIG. 14 with a block, by way of example.

The received (analog) signals outputted from the receiving circuit 203, which have been subjected to a beamforming process in phasing, are applied to two analog multipliers 241 and 242 which constitute the complex signal conversion circuit 204. Further, applied to the two analog multipliers 241 and 242 are analog sine-wave signals $\cos \omega_o t$ and $\sin \omega_o t$, respectively, which are mutually shifted by 90° in the phase. In each of the analog multipliers 241 and 242, the received signal is multiplied by the associated sine-wave signal. The signals outputted from the analog multipliers 241 and 242 are passed via low-pass filters 243 and 244 to A/D converters 531 and 532, respectively. Passing through the low-pass filters 243 and 244 of the signals serves to eliminate a high frequency component, thereby forming the first complex signal (analog) $[h_{ci}(t)+j\ h_{si}(t)]$. Real part $h_{ci}(t)$ and imaginary part $h_{si}(t)$ of the first complex signal $[h_{ci}(t)+j\ h_{si}(t)]$ are supplied to the A/D converters 531 and 532, respectively, which may constitute the means 205 for generating a plurality of complex signals at interval of time difference $\Delta\tau$ as shown in FIG. 14 with block, alternatively, which may be interposed between the complex signal conversion circuit 204 and said means 205. Sampling clock SPCK is applied to the A/D converters 531 and 532, and the first complex signal $[h_{ci}(t)+j\ h_{si}(t)]$ (analog) is converted into the first complex signal (digital) in accordance with the sampling clock SPCK.

Figure 16:
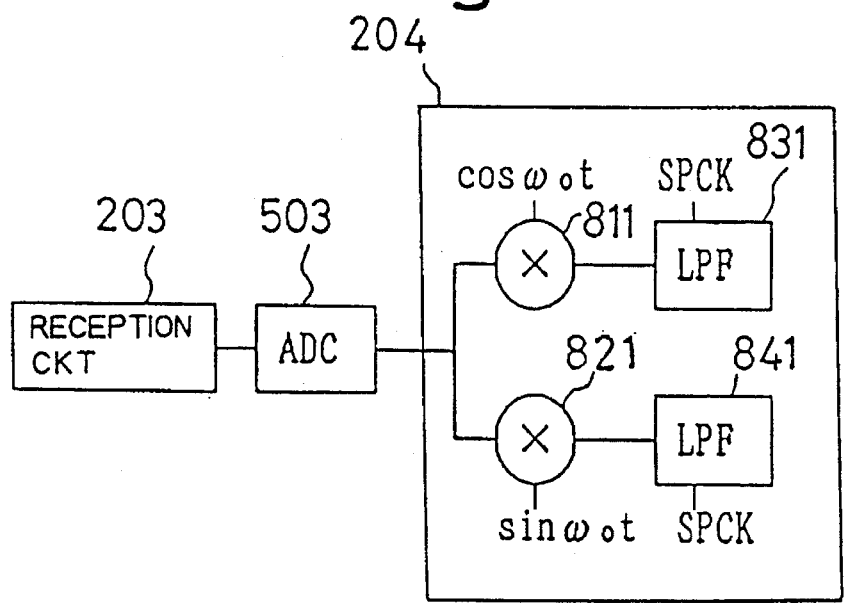

FIG. 16 is a block diagram showing another arrangement of a complex signal conversion circuit 204, which is depicted in FIG. 14 with a block, by way of example.

The received signals outputted from the receiving circuit 203, which have been subjected to a beamforming process in phase, are applied to an A/D converter 503 which is interposed between the receiving circuit 203 and the complex signal conversion circuit 204, and are converted into digital received signals. These digital received signals are applied to two digital multipliers 811 and 821 which constitute the complex signal conversion circuit 204. Applied also to the digital multipliers 811 and 821 are digital sine-wave signals $\cos \omega_o t$ and $\sin \omega_o t$, respectively, which are mutually shifted by 90° in the phase. In each of the digital multipliers 811 and 821, the received signal is multiplied by the associated sine-wave signal. The signals outputted from the digital multipliers 811 and 821 are applied to digital low-pass filters 831 and 841, respectively. Passing through the low-pass filters 831 and 841 of the signals serves to eliminate a high frequency component, thereby forming the first complex signal (digital).

Figure 17:
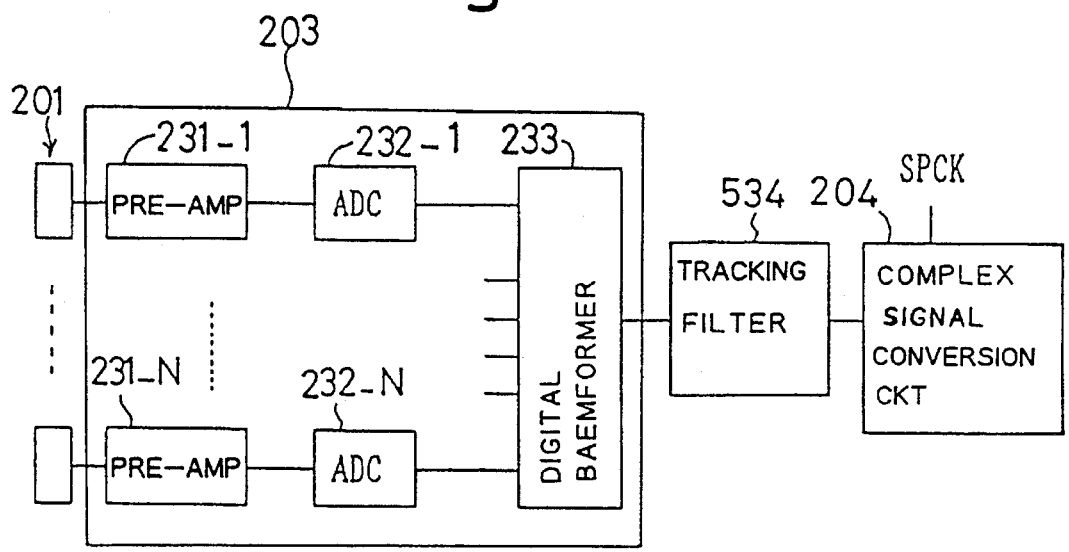
FIG. 17 is a circuit diagram of a receiving circuit, by way of example, having a digital beamformer for performing a beamformation of digital received signals in phasing.

FIG. 17 is a circuit diagram of a receiving circuit, by way of example, having a digital beamformer for performing a beamformation of digital received signals in phasing.

The receiving circuit 203 comprises a plurality of preliminary amplifiers 231_1, ..., and 231_N, a plurality of A/D converters 232_1, ..., and 232_N, and a digital beamformer 233. A plurality of received signals, which are derived by the ultrasonic transducers 201 arranged with a plurality of pieces, are passed via the plurality of preliminary amplifiers 231_1, ..., and 231_N, and the plurality of A/D converters 232_1, ..., and 232_N to the digital beamformer 233, respectively. The digital beamformer 233 applies a beamforming process in phasing for the plurality of received signals on a digital basis and outputs the processed digital signals. The received signals in the form of digital, which are outputted from the receiving circuit 203, are supplied to a tracking filter 534 which is interposed between the receiving circuit 203 and the complex signal conversion circuit 204. The tracking filter 534 is an adaptive filter wherein in view of the fact that while ultrasound travels in the depth direction within the subject, the ultrasound is attenuated, particularly, in the high-frequency component, a filter factor is adaptively altered for each depth to extract an optimum signal for each depth. The received signals outputted from the tracking filter 534 are applied to the complex signal conversion circuit 204. The complex signal conversion circuit 204 is comprised of the digital multipliers 811 and 821, and the digital low-pass filters 831 and 841 as shown in FIG. 16, since the received signals applied to the complex signal conversion circuit 204 are digital signals.

Figure 18:
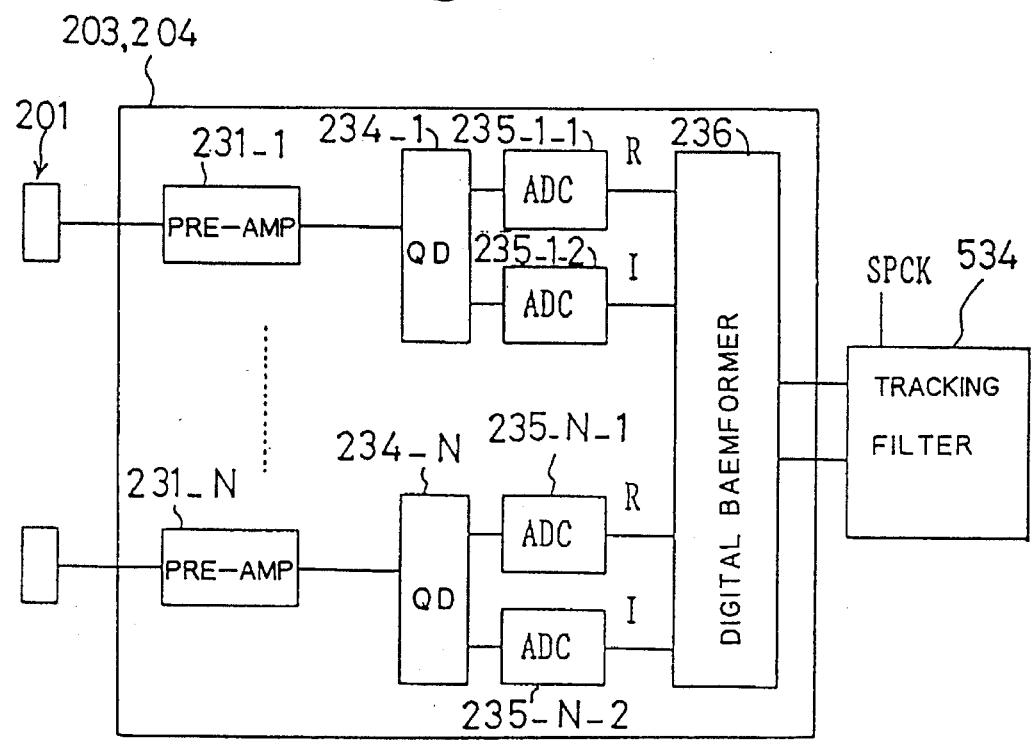
FIG. 18 is a circuit block diagram showing a circuit arrangement, by way of example, in which a receiving circuit and a complex signal conversion circuit are organically coupled with each other.

FIG. 18 is a circuit block diagram showing a circuit arrangement, by way of example, in which a receiving circuit and a complex signal conversion circuit are organically coupled with each other.

A plurality of received signals, which are derived by the ultrasonic transducers 201 arranged with a plurality of pieces, are passed via the plurality of preliminary amplifiers 231_1, ..., and 231_N to a plurality of quadrature detectors 234_1, ..., and 234_N, respectively, which have each the same arrangement as the complex signal conversion circuit 204 shown in FIG. 15. The quadrature detectors 234_1, ..., and 234_N each output the first complex signal in the analog form. Those first complex signal in the analog form are converted into the first complex signal in the digital form by A/D converters 235_1_1, 235_1_2; ...; and 235_N_1, 235_N_2. A digital beamformer 236 applies a beamforming process in phasing for real part-to-real part, and imaginary part-to-imaginary part, of the complex signal. The first complex signal outputted from the digital beamformer, which has been subjected to the beamforming process in phasing, is passed via the tracking filter 534 to the means 205 for generating a plurality of complex signals at intervals of time difference $\Delta\tau$, shown in FIG. 14.

FIG. 18 shows an example using the quadrature detectors 234_1, ..., and 234_N each for performing a quadrature detection for an analog signal. But, it is acceptable to arrange the circuit in such a manner that the received signals outputted from the preliminary amplifiers 231_1, ..., and 231_N are converted into the digital signals, as shown in FIG. 17, and then applied to the quadrature detectors (cf. complex signal converter shown in FIG. 16) each for performing a quadrature detection for the digital signal, and the output of these quadrature detectors are supplied to the digital beamformer 236. Further, it is also acceptable to arrange the circuit in such a manner that the outputs of the quadrature detectors 234_1, ..., and 234_N shown in FIG. 18 are supplied to the analog beamformer and the first complex signals are subjected to the beamformation process in phasing in the form of analog signal, and thereafter converted into the first complex signals in the form of digital signal.

Figure 19:
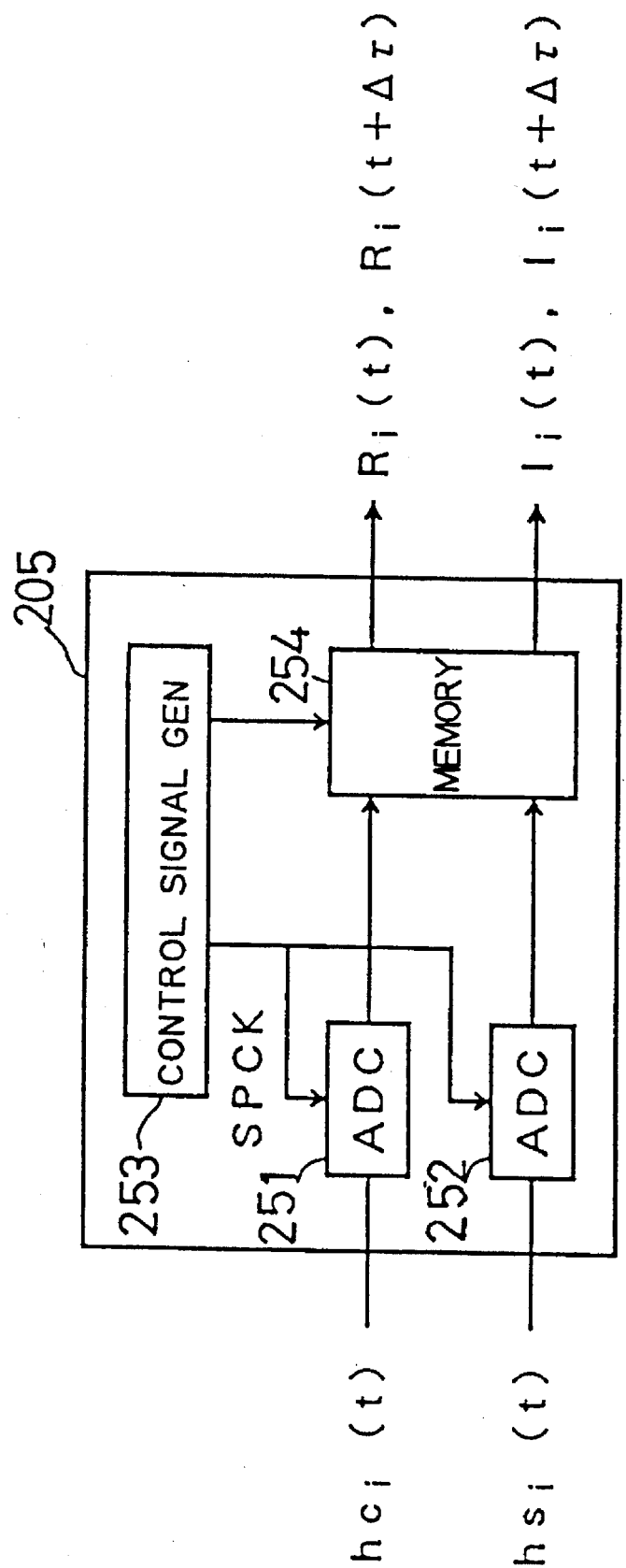
FIGS. 19 and 20 are each a circuit block diagram showing a circuit arrangement, by way of example, of means for generating a plurality of complex signals at intervals of time difference $\Delta\tau$, as shown in FIG. 14 with a block.
Figure 20:
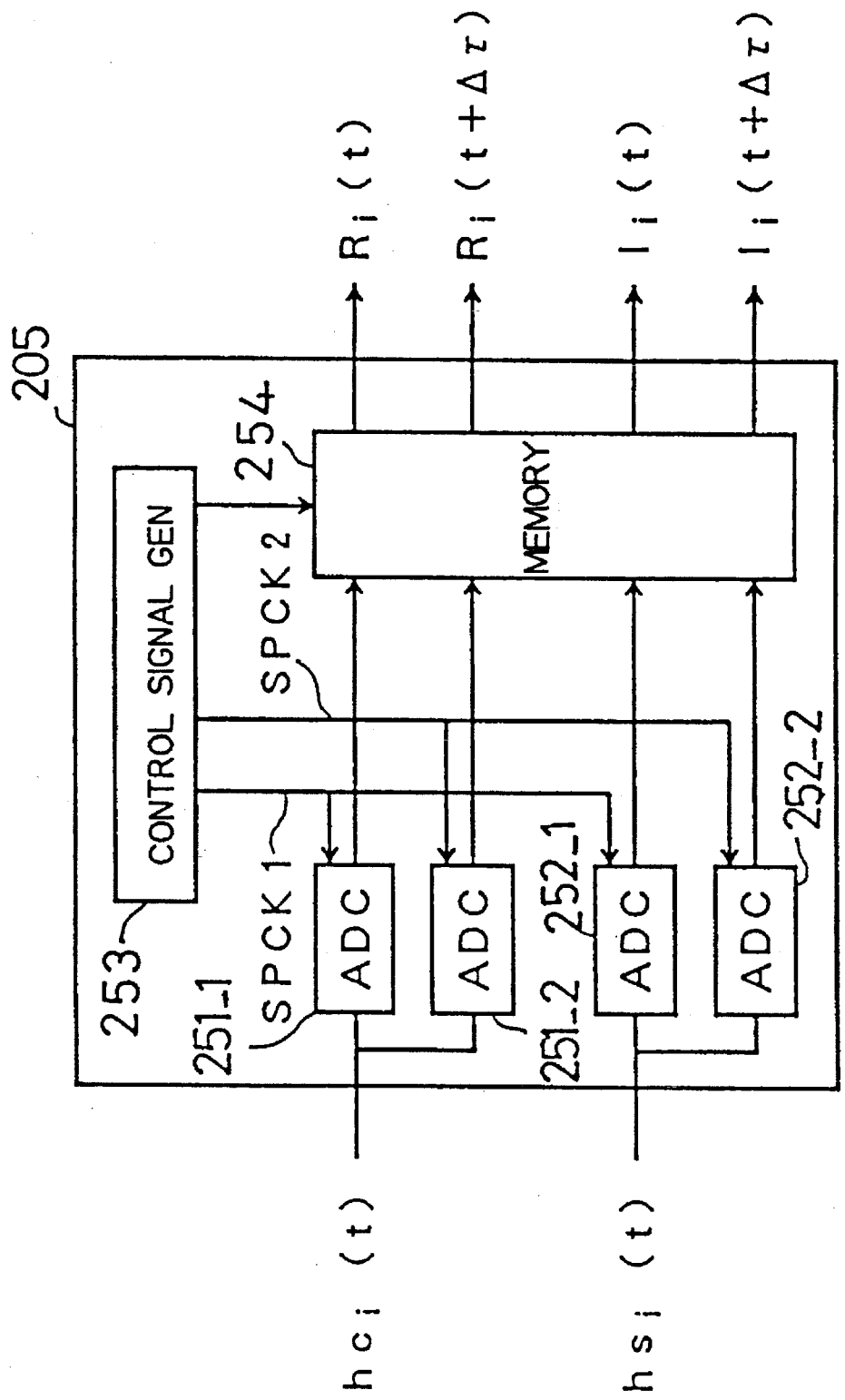
Figure 21:
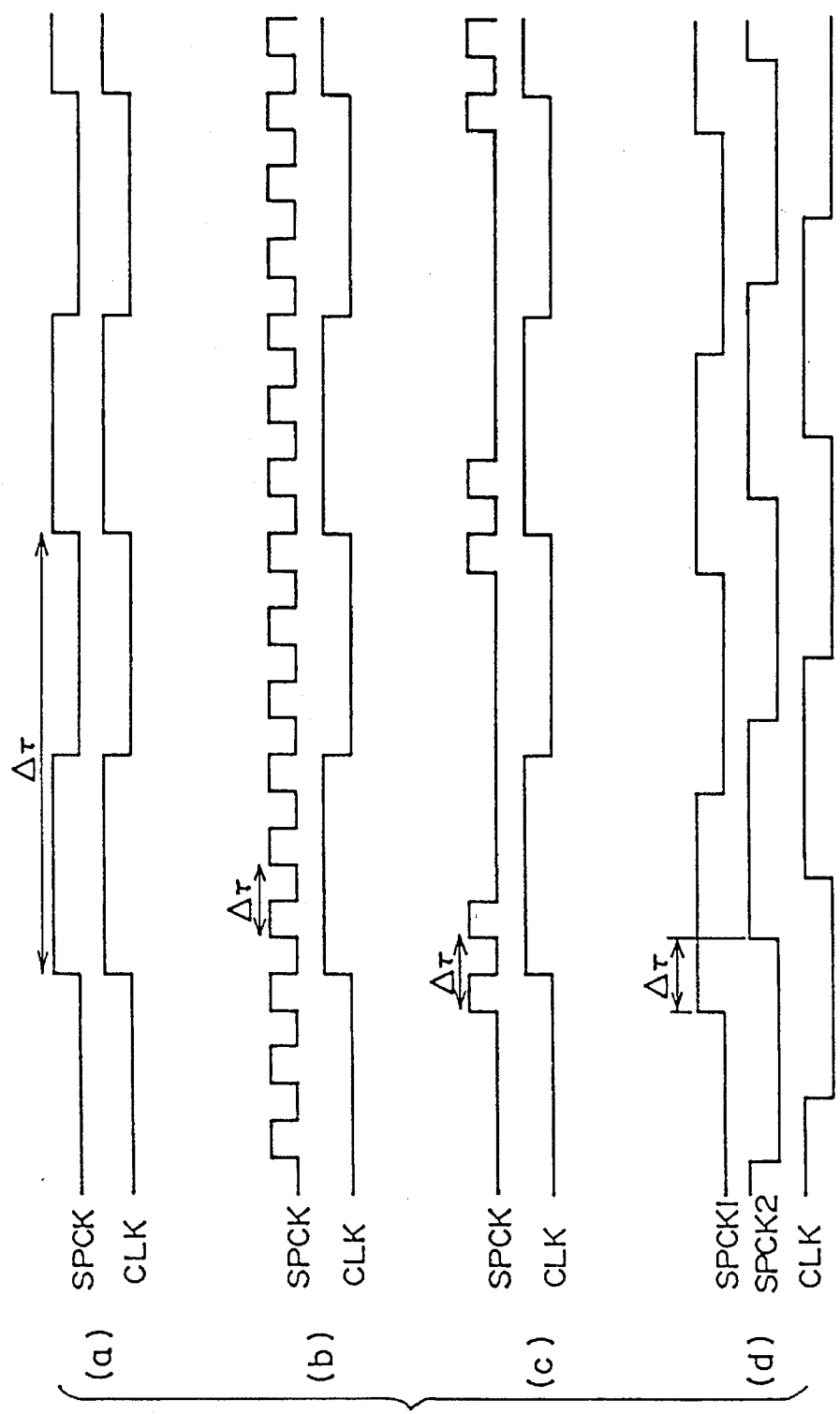
FIG. 21 is a time chart useful for understanding an operational principle of circuits shown in FIGS. 19 and 20.

FIGS. 19 and 20 are each a circuit block diagram showing a circuit arrangement, by way of example, of means 205 for generating a plurality of complex signals at intervals of time difference $\Delta\tau$, as shown in FIG. 14 with a block. FIG. 21 is a time chart useful for understanding an operational principle of circuits shown in FIGS. 19 and 20.

A clock signal CLK shown in FIG. 21 is of determining a time interval corresponding to an interval between observation point-to-point, to sequentially calculate by the velocity calculating means 209 the velocity on each of the observation points aligned in a predetermined direction inside the subject. A sampling clock signal SPCK is of determining a sampling timing in the A/D converters (ADC) shown in FIGS. 19 and 20.

The circuit block shown in FIG. 19 receives a first complex signal (analog) $[h_{ci}(t)+j\ h_{si}(t)]$ which is produced by the complex signal conversion circuit 204 shown in FIG. 14.

Real part $h_{ci}(t)$ and imaginary part $h_{si}(t)$ of the first complex signal $[h_{ci}(t)+j\ h_{si}(t)]$ are supplied to the A/D converters 251 and 252, respectively, subjected to a sampling in synchronism with the sampling clock signal SPCK outputted from a control signal generating unit 253, and temporarily stored in a memory 254 with conversion into the digital signal.

Assuming that the sampling clock signal SPCK is given, as shown in FIG. 21(a), by a sampling clock signal having the same repetitive period as the clock signal CLK, the above-mentioned time difference $\Delta\tau$ assumes the same time interval as the period of the clock signal CLK. Specifically, in this case, signal-to-signal, which are mutually shifted by the corresponding one period of the clock signal CLK, assume the second complex signal $[R_i(t)+j\ I_i(t)]$ and the third complex signal $[R_i(t+\Delta\tau)+j\ I_i(t+\Delta\tau)]$, respectively.

With respect to the arrangement shown in FIG. 19, as shown in FIG. 21(b), it is acceptable to use the sampling clock signal SPCK having a period equal to 1/N (N: integer) of a period of the clock signal CLK. In this case, comparing with the case of FIG. 21(a), if intervals of the observation points are the same as those in case of FIG. 21(a), there is a need to provide a higher speed of A/D converter. However, it is possible to select a plurality of time intervals as well as a time interval corresponding one clock pulse of the sampling clock signal SPCK shown in FIG. 21(b), taking the above-mentioned time difference $\Delta\tau$. In addition, through performing an arithmetic operation in which the plurality of time intervals are each selected to be the above-mentioned time difference $\Delta\tau$, it is possible to determine an average of the results of the arithmetic operation, thereby enhancing the precision of the velocity calculation. This average processing will be described later.

With respect to the arrangement shown in FIG. 19, as shown in FIG. 21(c), it is acceptable to use the sampling clock signal SPCK having a plurality of clock pulses (e.g. 2 clock pulses) every period of the clock signal CLK. In case shown in FIG. 21(c), signals, which are subjected to the sampling with one and the other of two clock pulses every period of the clock signals CLK, assume the second complex signal $[R_i(t)+j\ I_i(t)]$ and the third complex signal $[R_i(t+\Delta\tau)+j\ I_i(t+\Delta\tau)]$.

The circuit block shown in FIG. 20 includes two pairs of A/D converters 251_1, 251_2; 252_1, 252_2 each for converting real part $h_{ci}(t)$ and imaginary part $h_{si}(t)$ of the first complex signal $[h_{ci}(t)+j\ h_{si}(t)]$ into digital signals. Among these four A/D converters 251_1, 251_2; 2B2_1, 252_2, applied to the A/D converters 251_1, 252_1 and the A/D converters 251_2, 252_2 are two sampling clock signals SPCK1 and SPCK2, respectively, as shown in FIG. 21(d), which are mutually different in phase. The timing shift between the two sampling clock signals SPCK1 and SPCK2 involves the above-mentioned time difference $\Delta\tau$.

Figure 22:
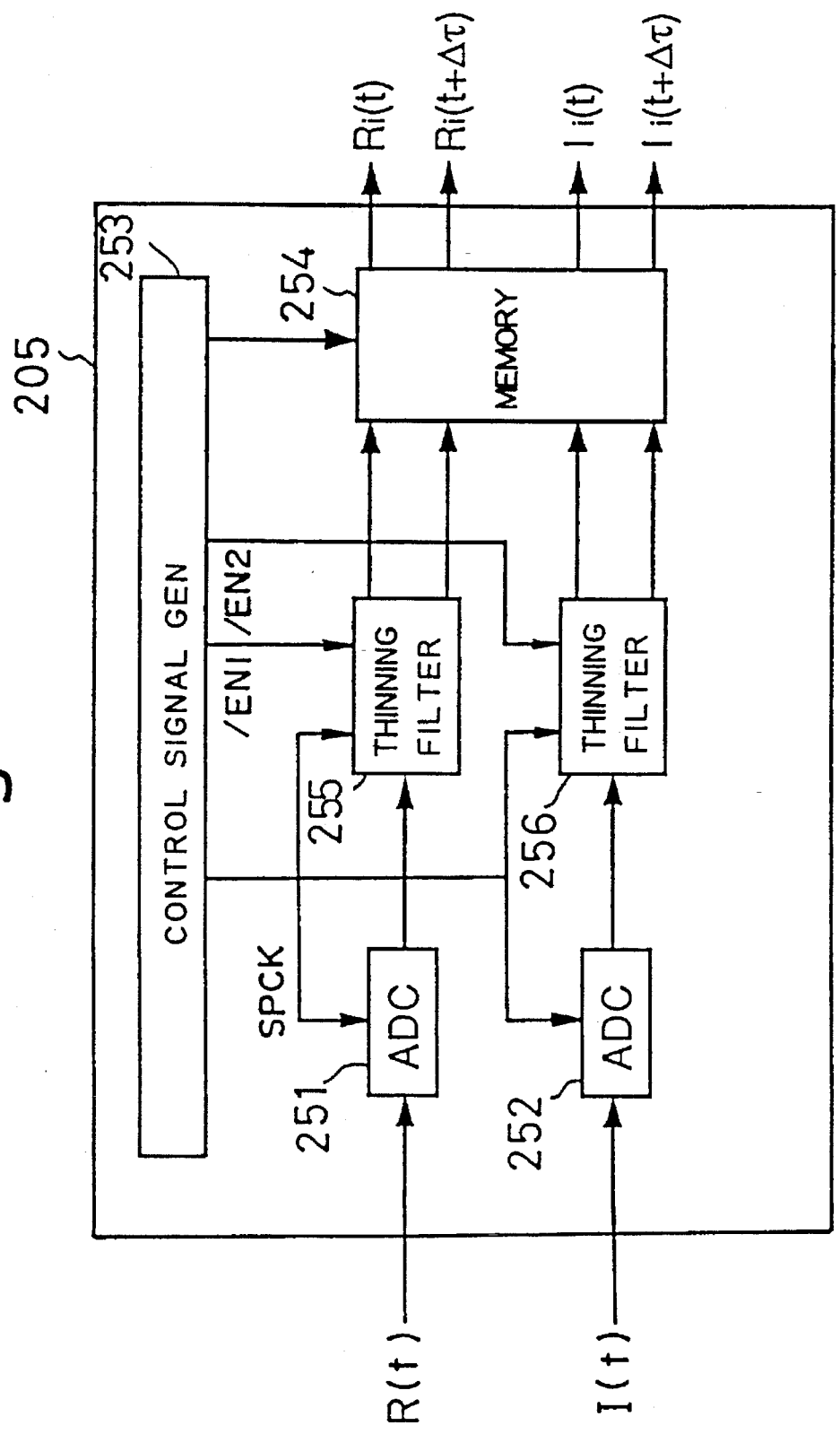
FIG. 22 is a circuit block diagram showing a circuit arrangement, by way of example, of means for generating a plurality of complex signals at intervals of time difference $\Delta\tau$, as shown in FIG. 14 with a block.

FIG. 22 is a circuit block diagram showing a circuit arrangement, by way of example, of means 205 for generating a plurality of complex signals at intervals of time difference $\Delta\tau$, as shown in FIG. 14 with a block.

The circuit block shown in FIG. 22 receives a complex signal (digital) $[h_{ci}(t)+j\ h_{si}(t)]$ which is produced by the complex signal conversion circuit 204 shown in FIG. 14.

Real part $h_{ci}(t)$ and imaginary part $h_{si}(t)$ of the first complex signal $[h_{ci}(t)+j\ h_{si}(t)]$ are supplied to thinning filters 255 and 256, respectively.

Figure 23:
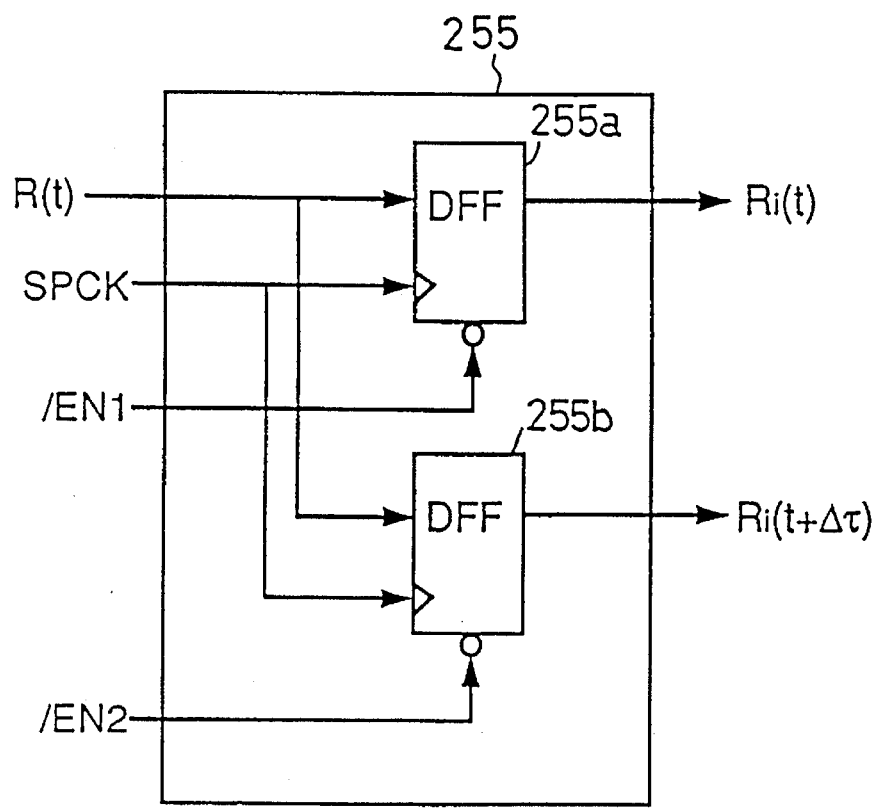
FIG. 23 is a circuit block diagram showing a circuit arrangement, by way of example, of the thinning filter shown in FIG. 22 with a block.
Figure 24:
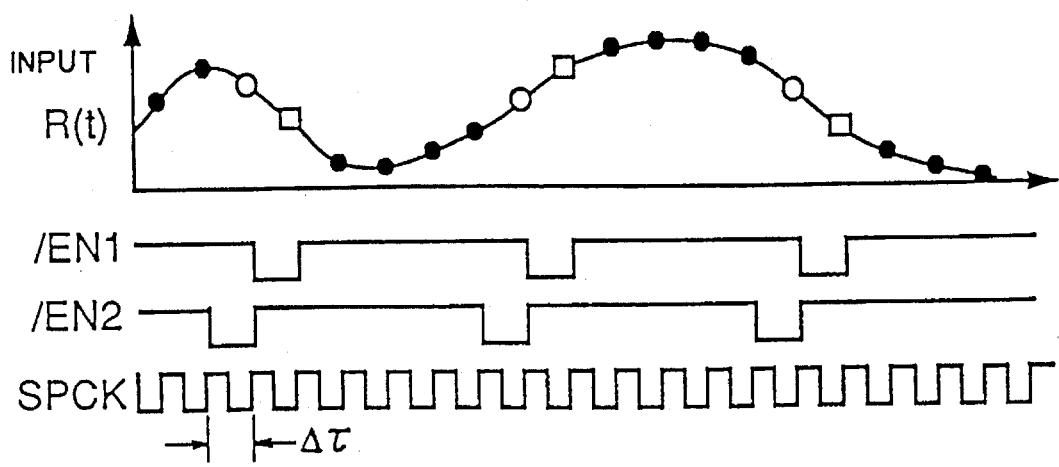
FIG. 24 is a time chart useful for understanding an operation of the thinning filter.

FIG. 23 is a circuit block diagram showing a circuit arrangement, by way of example, of the thinning filter shown in FIG. 22 with a block. FIG. 24 is a time chart useful for understanding an operation of the thinning filter. Thinning filters 255 and 256 are the same as each other in the structure. Hence, only thinning filter 255 will be explained.

The thinning filter 255 comprises two D-type flip-flops 255a and 255b. A digital signal R(t) involved in the real part is applied to the respective data input terminals of the D-type flip-flops 255a and 255b. The digital signal R(t) is, as shown in FIG. 24, equivalent to a signal which is subjected to sampling with the sampling clock signal SPCK having a period equal to 1/N (N: integer, here N=1) of a period of the above-mentioned time difference $\Delta\tau$. The digital signal R(t) is expressed in the form of assembling of time sequence data depicted with black dots, white dots and square marks in FIG. 24. Applied to the respective clock input terminals of the D-type flip-flops 255a and 255b is the sampling clock signal SPCK. Further, applied to reset terminals of the D-type flip-flops 255a and 255b is signals/EN1 and/EN2 shown in FIG. 24, respectively.

In accordance with such an arrangement, the digital signal R(t) is subjected to the thinning process through the D-type flip-flops 255a and 255b, and as a result, the D-type flip-flops 255a and 255b output signals $R_i(t)$ and $R_i(t+\Delta\tau)$, respectively, which are mutually shifted by time difference $\Delta\tau$. Likewise, the other thinning filter 256 shown in FIG. 22 outputs signals $I_i(t)$ and $I_i(t+\Delta\tau)$. These signals $R_i(t)$, $R_i(t+\Delta\tau)$, $I_i(t)$ and $I_i(t+\Delta\tau)$ are temporarily stored in a memory 254. It is noted that the combination $[R_i(t)+j\ I_i(t)]$ of the signals $R_i(t)$ and $I_i(t)$ and the combination $[R_i(t+\Delta\tau)+j\ I_i(t+\Delta\tau)]$ of the signals $R_i(t+\Delta\tau)$ and $I_i(t+\Delta\tau)$ are referred to as the second complex signal and the third complex signal, respectively.

Figure 25:
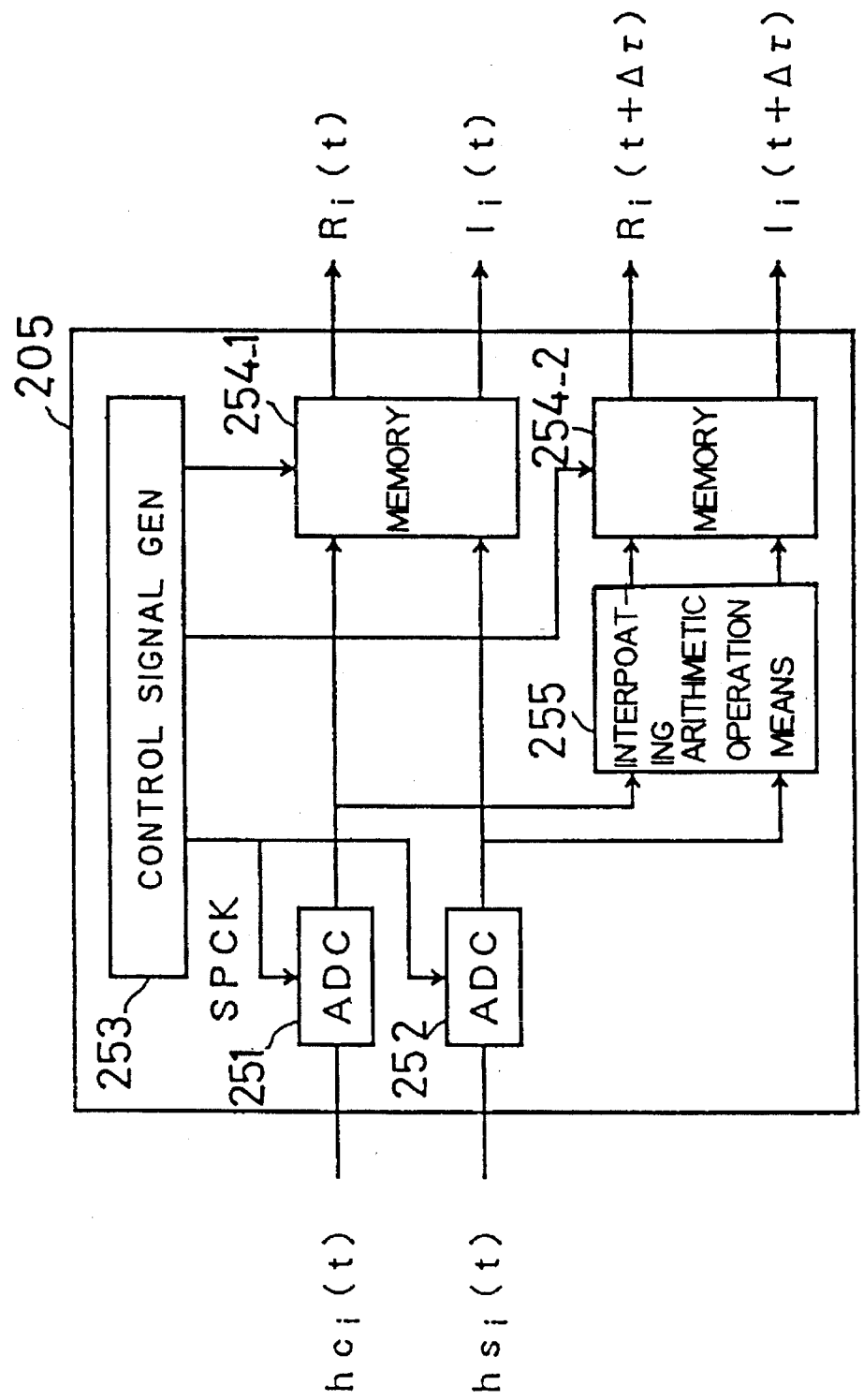
FIGS. 25 and 26 are each a circuit block diagram showing a circuit arrangement, by way of example, of means for generating a plurality of complex signals at intervals of time difference $\Delta\tau$, as shown in FIG. 14 with a block.
Figure 26:
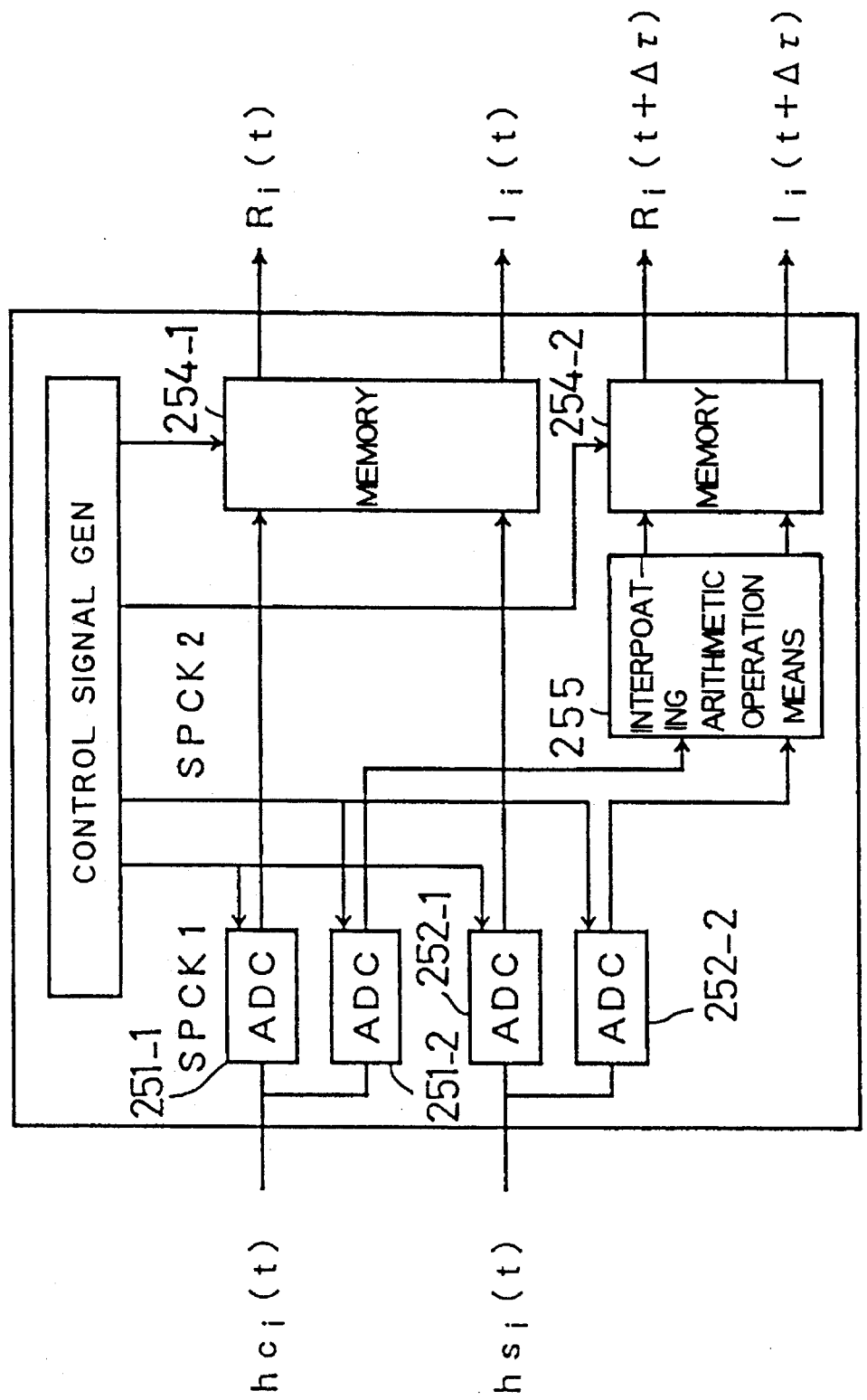

FIGS. 25 and 26 are each a circuit block diagram showing a circuit arrangement, by way of example, of means 205 for generating a plurality of complex signals at intervals of time difference $\Delta\tau$, as shown in FIG. 14 with a block.

Comparing FIG. 25 with FIG. 19, the circuit block shown in FIG. 20 includes interpolating arithmetic operation means 255, and the memory 254 shown in FIG. 19 is depicted, in FIG. 25, in separation into two parts of memories 254_1 and 254_2.

In a case where the sampling clock signal SPCK used in the circuit shown in FIG. 25 is not available for a sampling in timing shifted by the above-mentioned time difference $\Delta\tau$, in other words, for example, in a case where as the sampling clock signal SPCK, a clock signal, which is the same as the clock signal CLK as shown in FIG. 21(a), is used in spite of the fact that a desired time difference $\Delta\tau$ is the time difference $\Delta\tau$ shown in FIG. 21(b), performing the interpolating arithmetic operation makes it possible to produce a complex signal which is shifted by the desired time difference $\Delta\tau$.

Figure 27:
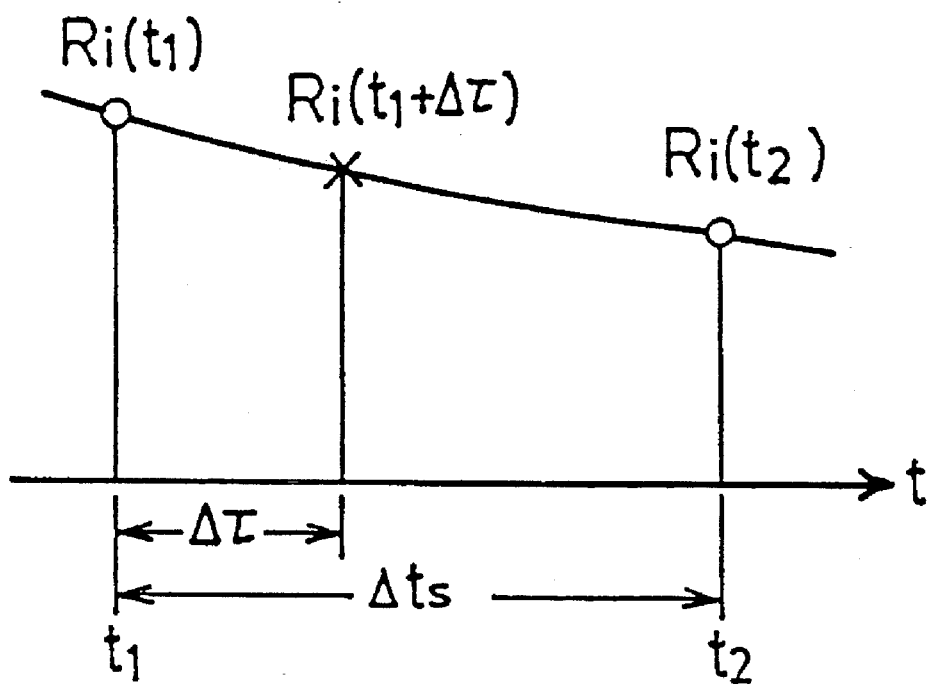
FIG. 27 is an illustration useful for understanding an example of an interpolating operation in the interpolating operation means shown in FIG. 25.

FIG. 27 is an illustration useful for understanding an example of an interpolating arithmetic operation in the interpolating arithmetic operation means 255 shown in FIG. 25.

It is assumed that a signal involved in real part $h_{ci}(t)$ of the entered complex signal $[h_{ci}(t)+j\ h_{si}(t)]$ is subjected to sampling at intervals of $\Delta t_s$, and as a result signals $R_i(t_1)$ and $R_i(t_2)$ are obtained through sampling at time points $t_1$ and $t_2$, respectively, which are apart from each other by $\Delta t_s$, as shown in FIG. 27. In this case, signal $R_i(t_1+\Delta\tau)$ at the time point $t_1+\Delta\tau$ is calculated by the following equation:

$$R_i(t+\Delta\tau) = \frac{1}{\Delta t_s}\{\Delta\tau \cdot R_i(t_2) + (\Delta t_s - \Delta\tau) \cdot R_i(t_1)\} \quad (66)$$

This is the similar as to the matter of the imaginary part.

In the circuit shown in FIG. 27, the signals digitalized by the A/D converters 251 and 252 are stored in the memory 254_1, without any changes, in the form of the second complex signal $[R_i(t)+j\ I_i(t)]$. In addition, the signals digitalized by the A/D converters 251 and 252 are supplied to an interpolating arithmetic operation means 255 in which the interpolating arithmetic operation is performed, with regard to both the real part and the imaginary part, in accordance with equation (66), thereby producing the third complex signal $[R_i(t+\Delta\tau)+j\ I_i(t+\Delta\tau)]$ which is shifted by time difference $\Delta\tau$ and being passed to the memory 254_2.

While the above-noted equation (66) is an example as to a primary interpolation, the interpolating arithmetic operation means 255 is not restricted to one which performs the primary interpolation. It is acceptable to arrange the interpolating arithmetic operation means in such a manner that an optional order of interpolation is implemented taking account of an arithmetic speed, a required precision of the interpolation and the like.

FIG. 26 shows an example in which the interpolating arithmetic operation means 255 is added to the arrangement which is similar to that shown in FIG. 20. An operation thereof will be self-explanatory from the description referring to FIGS. 20 and 25. Hence, the redundant explanation will be omitted.

As described above, the means 205 for generating a plurality of complex signals at intervals of time difference $\Delta\tau$, which is shown in FIG. 14, can be implemented with variable arrangements.

Figure 28:
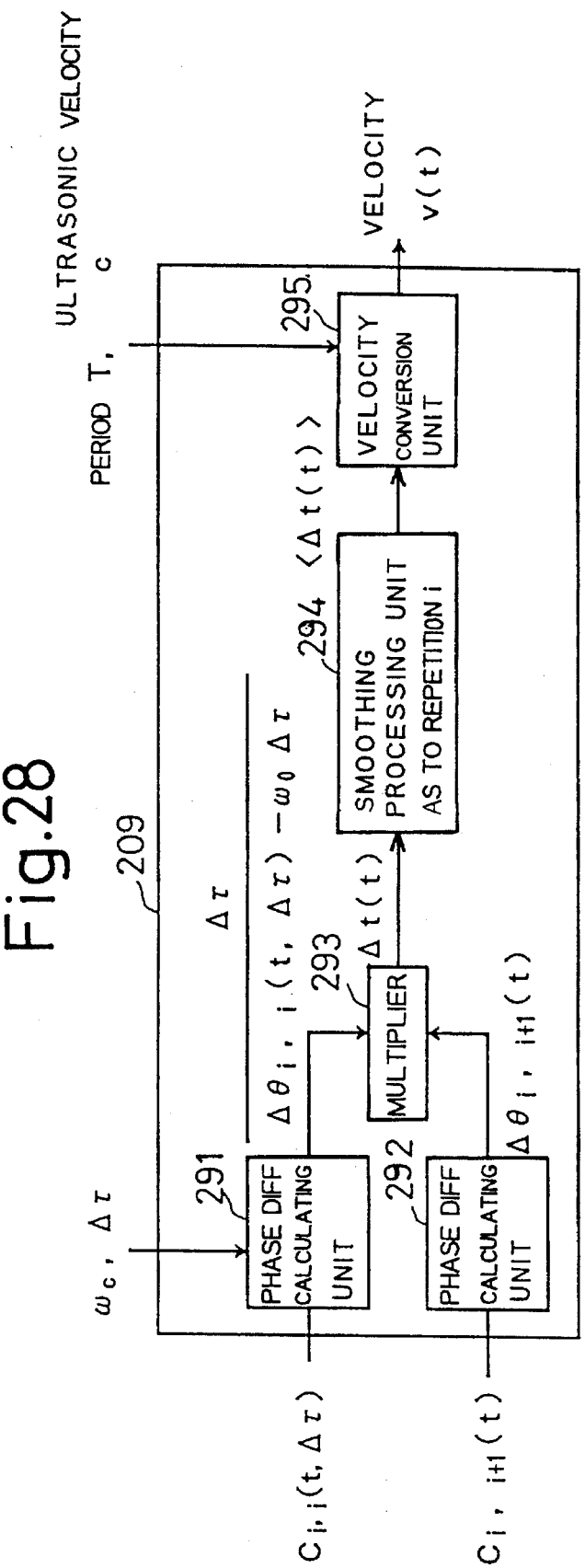
FIGS. 28–30 are each a circuit block diagram showing a circuit arrangement, by way of example, of the velocity calculating means shown in FIG. 14.
Figure 29:
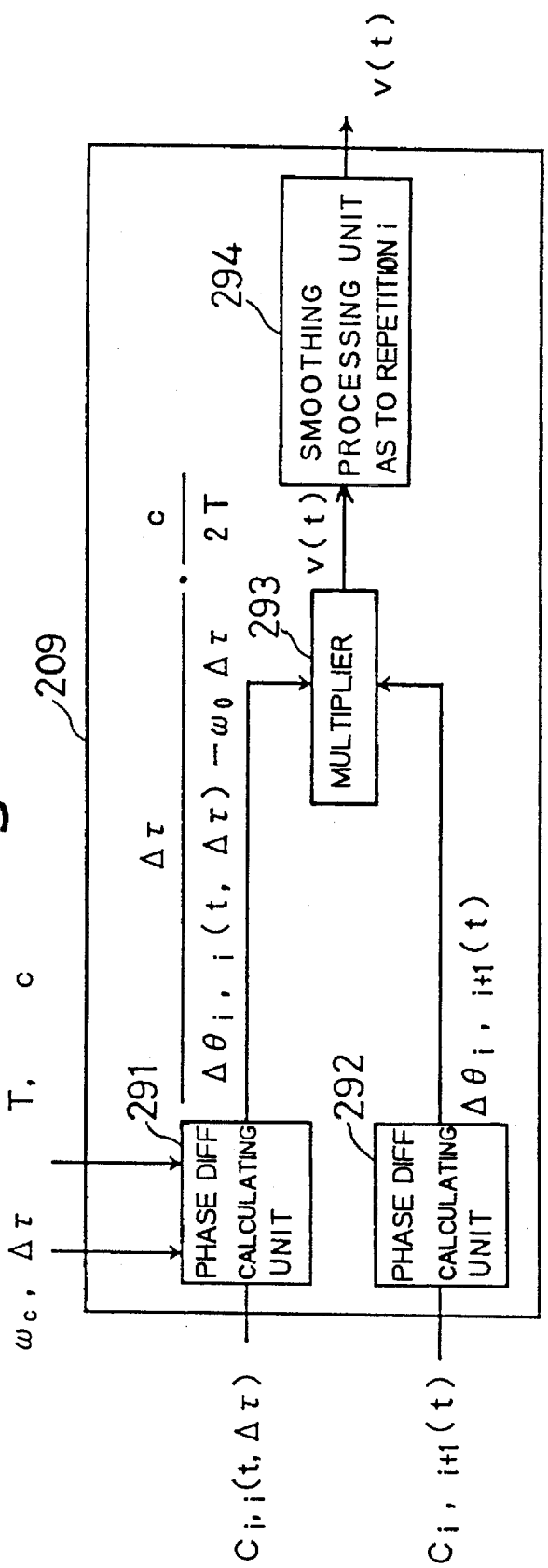

FIGS. 28–29 are each a circuit block diagram showing a circuit arrangement, by way of example, of the velocity calculating means shown in FIG. 14.

The velocity calculating means shown in FIG. 28 has two phase difference calculating units 291 and 292 to which correlation signals $C_{i,i}(t,\Delta\tau)$ and $C_{i,i+1}(t)$ calculated by the complex correlation arithmetic operation unit 208 shown in FIG. 14 are supplied, respectively. The phase difference calculating unit 291 receives the reference angular frequency $\omega_o$ involved in determination of the complex signal $[h_{ci}(t)+j\ h_{si}(t)]$ by the complex signal conversion circuit 204 and the above-mentioned time difference $\Delta\tau$ from the overall control unit (not illustrated) for controlling the system shown in FIG. 14 in its entirety. And the phase difference calculating unit 291 outputs an operation result of a part $\Delta\tau/\{\Delta\theta_{i,i}(t,\Delta t)-\omega_o\Delta\tau\}$ of the following equation:

$$\Delta t = \frac{\Delta\theta_{i,i+1}(t)}{\Delta\theta_{i,i}(t,\Delta t) - \omega_0\Delta\tau} \cdot \Delta\tau \quad (67)$$

This equation (67) has been obtained by rewriting equation (23) to meet the present embodiment with respect to the suffix and the like. The phase difference calculating unit 291 may be implemented by a ROM (Read Only Memory) which stores $\Delta\tau/\{\Delta\theta_{i,i}(t,\Delta t)-\omega_o\Delta\tau\}$ as storage data, and $C_{i,i}(t,\Delta\tau)$, $\omega_o$, $\Delta\tau$ as address. The operation result $\Delta\tau/\{\Delta\theta_{i,i}(t,\Delta t)-\omega_o\Delta\tau\}$ outputted from the phase difference calculating unit 291 is applied to a multiplier 293.

The phase difference calculating unit 292 is arranged to receive the phase signal $C_{i,i+1}(t)$ and to output $\Delta\theta_{i,i+1}(t)$. The phase difference calculating unit 292 may be also implemented by a ROM which stores $\Delta\theta_{i,i+1}(t)$ as storage data, and $C_{i,i+1}(t)$ as address. The phase difference $\Delta\theta_{i,i+1}(t)$ outputted from the phase difference calculating unit 292 is also applied to the multiplier 293.

The multiplier 293 multiplies $\Delta\theta/\{\Delta\theta_{i,i}(t\Delta t)-\omega_o\Delta\tau\}$ by $\Delta\theta_{i,i+1}(t)$, which are supplied from the phase difference calculating units 291 and 292, respectively, so as to calculate a time difference $\Delta t$ corresponding to a movement amount of the subject, as given by equation (67). The time difference $\Delta t$ is applied to a smoothing processing unit 294 as to repetition i. Here, ultrasonic beams are each transmitted eight times for each the same direction within the subject, and a plurality of time differences $\Delta t$ are determined while transmitting. The smoothing processing unit 294 as to repetition i serves to determine an average value $<\Delta t>$ of the time differences $\Delta t$ determined over a plurality of times. This average value $<\Delta t>$ is applied to a velocity conversion unit 295. Also applied to the velocity conversion unit 295 are the repetitive period T of transmission of the ultrasonic beams and the ultrasonic velocity c within the subject, from the overall control unit (not illustrated). Thus, the velocity conversion unit 295 calculates the velocity V(t) based on the following equation:

$$V(t) = \frac{c}{2T} \cdot <\Delta t> \quad (68)$$

On the other hand, in the velocity calculating means 209 shown in FIG. 29, the period T and the ultrasonic velocity c are additionally applied to the phase difference calculating unit 291. And the phase difference calculating unit 291 outputs the following velocity:

$$V(t) = \frac{\Delta\tau}{\Delta\theta_{i,i}(t,\Delta\tau) - \omega_0\Delta\tau} \cdot \frac{c}{2T}$$

Thus, the multiplier 293 serves to determine the velocity V(t) every time, and the smoothing processing unit 294 as to repetition i serves to determine the average velocity V(t).

Figure 30:
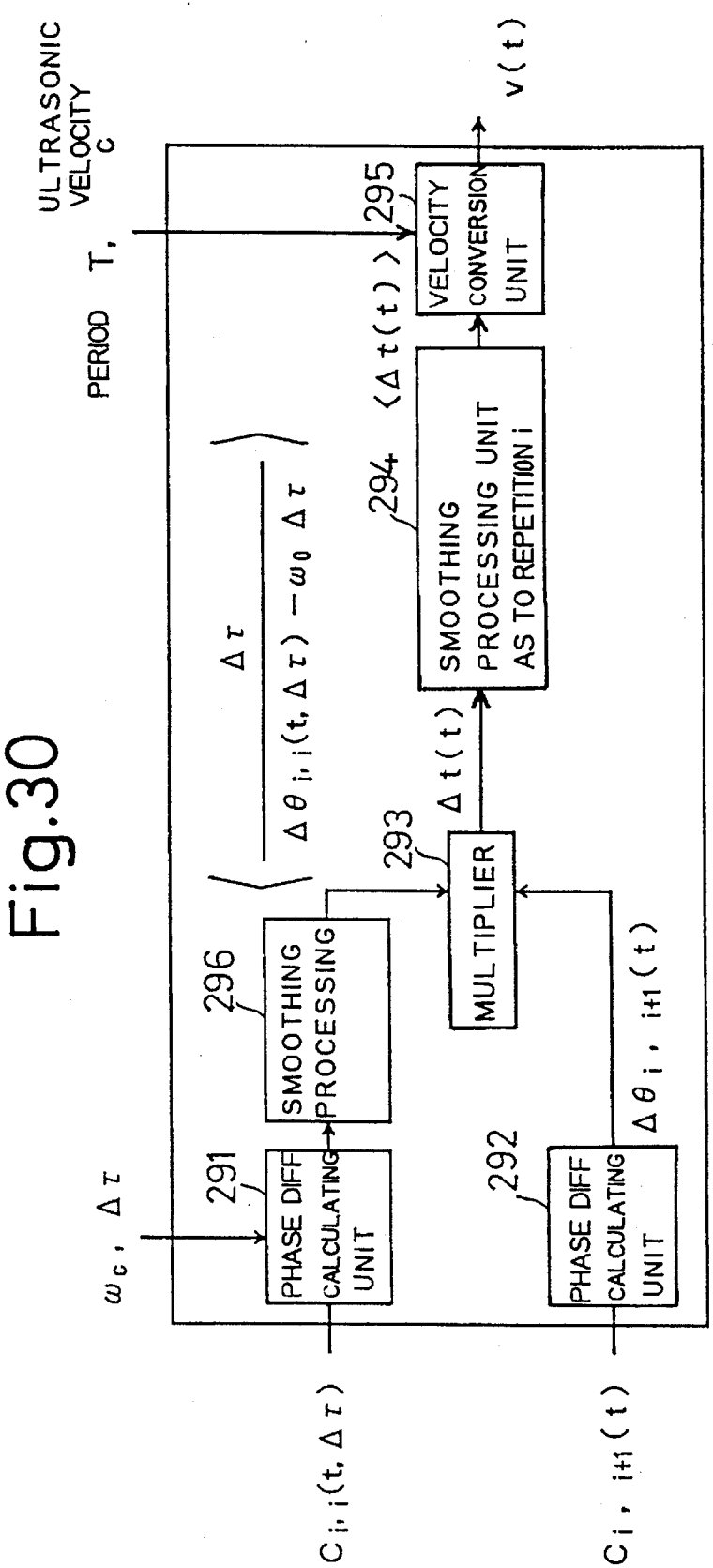
Figure 32:
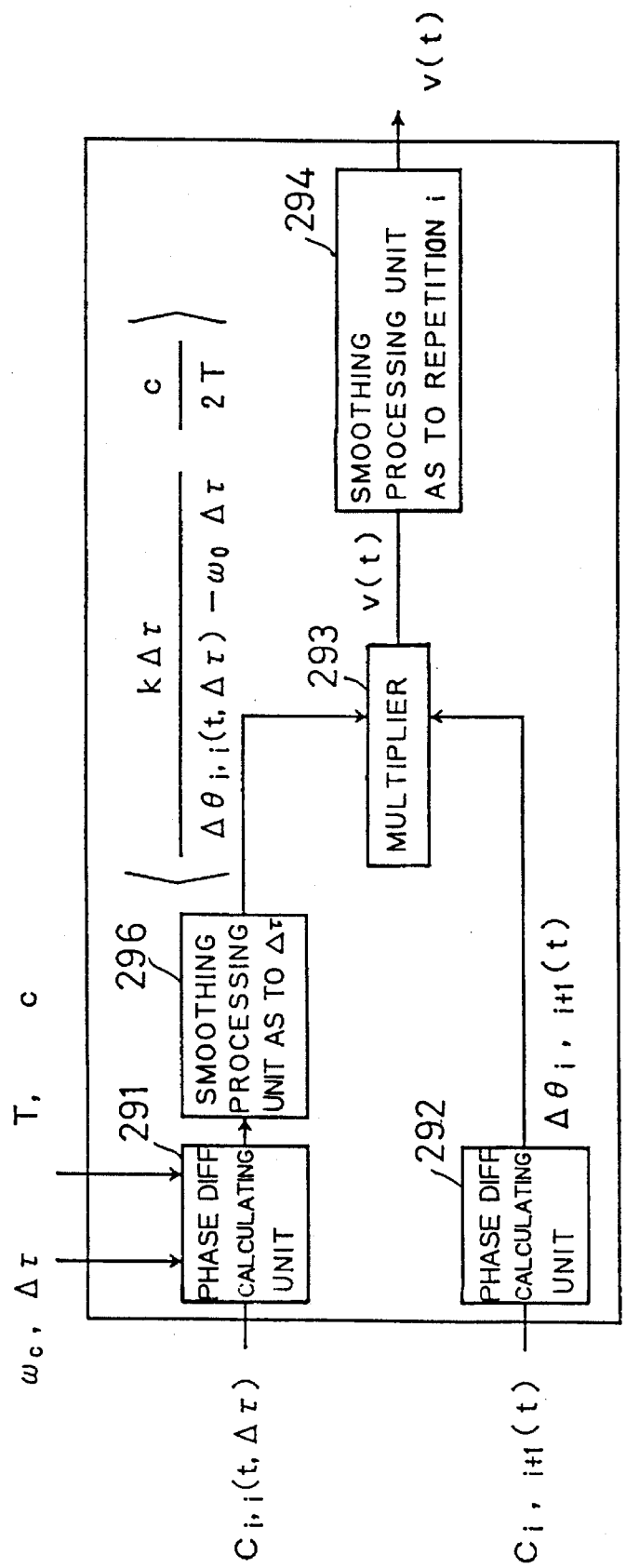
FIG. 32 is a circuit block diagram showing a circuit arrangement, by way of example, of the velocity calculating means shown in FIG. 14.

FIGS. 30 and 32 are each a circuit block diagram showing a circuit arrangement, by way of example, of the velocity calculating means 209 shown in FIG. 14.

In comparison of the circuit arrangement of the velocity calculating means shown in FIG. 30 with that in FIG. 28, the circuit arrangement shown in FIG. 30 is different from that in FIG. 28 in only such a point that a smoothing processing unit 296 as to $\Delta\tau$ is provided between the phase difference calculating unit 291 and the multiplier 293.

In the smoothing processing unit 296 as to $\Delta\tau$, for example, in a case where a plurality of time differences $\Delta\tau$ are determined in a fashion as shown in part (b) of FIG. 21, or in a case where a plurality of time differences $\Delta\tau$ are determined in accordance with an interpolating arithmetic operation and the like, there is performed a smoothing process as to the time difference $\Delta\tau$ for a plurality of operation results each corresponding to the associated one of a plurality of time differences $\Delta\tau$ outputted from the phase difference calculating unit 291.

Figure 31A:
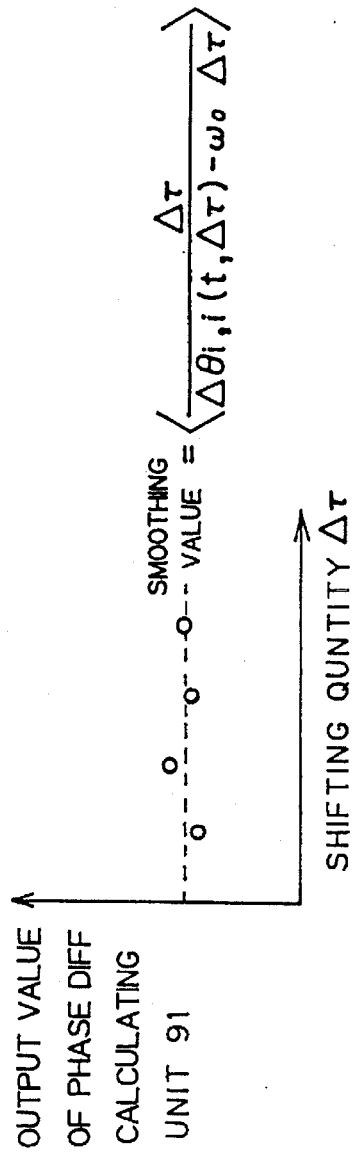
FIGS. 31(A) and (B) are each an illustration useful for understanding a technique of smoothing as to time difference $\Delta\tau$.
Figure 31B:
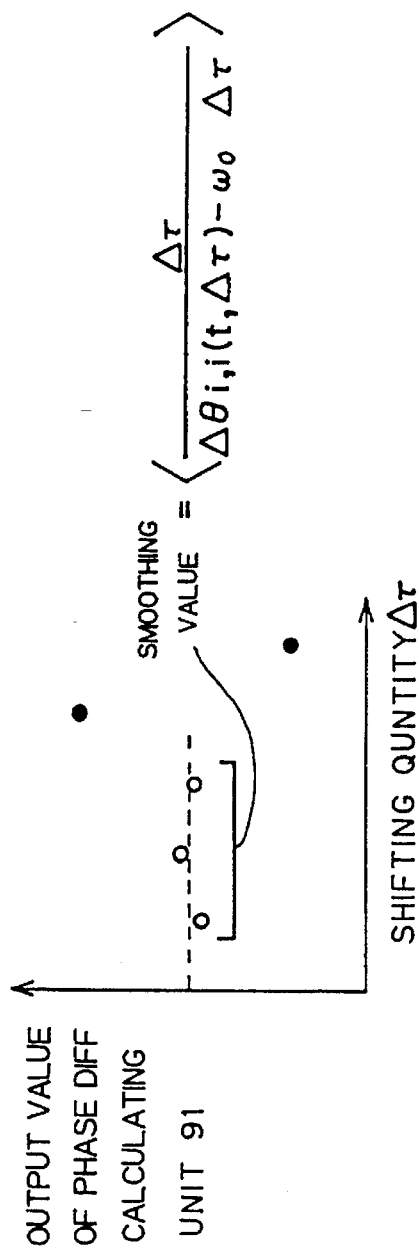

FIGS. 31 (A) and (B) are each an illustration useful for understanding a technique of smoothing as to time difference $\Delta\tau$.

FIG. 31 (A) shows that providing mutually different time differences $\Delta\tau$ permits a plurality of operation results outputted from the phase difference calculating unit 291 (cf. FIG. 30) to be simply averaged. FIG. 31 (B) shows that in a case where extremely different values (shown by mark ●) are outputted from the phase difference calculating unit 291 owing to providing mutually different time differences $\Delta\tau$, a smoothing is performed as to the remainder removing the extremely different values. Incidentally, according to the present embodiment, the average process is performed with the same weight for the plurality of operation results due to providing mutually different time differences $\Delta\tau$. It is acceptable to perform a weighted mean through varying time difference $\Delta\tau$. In this manner, it is possible to determine the velocity V(t) with greater accuracy through not only performing averaging or equalizing during repetition of transmission of ultrasonic pulse beams in the same direction by the smoothing processing unit 294 as to repetition i, but also performing averaging of a plurality of operation results which are obtained from the complex signals involved in a plurality of time differences $\Delta\tau$.

FIG. 32 shows an example in which the smoothing processing unit 296 as to $\Delta\tau$ is added to the arrangement which is similar to that shown in FIG. 29. An operation thereof will be self-explanatory from the description referring to FIGS. 29 and 30. Hence, the redundant explanation will be omitted.

Next, there will be explained effects of the second ultrasonic diagnostic system of the present invention, which have been confirmed through simulation.

Figure 33A:
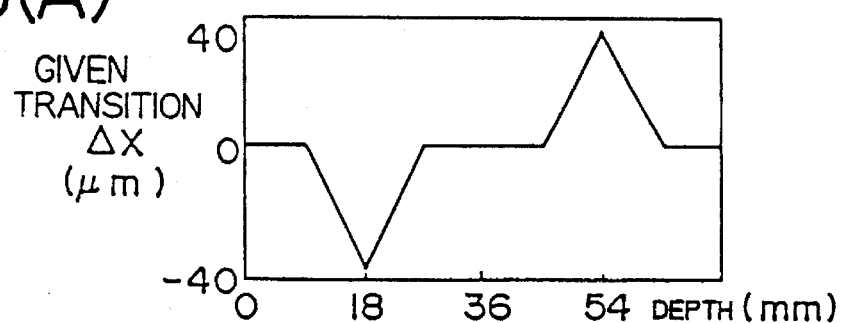
FIGS. 33(A)–(C) are each an illustration useful for understanding effects of the second ultrasonic diagnostic system according to an embodiment of the present invention.
Figure 33B:
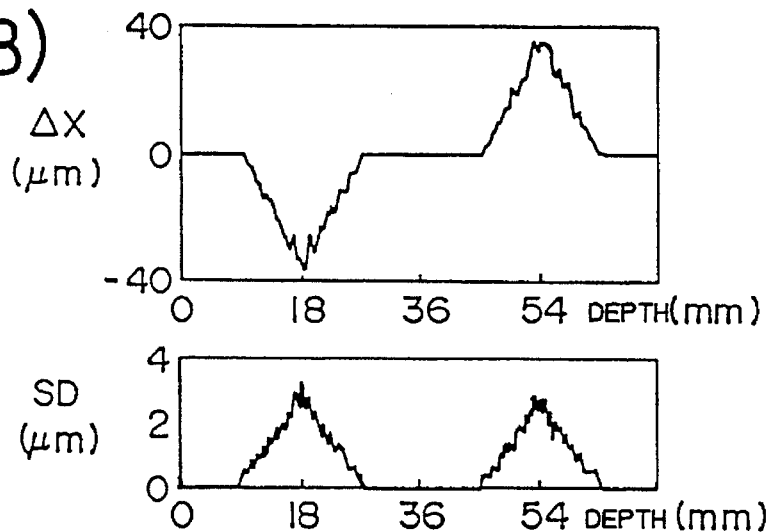
Figure 33C:
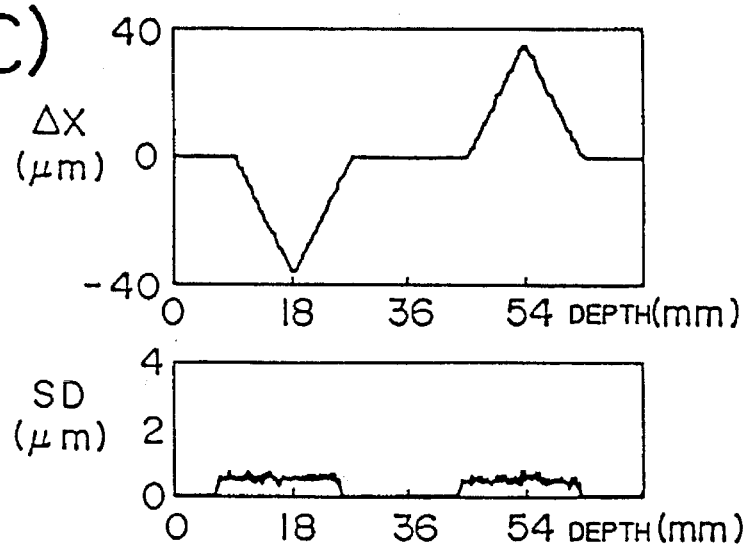

FIGS. 33(A)–(C) are each an illustration useful for understanding effects of the second ultrasonic diagnostic system according to an embodiment of the present invention.

FIG. 33(A) illustrates on a model basis transition with respect to the respective observation points in the depth direction along a predetermined direction within the subject. It is assumed that there happens transition within the subject, as shown in FIG. 33(A), between the first transmission and the second transmission of the ultrasonic pulse beams. These twice transmissions are paired, and then 64 sets of signals are produced, assuming that the subject is of a random ultrasonic scatter body. In this situation, added to the received signals is a random noise component in such a fashion that an S/N assumes 60 dB.

FIG. 33 B) is an illustration showing an estimate $\Delta x$ determined according to the conventional pulse-pair method on the basis of the signals produced in the manner as mentioned above and its standard deviation SD.

FIG. 33(C) is an illustration showing an estimate $\Delta x$ determined according to the technique of the present invention on the basis of the signals produced in the manner as mentioned above and its standard deviation SD.

As apparent from FIGS. 33(B) and (C), the estimate $\Delta x$ determined according to the technique of the present invention is more closer to the actually given transition ($\Delta x$ in FIG. 33(A)). And regarding the standard deviation SD of the estimate, according to the conventional pulse-pair method (FIG. 33(B)), it is remarkably varied in accordance with an amount of transition. On the contrary, according to the technique of the present invention, the standard deviation SD assumes the substantially constant variance.

Figure 34A:
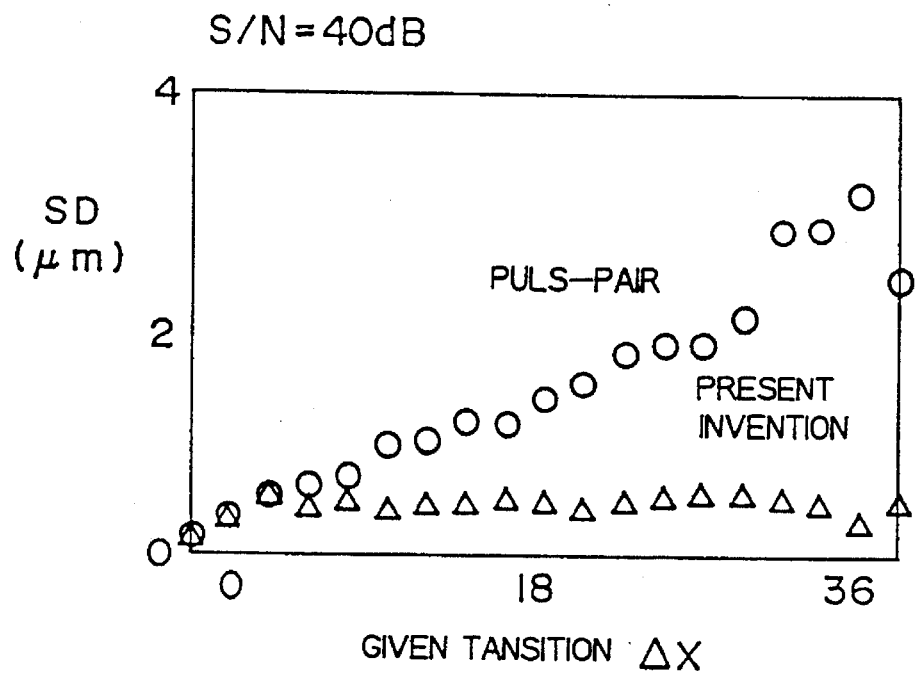
FIGS. 34(A)–(B) are each an additional illustration useful for understanding effects of the second ultrasonic diagnostic system according to an embodiment of the present invention.
Figure 34B:
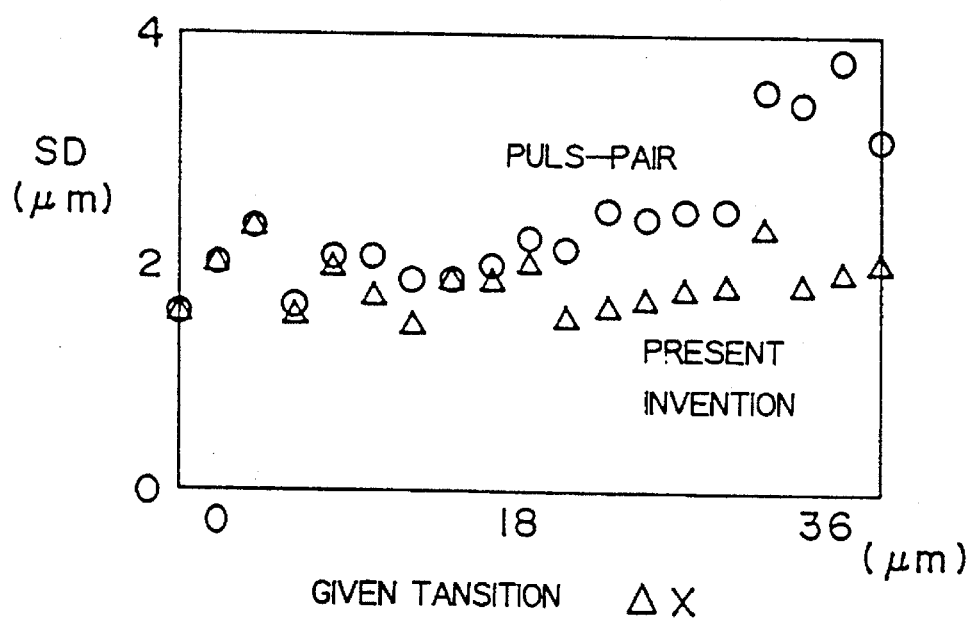

FIGS. 34(A)–(B) are each an additional illustration useful for understanding effects of the second ultrasonic diagnostic system according to an embodiment of the present invention.

FIG. 34(A) illustrates a difference in standard deviation SD between the pulse-pair method and the technique of the present invention, in case of S/N: 40 dB, with the given transition $\Delta x$ as abscissa. FIG. 34(B) illustrates a difference in standard deviation SD between the pulse-pair method and the technique of the present invention, in case of S/N: 20 dB, with the given transition $\Delta x$ as abscissa. In case of S/N: 40 dB, the technique of the present invention is remarkably excellent in an estimated precision comparing with the pulse-pair method. And in case of S/N: 20 dB, while the difference is little, the technique of the present invention is also excellent in an estimated precision comparing with the pulse-pair method.

Next, there will be described an embodiment of the third ultrasonic diagnostic system of the present invention.

Figure 35:
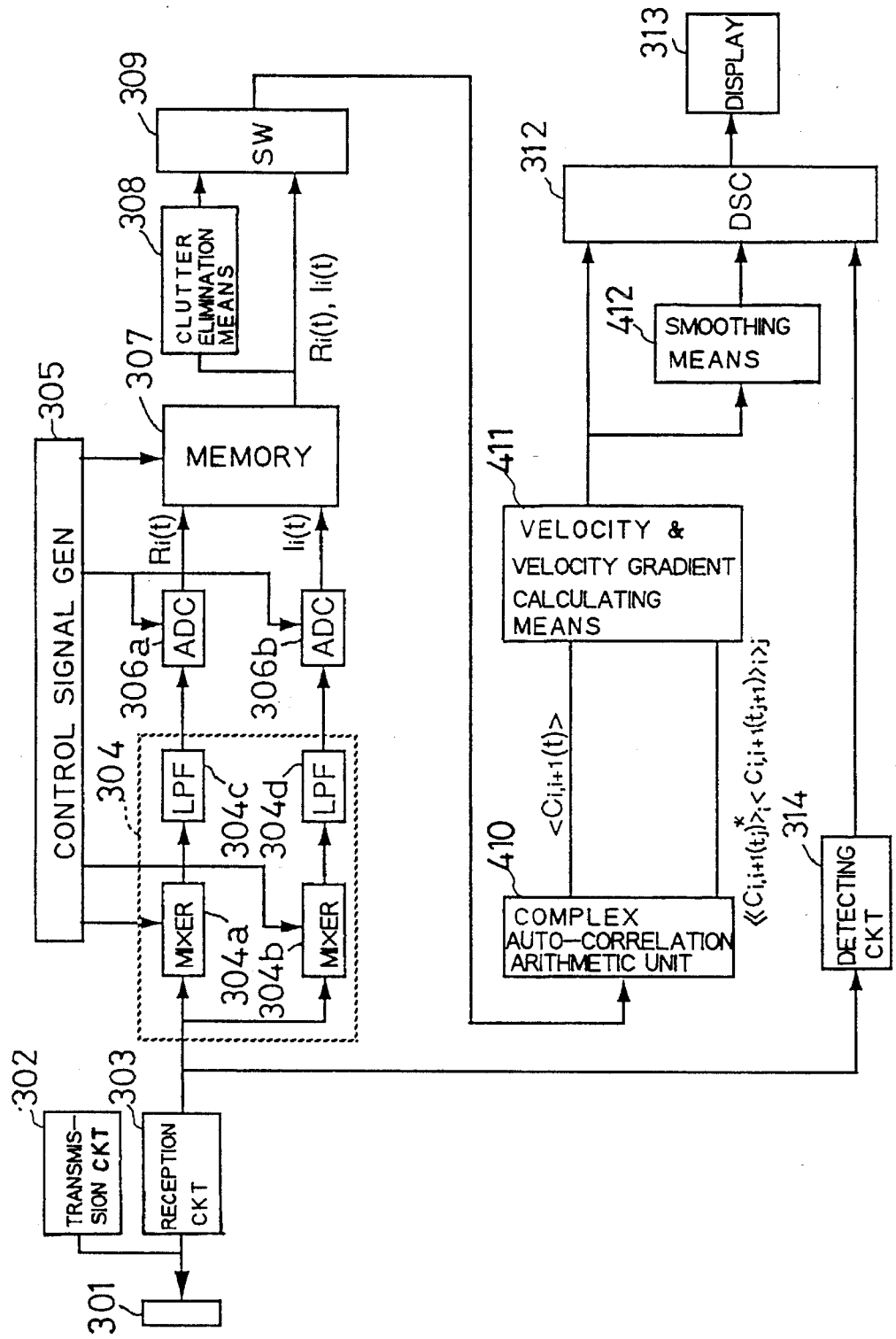
FIG. 35 is a schematic diagram of the third ultrasonic diagnostic system according to an embodiment of the present invention.
Figure 42:
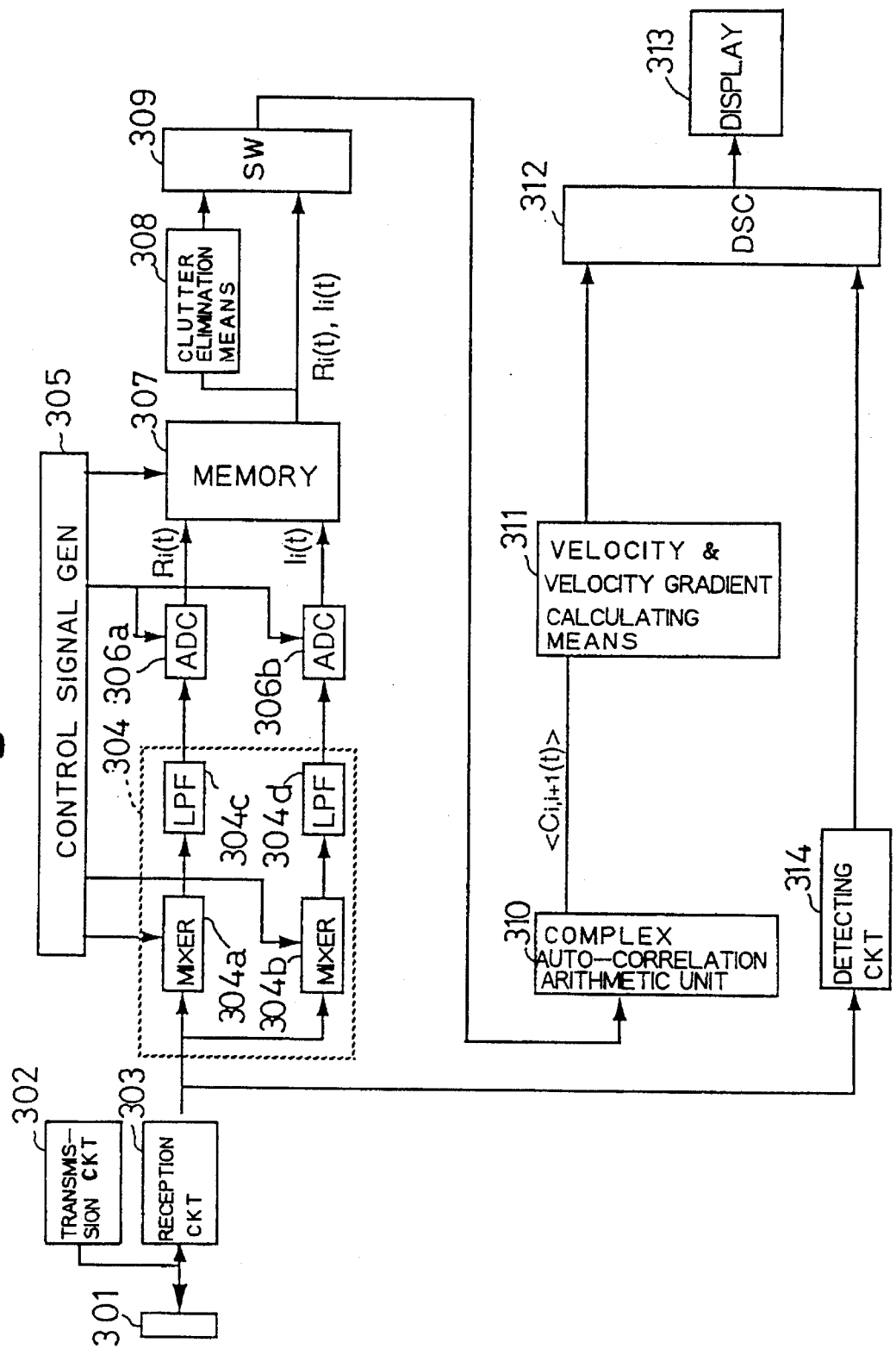
FIG. 42 is a block diagram of the related art of ultrasonic diagnostic system.

FIG. 35 is a schematic diagram of the third ultrasonic diagnostic system according to an embodiment of the present invention. In FIG. 35, the same parts are denoted by the same reference numbers as those of FIG. 42. Only different points will be described, and redundant descriptions will be omitted.

A complex auto-correlation arithmetic operation unit 410 in the ultrasonic diagnostic system shown in FIG. 35 calculates not only a complex auto-correlation value $<C_{i,i+1}(t)>_i$ involved in the repetitive direction (during the i-th transmission and the (i+1)-th transmission), but also a complex auto-correlation value (secondary complex auto-correlation value) $<<C_{i,i+1}(t_j)>_i{}^*<C_{i,i+1}(t_{j+1})>_i>_j$ as to the depth direction, of the complex auto-correlation value $<C_{i,i+1}(t)>_i$, which both values are supplied to a velocity and velocity gradient calculating means 411. In the velocity and velocity gradient calculating means 411, the complex auto-correlation value $<C_{i,i+1}(t)>_i$ is used to calculate a velocity V on the basis of equations (9) and (12), and the secondary complex auto-correlation value $<<C_{i,i+1}(t_j)>_i{}^*<C_{i,i+1}(t_{j+1})>_i>_j$ is used to calculate a velocity gradient dV/dz on the basis of equations (32) and (26). Incidentally, it is acceptable to arrange the velocity and velocity gradient calculating means 411 in such a manner that instead of directly calculating the velocity V and the velocity gradient dV/dz, a ROM (Read Only Memory) is used to store a corresponding table of the complex auto-correlation value $<C_{i,i+1}(t)>_i$ and the velocity V, and a corresponding table of the secondary complex auto-correlation value $<<C_{i,i+1}(t_j)>_i{}^*<C_{i,i+1}(t_{j+1})>_i>_j$ and the velocity gradient dV/dz, and the velocity V and the velocity gradient dV/dz are determined referring to those corresponding tables.

The ultrasonic diagnostic system shown in FIG. 35 is provided with smoothing means 412 for smoothing the velocity gradient dV/dz obtained by the velocity and velocity gradient calculating means 411. The smoothing means 412 serves to statistically stabilize the velocity gradient dV/dz obtained by the velocity and velocity gradient calculating means 411.

Incidentally, it is acceptable that the complex auto-correlation arithmetic operation unit 410 in the ultrasonic diagnostic system shown in FIG. 35 is to calculate a plurality of secondary complex auto-correlation values (secondary complex auto-correlation functions)R (k; $t_{j+2}$) based on equations (35), (43) or (44), instead of the secondary complex auto-correlation value $<<C_{i,i+1}(t_j)>_i^* <C_{i,i+1}(t_{j+1})>_i>_j$. In this case, the velocity and velocity gradient calculating means 411 determines the velocity gradient dV/dz by means of regression of phase $\angle R$ (k; $t_{j+2}$) obtained from the secondary complex auto-correlation values R (k; $t_{j+2}$) to odd function; an arithmetic operation based on equations (45) and (46); or referring to corresponding tables instead of the arithmetic operation.

Figure 36:
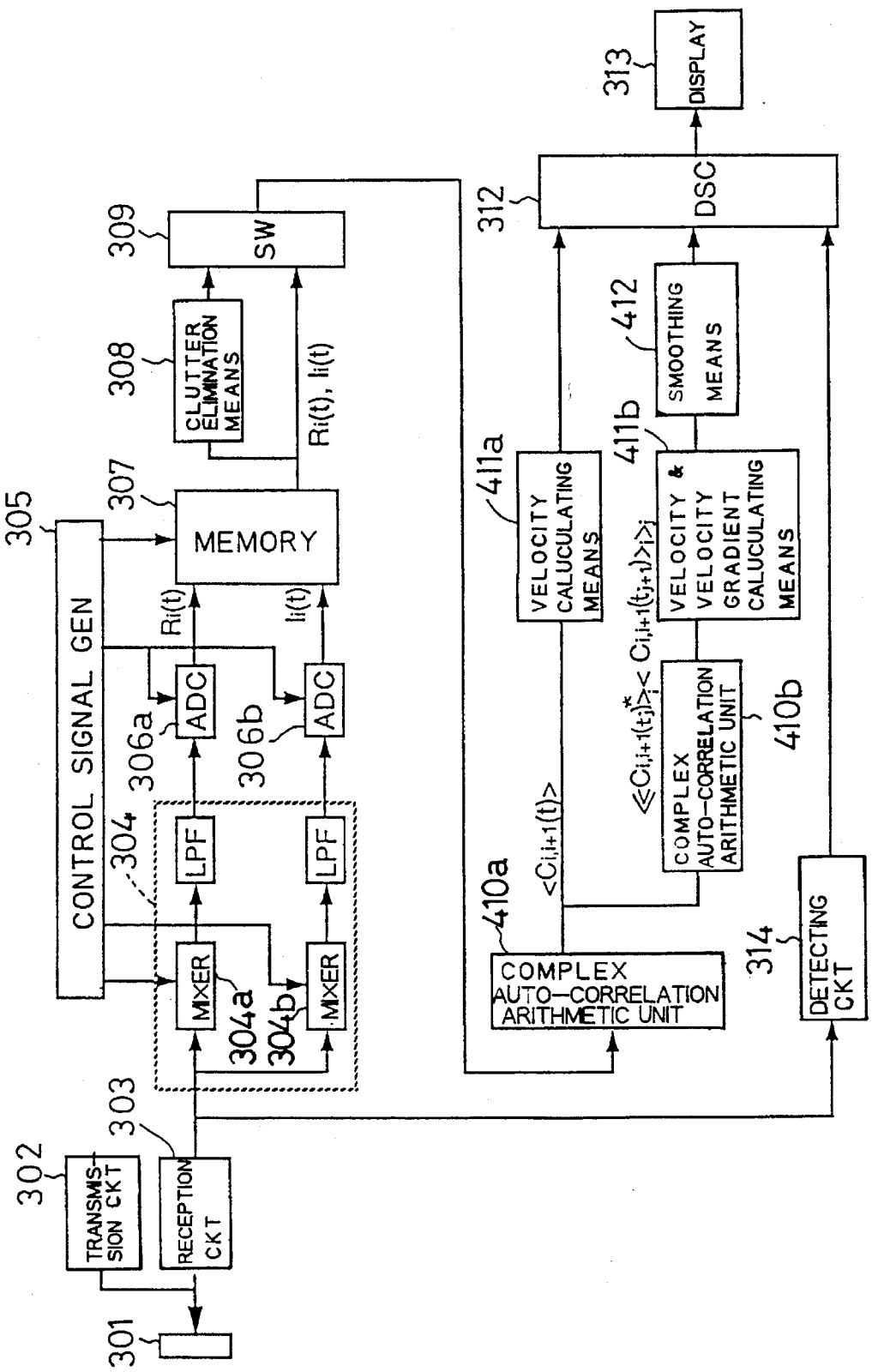
FIG. 36 is a schematic diagram of the third ultrasonic diagnostic system according to another embodiment of the present invention.

FIG. 36 is a schematic diagram of the third ultrasonic diagnostic system according to another embodiment of the present invention. Only the different points from the embodiment shown in FIG. 35 will be described.

The embodiment shown in FIG. 36 is provided with two complex auto-correlation arithmetic operation unit 410a and 410b instead of the complex auto-correlation arithmetic operation unit 410 shown in FIG. 35. The complex auto-correlation arithmetic operation unit 410a corresponds to the complex auto-correlation arithmetic operation unit 110 in the related art (FIG. 42), and serves to calculate a complex auto-correlation value $<C_{i,i+1}(t)>_i$ involved in the repetitive direction. The complex auto-correlation value $<C_{i,i+1}(t)>_i$ determined by the complex auto-correlation arithmetic operation unit 410a is applied to the other complex auto-correlation arithmetic operation unit 410b in which the secondary complex auto-correlation value $<<C_{i,i+1}(t_j)>_i^* <C_{i,i+1}(t_{j+1})>_i>_j$ is determined on the basis of the complex auto-correlation value $<C_{i,i+1}(t)>_i$.

Further, the embodiment shown in FIG. 36 is provided with a velocity calculating means 411a and a velocity gradient calculating means 411b, instead of the velocity and velocity gradient calculating means 411 shown in FIG. 35. The velocity calculating means 411a is comprised of a ROM (Read Only Memory) and the like for storing a corresponding table of the complex auto-correlation value $<C_{i,i+1}(t)>_i$ and the velocity V. Upon receipt of the complex auto-correlation value $<C_{i,i+1}(t)>_i$, the velocity calculating means 411a converts it into the velocity V. The velocity gradient calculating means 411b is comprised of a ROM and the like for storing a corresponding table of the secondary complex auto-correlation value $<<C_{i,i+1}(t_j)>_i^* <C_{i,i+1}(t_{j+1})>_i>_j$ and the velocity gradient dV/dz. Upon receipt of the secondary complex auto-correlation value $<<C_{i,i+1}(t_j)>_i^* <C_{i,i+1}(t_{j+1})>_i>_j$, the velocity gradient calculating means 411b converts it into the velocity gradient dV/dz.

Also in the embodiment shown in FIG. 36, similar to that in FIG. 35, it is acceptable that the complex auto-correlation arithmetic operation unit 410b is to calculate a plurality of secondary complex auto-correlation values (secondary complex auto-correlation functions) R (k; $t_{j+2}$) based on equations (35), (43) or (44), instead of the secondary complex auto-correlation value $<<C_{i,i+1}(t_j)>_i^* <C_{i,i+1}(t_{j+1})>_i>_j$. In this case, the velocity gradient calculating means 411b determines the velocity gradient dV/dz by means of regression of phase $\angle R$ (k; $t_{j+2}$) obtained from the secondary complex auto-correlation values R (k; $t_{j+2}$) to odd function; an arithmetic operation based on equations (45) and (46); or referring to corresponding tables instead of the arithmetic operation.

As apparent from these embodiments, it is possible to incorporate the function of determination of the velocity gradient into the system by means of additionally providing an equivalence of the complex auto-correlation arithmetic unit 310 in the related art (FIG. 42), or the use of the complex auto-correlation arithmetic unit 310 on a common basis, and further additionally providing an equivalence of the velocity calculating means comprising a ROM or the like, or increasing a storage capacity of the ROM of the velocity calculating means to be used on a common basis to the velocity gradient calculating means. Thus, according to the third ultrasonic diagnostic system of the present invention, it is possible to determine the velocity gradient with great accuracy through simply adding a few elements, without damaging an arrangement of the related art of ultrasonic diagnostic system.

The present invention is not limited to the particular embodiments described above. Various changes and modifications may be made within the spirit and scope of the invention.

We claim:

1. An ultrasonic diagnostic system comprising:

a transmitter-receiver for transmitting ultrasonic waves each in a scan line direction within a subject a plurality of number of times and receiving reflecting ultrasonic waves from an inside of the subject to generate received signals;

a quadrature detector for obtaining a quadrature detecting output of each of the received signals;

an auto-correlator for determining a complex auto-correlation value of the quadrature detecting output;

a movement information detector for detecting blood flow information within the subject or information as to a movement of a tissue within the subject on the basis of the complex auto-correlation value determined by said auto-correlator; and an average arithmetic unit for determining an averaging value of the complex auto-correlation values on a plurality of points adjacent to a predetermined point within the subject, wherein said movement information detector determines the blood flow information within the subject or the information as to a movement of a tissue within the subject on the basis of said averaging value.

2. A system according to claim 1, wherein said average arithmetic unit determines an averaging value of the complex auto-correlation values as to points on a plurality of scan lines adjacent to said predetermined point, which points are each in a same depth as said predetermined point.

3. A system according to claim 1, wherein said average arithmetic unit determines an averaging value of the complex auto-correlation values as to a plurality of points adjacent to each other a predetermined scan line.

4. A system according to claim 1, wherein said average arithmetic unit determines an averaging value of the complex auto-correlation values as to a plurality of points surrounding said predetermined point on a two-dimensional basis.

5. An ultrasonic diagnostic system comprising:

means for displaying a tomographic image of a subject on the basis of a received signal carrying information as to ultrasonic reflection along a scan line extending within the subject, said received signal being generated in such a manner that ultrasonic pulse beams are transmitted within the subject and reflecting ultrasonic waves from an inside of the subject are received by a plurality of ultrasonic transducers to perform a beamformation in phasing;

means for detecting a movement inside the subject on the basis of a plurality of received signals each carrying information as to ultrasonic reflection along a same scan line, said plurality of received signals being generated in such a manner that ultrasonic pulse beams are repeatedly transmitted in a same direction within the subject a plurality of number of times;

complex signal conversion means for converting the received signals before or after the beamformation in phasing into a first complex signal using a predetermined reference frequency $\omega_o$ of reference signal;

time shift complex signal producing means for producing from said first complex signal a second complex signal and a third complex signal, said second complex signal and said third complex signal being mutually shifted by a predetermined time difference $\Delta\tau$;

complex correlation calculating means for calculating complex correlation value $C_{i,i}(t,\Delta\tau)$ at a time point of time t, wherein when ultrasonic pulse beams are repeatedly transmitted in a predetermined direction within the subject, a reference time point of i-th transmission of the ultrasonic pulse beam is selected as a starting point, of the second and third complex signals associated with the i-th transmission of the ultrasonic pulse beam in said predetermined direction, and additional complex correlation value $C_{i,i+1}(t)$ at a time point of time t, wherein reference time points of i-th and (i+1)th of transmissions of the ultrasonic pulse beam in said predetermined direction are each selected as a starting point, of the second complex signal-to-second complex signal which are associated with the i-th and (i+1)th of transmissions of the ultrasonic pulse beam in said predetermined direction, respectively; and movement quantity calculating means for calculating on the basis of the complex correlation values $C_{i,i}(t,\Delta\tau)$ and $C_{i,i+1}(t)$ calculated by said complex correlation calculating means a quantity representative of a movement as to an observation point associated with the time t, within the subject, which movement will occur between the time points of i-th and (i+1)th of transmissions of the ultrasonic pulse beam.

6. A system according to claim 5, further comprising means for performing a beamformation process in phasing for a plurality of analog received signals derived from a plurality of ultrasonic transducers, wherein said complex signal conversion means includes a quadrature detector for performing a quadrature detection for the analog received signals subjected to the beamformation process in phasing using two analog sine wave signals, which are mutually different in phase by 90°, as said reference signal, thereby converting said received signals into the first complex signal in the form of analog.

7. A system according to claim 5, further comprising:

means for performing a beamformation process in phasing for a plurality of analog received signals derived from a plurality of ultrasonic transducers; and an A/D converter for converting the analog received signals outputted from said beamformation process means into digital received signals;

wherein said complex signal conversion means includes a quadrature detector for performing a quadrature detection for the digital received signals outputted from said A/D converter using two digital sine wave signals, which are mutually different in phase by 90°, as said reference signal, thereby converting said received signals into the first complex signal in the form of digital.

8. A system according to claim 5, further comprising:

an A/D converter for converting a plurality of analog received signals derived from a plurality of ultrasonic transducers into a plurality of digital received signals;

means for performing a beamformation process in phasing for the plurality of digital received signals outputted from said A/D converter, wherein said complex signal conversion means includes a quadrature detector for performing a quadrature detection for the digital received signals outputted from said beamformation process means using two digital sine wave signals, which are mutually different in phase by 90°, as said reference signal, thereby converting said received signals into the first complex signal in the form of digital.

9. A system according to claim 5, wherein said complex signal conversion means includes a quadrature detector for performing a quadrature detection for a plurality of analog received signals outputted from a plurality of ultrasonic transducers or a plurality of digital received signals obtained through an A/D conversion of the plurality of analog received signals using two analog or digital sine wave signals, which are mutually different in phase by 90°, as said reference signal, thereby converting said received signals into a plurality of the first complex signals, and wherein said system further comprises means for performing a beamformation process in phasing for the plurality of the first complex signals derived by said complex signal conversion means, thereby obtaining the first complex signal subjected to the beamformation process in phasing.

10. A system according to claim 5, wherein said time shift complex signal producing means includes an A/D converter for converting real part and imaginary part of the first complex signal in the form of analog into digital signals, respectively, using a sampling clock consisting of clock pulses having time intervals $\Delta\tau$ corresponding to said time difference $\Delta\tau$, thereby producing the second complex signal in the form of digital and the third complex signal in the form of digital.

11. A system according to claim 5, wherein said time shift complex signal producing means includes an A/D converter for converting real part and imaginary part of the first complex signal in the form of analog into digital signals, respectively, using a sampling clock consisting of clock pulses each having a time interval $\Delta\tau$ corresponding to the time difference $\Delta\tau$, wherein 1/N (N: integer) of each of the respective operation time intervals for sequentially calculating a quantity representative of said movement of a plurality of observation points aligned in said predetermined direction within the subject for each observation point is expressed by the time difference $\Delta\tau$, thereby producing the second complex signal in the form of digital and the third complex signal in the form of digital.

12. A system according to claim 5, wherein said time shift complex signal producing means includes an A/D converter for converting real part and imaginary part of the first complex signal in the form of analog into digital signals, respectively, using a sampling clock having plurality of clock pulses of the time difference $\Delta\tau$ within a period, said period being equivalent to each of the respective operation time intervals for sequentially calculating a quantity representative of said movement of a plurality of observation points aligned in said predetermined direction within the subject for each observation point, thereby producing the second complex signal in the form of digital and the third complex signal in the form of digital.

13. A system according to claim 5, wherein said time shift complex signal producing means includes an A/D converter for converting both real part and imaginary part of the first complex signal in the form of analog into digital signals, using a plurality of sampling clocks mutually shifted in phase by the time difference $\Delta\tau$, respectively, thereby producing the second complex signal in the form of digital and the third complex signal in the form of digital.

14. A system according to claim 5, wherein said time shift complex signal producing means includes a thinning filter for thinning the first complex signal in the form of digital with a sampling interval of 1/N (N: integer) of the time difference $\Delta\tau$, thereby producing the second complex signal in the form of digital and the third complex signal in the form of digital, said second and third complex signals being mutually shifted by the time difference $\Delta\tau$.

15. A system according to claim 5, wherein said time shift complex signal producing means includes an interpolating means for interpolating the first complex signal in the form of digital, thereby producing the second complex signal in the form of digital and the third complex signal in the form of digital, said second and third complex signals being mutually shifted by the time difference $\Delta\tau$.

16. A system according to claim 5, wherein said time shift complex signal producing means includes an A/D converter for converting real part and imaginary part of the first complex signal in the form of analog into digital signals including the second complex signal, respectively, using a predetermined sampling clock, and interpolating arithmetic means for practicing an interpolating operation to said digital signals to produce the third complex signals.

17. A system according to claim 5, wherein said time shift complex signal producing means includes an A/D converter for converting real part and imaginary part of the first complex signal in the form of analog into digital signals including the second complex signal, respectively, using a sampling clock consisting of clock pulses each having a time interval corresponding to 1/N (N: integer) of each of the respective operation time intervals for sequentially calculating a quantity representative of said movement of a plurality of observation points aligned in said predetermined direction within the subject for each observation point, and interpolating arithmetic means for practicing an interpolating operation to said digital signals to produce the third complex signals.

18. A system according to claim 5, wherein said time shift complex signal producing means includes an A/D converter for converting real part and imaginary part of the first complex signal in the form of analog into digital signals including the second complex signal, respectively, using a sampling clock having plurality of clock pulses of a predetermined time difference within a period, said period being equivalent to each of the respective operation time intervals for sequentially calculating a quantity representative of said movement of a plurality of observation points aligned in said predetermined direction within the subject for each observation point, and interpolating arithmetic means for practicing an interpolating operation to said digital signals to produce the third complex signals.

19. A system according to claim 5, wherein said time shift complex signal producing means includes an A/D converter for converting both real part and imaginary part of the first complex signal in the form of analog into digital signals including the second complex signal, using a plurality of sampling clocks mutually shifted in phase, respectively, and interpolating arithmetic means for practicing an interpolating operation to said digital signals to produce the third complex signals.

20. A system according to claim 5, wherein said movement quantity calculating means calculates a time difference $\Delta t(t)_{i,i+1}$ between time point-to-point which are involved in reflection of ultrasonic pulse beams from the observation point in i-th and (i+1)th of transmissions of the ultrasonic pulse beam in the predetermined direction, respectively, wherein the respective reference time points of transmissions of ultrasonic pulse beams are each selected as a starting point regarding the associated reflection, on the basis of an equation set forth below:

$$\Delta t(t)_{i,i+1} = [\Delta\theta_{i,i+1}(t)/\{\Delta\theta_{i,i}(t,\Delta\tau) - \omega_o\Delta\tau\}] \cdot \Delta\tau$$

where $\Delta\theta_{i,i}(t,\Delta\tau)$ denotes a phase difference, at time point of the time t, of the first and second complex signals associated with the i-th transmission of the ultrasonic pulse beam in said predetermined direction, which phase difference is calculated from the complex correlation value $C_{i,i}(t,\Delta\tau)$; and $\Delta\theta_{i,i+1}(t)$ denotes a phase difference, at time point of the time t, of the first complex signal-to-first complex signal which are associated with the i-th and (i+1)th of transmissions of the ultrasonic pulse beam in said predetermined direction, respectively.

21. A system according to claim 5, wherein said movement quantity calculating means calculates, as a quantity representative of said movement, at least one selected from among a time difference $\Delta t$ between time point-to-point which are involved in reflection of ultrasonic pulse beams from the observation point in i-th and (i+1)th of transmissions of the ultrasonic pulse beam in the predetermined direction, respectively, wherein the respective reference time points of transmissions of ultrasonic pulse beams are each selected as a starting point regarding the associated reflection; a movement quantity of said observation point calculated on the basis of said time difference $\Delta t$ and an ultrasonic velocity c within the subject; and a movement velocity of said observation point calculated on the basis of said movement quantity and a repetitive period T of transmissions of the ultrasonic pulse beam in said predetermined direction.

22. A system according to claim 5, wherein said movement quantity calculating means determines a quantity representative of said movement subjected to a smooth process with respect to a plurality of said time difference $\Delta t$.

23. A system according to claim 5, wherein said movement quantity calculating means determines a quantity representative of said movement subjected to a smooth process with respect to transmissions of the ultrasonic pulse beam in said predetermined direction three times or more.

24. A system according to claim 5, further comprising space differentiation means for space-differentiating a quantity representative of said movement calculated by said movement quantity calculating means to determine a rate of change of the quantity representative of said movement with respect to said predetermined direction.

25. A system according to claim 5, further comprising information extraction means for extracting blood information, which the second complex signal and the third signal carry, from clutter component of information with separation.

26. A system according to claim 5, further comprising display means for displaying a quantity representative of said movement and/or a quantity calculated on the basis of the quantity representative of said movement through superposing those on the tomographic image.

27. An ultrasonic diagnostic system wherein received signals are generated in such a manner that ultrasonic pulse beams are transmitted within a subject and reflecting ultrasonic waves from an inside of the subject are received, said system comprising:

complex signal conversion means for converting the received signal into a complex signal consisting of two signals which quadrate with each other;

quadratic complex auto-correlation arithmetic means for calculating quadratic complex auto-correlation values of said complex signal-to-complex signal which are involved in transmissions of ultrasonic pulse beams at mutually different time points along a predetermined scan line, respectively, when ultrasonic pulse beams are repeatedly transmitted along the predetermined scan line extending a depth direction within the subject, and said complex signal-to-complex signal which are involved in the associated ones of a plurality of depth positions on said scan line, respectively; and velocity gradient calculating means for calculating a velocity gradient within the subject on the basis of said quadratic complex auto-correlation values.

28. A system according to claim 27, wherein said quadratic complex auto-correlation arithmetic means calculates complex auto-correlation values of said complex signal-to-complex signal which are associated with mutually different depth positions on the predetermined scan line, respectively, on each of said complex signals associated with transmissions of ultrasonic pulse beams at mutually different time points, and thereafter calculates complex auto-correlation values of said complex auto-correlation value-to-complex auto-correlation value associated with transmissions of ultrasonic pulse beams at mutually different time points.

29. A system according to claim 27, wherein said quadratic complex auto-correlation arithmetic means calculates complex auto-correlation values of said complex signal-to-complex signal which are involved in a same depth position, in transmissions of ultrasonic pulse beams at mutually different time points along the predetermined scan line, respectively, on each of a plurality of depth positions, and thereafter calculates complex auto-correlation values of said complex auto-correlation value-to-complex auto-correlation value, which are associated with mutually different depth positions.

30. A system according to claim 27, wherein said quadratic complex auto-correlation arithmetic means calculates complex auto-correlation values of said complex signal-to-complex signal which are involved in a same depth position, in transmissions of ultrasonic pulse beams at mutually different time points along the predetermined scan line, respectively, on each of a plurality of depth positions, and thereafter calculates complex auto-correlation values of said complex auto-correlation value involved in a predetermined depth position and said complex auto-correlation values which are involved in associated ones of a plurality of depth positions, respectively.

31. A system according to claim 27, wherein said quadratic complex auto-correlation arithmetic means calculates complex auto-correlation values of said complex signal-to-complex signal which are involved in a same depth position, in transmissions of ultrasonic pulse beams at mutually different time points along the predetermined scan line, respectively, on each of a plurality of depth positions, and thereafter performs a complex auto-correlation operation on a first set comprising said complex auto-correlation values associated with a plurality of depth positions, and a second set comprising said complex auto-correlation values associated with a plurality of depth positions, which are permitted to overlap said complex auto-correlation values constituting the first set.

32. A system according to claim 27, wherein said quadratic complex auto-correlation arithmetic means is adapted for determining a plurality of said complex auto-correlation values with respect to a plurality of depth positions to evaluate a velocity gradient as to a predetermined depth position, and wherein said velocity gradient calculating means is adapted for determining phase messages involved in each of said plurality of said complex auto-correlation values to evaluate the velocity gradient as to said predetermined depth position through regression of a predetermined odd function to the determined phase messages.

33. A system according to claim 32, wherein said predetermined odd function is a straight line.

34. A system according to claim 27, wherein said quadratic complex auto-correlation arithmetic means is adapted for determining a plurality of said complex auto-correlation values with respect to a plurality of depth positions to evaluate a velocity gradient as to a predetermined depth position, and wherein said velocity Gradient calculating means is adapted for calculating a complex auto-correlation value of said complex auto-correlation value-to-said complex auto-correlation value to evaluate the velocity gradient as to said predetermined depth position on the basis of the thus determined complex auto-correlation value.

35. A system according to claim 27, wherein said velocity gradient calculating means has a quadrature detector for performing a quadrature detection for the received signals using two sine wave signals, which are mutually different in phase by 90°, as a reference signal, thereby converting said received signals into the complex signal.

36. A system according to claim 27, further comprising smoothing means for smoothing the velocity gradient calculated by said velocity gradient calculating means.

37. A system according to claim 27, further comprising information extraction means for extracting blood information, which the complex signal carries, from clutter component of information with separation.

38. A system according to claim 27, further comprising display means for displaying the velocity gradient instead of a tomographic image or a color doppler image, or superposing upon the tomographic image or the color doppler image with different colors from those.

* * * * *

UNITED STATES PATENT AND TRADEMARK OFFICE
CERTIFICATE OF CORRECTION

PATENT NO. : 5,462,058
DATED : October 31, 1995
INVENTOR(S) : Yamada et al.

It is certified that error appears in the above-indentified patent and that said Letters Patent is hereby corrected as shown below:

On title page: item [30], Foreign Application Priority Data
before line 1 insert:
--Feb. 14, 1994 [JP] Japan 6-017658--;
--Feb. 15, 1994 [JP] Japan 6-018651--.
Col. 1, line 6, delete "1";
    line 11, change "Gradient" to --gradient--;
    line 14, delete "2".
Col. 5, equation (4), change "$X_1$" to --$X_i$--;
    equation (5), change "arc tan" to --arctan--.
Col. 7, equation (9), change "arc tan" to --arctan--.
Col. 9, line 35, change "Situation" to --situation--.
Col. 12, line 44, change "t" to --$\underline{t}$--;
    line 52, change "t" to --$\underline{t}$--;
    line 64, change "t" to --$\underline{t}$--.
Col. 15, line 43, change "t" to --$\underline{t}$--;
    line 48, change "t" to --$\underline{t}$--;
    line 63, change "c" to --$\underline{c}$--.
Col. 18, line 30, change "Gradient" to --gradient--;
    line 31, change "Gradient" to --gradient--.
Col. 21, equation (21) change "arc tan" to --arctan--;
    equation (22) change "arc tan" to --arctan--;
    line 35, change "t" to --$\underline{t}$--.
Col. 23, line 58, change "i" to --$\underline{i}$--;
    line 60, change "i" to --$\underline{i}$--.
Col. 24, line 33, change "j" to --$\underline{j}$--;
    line 44, change "i" to --$\underline{i}$--.
    change equation "31" (second occurrence) to --33--;

UNITED STATES PATENT AND TRADEMARK OFFICE
CERTIFICATE OF CORRECTION

PATENT NO. : 5,462,058
DATED : October 31, 1995
INVENTOR(S) : Yamada et al.

It is certified that error appears in the above-indentified patent and that said Letters Patent is hereby corrected as shown below:

Col. 25, line 21, change "i" to --$\underline{i}$--.
Col. 26, line 8, change "k" to --$\underline{k}$--;
    line 16, change "Gradient" to --gradient--;
    line 31, change "a" to --$\underline{a}$--; change "b" to --$\underline{b}$--;
    line 51, change "a" to --$\underline{a}$--.
Col. 27, line 10, change "i" to --$\underline{i}$--.
Col. 32, equation (63) delete line 1 and insert therefor
--$= AV Cor(k, t_{i+1})$
--$= Cor(k, t_i) + Cor(k, t_{i+1}) + Cor(k, t_{i+2})$--;
--$= AV Cor(k, T_i) + Cor(k, t_{i+2}) - Cor(k, t_{i-1})$--.
Col. 34, line 6, change "c" to --$\underline{c}$--; change "s" to --$\underline{s}$--.
Col. 38, line 15, change "2B2" to --252_1--.
Col. 40, line 44, change "T" to --$\underline{T}$--;
    line 45, change "c" to --$\underline{c}$--
    line 54, change "T" to --$\underline{T}$--;
    line 55, change "c" to --$\underline{c}$--
Col. 41, line 64, change "B)" to --(B)--.
Col. 45 line 21, claim 5, change "t" to --$\underline{t}$--;
    line 28, second occurrence change "t" to --$\underline{t}$--
    line 41, change "t" to --$\underline{t}$--.
Col. 48, line 18, claim 20, change "t" to --$\underline{t}$--;
    line 23, change "t" to --$\underline{t}$--;
    line 41, claim 21, change "c" to --$\underline{c}$--.

UNITED STATES PATENT AND TRADEMARK OFFICE
CERTIFICATE OF CORRECTION

PATENT NO. : 5,462,058
DATED : October 31, 1995
INVENTOR(S) : Yamada et al.

It is certified that error appears in the above-indentified patent and that said Letters Patent is hereby corrected as shown below:

line 34, claim 34, change "Gradient" to --gradient--.

Signed and Sealed this

Twelfth Day of March, 1996

*Attest:*

BRUCE LEHMAN

*Attesting Officer*     *Commissioner of Patents and Trademarks*